(12) United States Patent
Keyngnaert et al.

(10) Patent No.: US 10,565,533 B2
(45) Date of Patent: *Feb. 18, 2020

(54) SYSTEMS AND METHODS FOR SIMILARITY AND CONTEXT MEASURES FOR TRADEMARK AND SERVICE MARK ANALYSIS AND REPOSITORY SEARCHES

(71) Applicant: Camelot UK Bidco Limited, London (GB)

(72) Inventors: Peter Keyngnaert, Landegem (BE); Jan Waerniers, Aalter (BE); Ann Smet, Stekene (BE)

(73) Assignee: Camelot UK Bidco Limited, London (GB)

( * ) Notice: Subject to any disclaimer, the term of this patent is extended or adjusted under 35 U.S.C. 154(b) by 339 days.

This patent is subject to a terminal disclaimer.

(21) Appl. No.: 15/159,468

(22) Filed: May 19, 2016

(65) Prior Publication Data
US 2016/0260033 A1 Sep. 8, 2016

Related U.S. Application Data

(63) Continuation-in-part of application No. 14/702,209, filed on May 1, 2015, now Pat. No. 9,965,547.
(Continued)

(51) Int. Cl.
*G06Q 10/06* (2012.01)
*G06N 20/00* (2019.01)
(Continued)

(52) U.S. Cl.
CPC .......... *G06Q 10/063* (2013.01); *G06F 16/33* (2019.01); *G06F 17/18* (2013.01); *G06N 20/00* (2019.01); *G06Q 50/184* (2013.01)

(58) Field of Classification Search
CPC .... G06Q 50/184; G06Q 10/063; G06F 17/18; G06F 16/33; G06N 20/00
See application file for complete search history.

(56) References Cited

U.S. PATENT DOCUMENTS 4,972,349 A 11/1990 Kleinberger
6,629,092 B1 9/2003 Berke
(Continued)

FOREIGN PATENT DOCUMENTS

AU 2013100482 A4 5/2013
CN 1581159 A 2/2005
(Continued)

OTHER PUBLICATIONS

Eakins, John et al., Content-based Image Retrieval, http://www.leeds.ac.uk/educol/documents/00001240.htm, Nov. 23, 1999.
(Continued)

*Primary Examiner* — David T. Brooks
(74) *Attorney, Agent, or Firm* — McCarter & English, LLP; Sean R. MacDavitt

(57) ABSTRACT

Exemplary embodiments of the present disclosure provide for identifying similar trademarks from one or more repositories based on training a goods and/or services similarity engine to identify similarities between pairs of descriptions of goods and/or services in a corpus of training data that includes the descriptions of goods and/or services for registered trademarks and trademark classes associated with the descriptions of goods and/or services. A goods and/or services similarity value indicative of similarities between a reference description of goods and/or services and descriptions of goods and/or services associated with registered trademarks can be generated by a goods and/or services similarity engine and a presentation of at least a subset of the set of trademarks can be generated that includes graphics emphasizing the registered trademarks in the subset based,
(Continued)

at least in part, on the plurality of goods and/or services similarity values.

29 Claims, 32 Drawing Sheets

Related U.S. Application Data

(60) Provisional application No. 61/990,865, filed on May 9, 2014, provisional application No. 61/990,859, filed on May 9, 2014.

(51) Int. Cl.
*G06Q 50/18* (2012.01)
*G06F 17/18* (2006.01)
*G06F 16/33* (2019.01)

(56) References Cited

U.S. PATENT DOCUMENTS

| | | | |
|---|---|---|---|
| 7,346,605 B1 | 3/2008 | Hepworth et al. | |
| 7,761,438 B1 | 7/2010 | Bober | |
| 7,966,369 B1 | 6/2011 | Briere et al. | |
| 8,332,388 B2 | 12/2012 | Chaudhuri et al. | |
| 8,346,548 B2* | 1/2013 | Owen | G06F 17/30681 704/209 |
| 9,602,585 B2 | 3/2017 | Falkenberg | |
| D819,066 S | 5/2018 | Anderson et al. | |
| 2002/0042719 A1* | 4/2002 | Chauchard | G06Q 10/10 705/310 |
| 2003/0158743 A1* | 8/2003 | Havlick | G06Q 10/10 705/310 |
| 2004/0123245 A1* | 6/2004 | Bianchi | G06F 17/30696 715/273 |
| 2004/0220903 A1 | 11/2004 | Shah et al. | |
| 2004/0225643 A1 | 11/2004 | Alpha et al. | |
| 2004/0230568 A1* | 11/2004 | Budzyn | G06F 17/30864 |
| 2005/0267871 A1 | 12/2005 | Marchisio et al. | |
| 2005/0289168 A1* | 12/2005 | Green | G06F 17/3064 |
| 2007/0073736 A1 | 3/2007 | Goetz | |
| 2007/0081197 A1 | 4/2007 | Omoigui | |
| 2007/0203863 A1 | 8/2007 | Gupta et al. | |
| 2008/0033822 A1 | 2/2008 | Merdinger | |
| 2008/0065611 A1 | 3/2008 | Hepworth et al. | |
| 2008/0155407 A1 | 6/2008 | Franks | |
| 2008/0243785 A1 | 10/2008 | Stading | |
| 2008/0243799 A1 | 10/2008 | Rozich et al. | |
| 2008/0244429 A1 | 10/2008 | Stading | |
| 2009/0216911 A1 | 8/2009 | Long | |
| 2009/0234641 A1* | 9/2009 | Laidebeur | G06Q 10/00 704/9 |
| 2009/0299731 A1* | 12/2009 | Owen | G06F 17/30681 704/9 |
| 2010/0262512 A1* | 10/2010 | Lee | G06F 17/3087 705/26.1 |
| 2011/0084854 A1 | 4/2011 | Johnson | |
| 2011/0225019 A1 | 9/2011 | Taylor et al. | |
| 2011/0314000 A1 | 12/2011 | Chaudhuri et al. | |
| 2012/0144499 A1* | 6/2012 | Tan | G06Q 10/00 726/26 |
| 2012/0158724 A1 | 6/2012 | Mahadevan et al. | |
| 2012/0191716 A1 | 7/2012 | Omoigui | |
| 2012/0197653 A1 | 8/2012 | Short et al. | |
| 2013/0055390 A1 | 2/2013 | Bennett | |
| 2013/0097134 A1 | 4/2013 | Thompson et al. | |
| 2013/0198217 A1 | 8/2013 | Narula et al. | |
| 2013/0254124 A1 | 9/2013 | Tan et al. | |
| 2014/0181007 A1* | 6/2014 | Kolehmainen | G06Q 30/04 707/607 |
| 2014/0279807 A1 | 9/2014 | Dimitrijevic | |
| 2014/0280104 A1* | 9/2014 | Summerfield | G06Q 50/184 707/724 |
| 2014/0351045 A1 | 11/2014 | Abihssira et al. | |
| 2015/0106353 A1 | 4/2015 | Nguyen et al. | |
| 2016/0132979 A1 | 5/2016 | Schneller et al. | |
| 2016/0155179 A1 | 6/2016 | Wang et al. | |
| 2016/0196340 A1 | 7/2016 | Cheslow | |
| 2017/0322983 A1 | 11/2017 | Anderson | |

FOREIGN PATENT DOCUMENTS

| | | |
|---|---|---|
| CN | 1716244 A | 1/2006 |
| CN | 104809142 A | 7/2015 |
| JP | 2006004427 A | 1/2006 |
| KR | 100926118 B1 | 11/2009 |
| WO | 2006031466 A2 | 3/2006 |
| WO | 2010024133 A1 | 3/2010 |
| WO | 2013037039 A2 | 3/2013 |
| WO | 2017192831 A1 | 11/2017 |

OTHER PUBLICATIONS

Eakins, John P., Trademark Image Retrieval, SpringerLink, https://link.springer.com/chapter/10.1007/978-1-4471-3702-3_13, 2001.
Anuar, Fatahiyah Mohd et al., A conceptual model of trademark retrieval based on conceptual similarity, 17th International Conference on Knowledge Based and Intelligent Inforamtion and Engineering Systems—KES2013, Procedia Computer Science 22 (2013) 450-459, 2013.
Schietse et al., "Practive and Challenges in Trademark Image Retrieval", in Proceedings of the 6th ACM International Conference on Image and Video Retrieval, Amsterdam, The Netherland, Jul. 9-11, 2007, pp. 518-524.
Trademark Search, 7 pages, accessed online at <http://trademarkesearch.com/> on 08/2512017.
Ciocca et al., "Similarity Retrieval of Trademark Images", in Proceedings of International Conference on Image Analysis and Processing, 1999, 6 pages. (Year: 1999).
Lin et al., "Trademark Image Retrieval by Distance-Angle Pair-Wise Histogram", International Journal of Imaging Systems and Technology, vol. 15, Issue 2, Aug. 18, 2005, pp. 103-113. (Year: 2005).
Qi et al., "An Effective Solution for Trademark Image Retrieval by Combining Shape Description and Feature Matching", Pattern Recognition 43 (2010): pp. 2017-2027 (Year 2010).
You et al., "A Rotation Invariant Image Retrieval with Local Features", International Journal of Control, Automation, and System, vol. 1, No. 3, Sep. 2003, pp. 332-338 (Year: 2003).
Eakins et al., "Similarity Retrieval of Trademark Images", published in IEEE MultiMedia, vol. 5, Issue 2, Apr.-Jun. 1998, pp. 53-63.
WIPO article, "WIPO Launches Unique Image-Based Search for Trademarks, Other Brand Information", 2 pages, dated May 12, 2014, accessed online at <http://www.wipo.intipressroom/en/articles/2014/article_0007.html> on Aug. 25, 2017.
Non-Final Rejection from related U.S. Appl. No. 14/702,209 dated Sep. 1, 2017.

\* cited by examiner

SYSTEMS AND METHODS FOR SIMILARITY AND CONTEXT MEASURES FOR TRADEMARK AND SERVICE MARK ANALYSIS AND REPOSITORY SEARCHES

RELATED APPLICATIONS

The present application is a continuation-in-part of and claims the benefit of priority to U.S. patent application Ser. No. 14/702,209, filed on May 1, 2015, which claims the benefit of priority to Provisional Patent Application No. 61/990,859, filed on May 9, 2014, and to U.S. Provisional Patent Application No. 61/990,865, filed on May 9, 2014, the entirety of each are incorporated herein by reference.

TECHNICAL FIELD

Exemplary embodiments of the present disclosure relate to improved searching and traversal of repositories as well as improved processing of search results.

BACKGROUND

An overwhelming amount of data has been made available for retrieval over the Internet or over other communication networks. Such data is generally available from a large number of different data sources, including data sources curated by data service providers. Some people seeking to find data using key terms entered into search engines or other processes often cannot efficiently find the data they are looking for. Moreover, once a set of search results is provided, some people may not be able to use the results in a meaningful way. Additionally, some people may not possess the skill or time necessary for developing precise search terms to ensure that results of a search are comprehensive and complete, and also may not possess the skill or time necessary for interpreting large volumes of data returned in response to searches.

The above issues may be particularly true when one is searching for trademarks and/or service marks (e.g., word marks, trademark images/logos) in syntax-driven repositories (e.g., to conduct trademark or service mark clearances), where differences in spelling, context, or presentation of search terms can yield different results that may or may not include pertinent trademarks or service marks that should be reviewed as part of the trademark clearance process. When performing trademark clearances or similar tasks, the person (or people) conducting the clearance is typically interested in receiving search results that are similar to a proposed trademark or service mark, which can include words, sounds, images, and/or colors, and the like, and then determining whether any of the results are "confusingly" similar to proposed mark.

When considering whether any of the results are confusingly similar to the proposed mark, the person conducting the search typically needs to take into account not only the spelling of words, actual images, or colors in the proposed mark, but also, for example, how the words sound when they are spoken, morphological similarity, the meaning/semantics behind the words, possible translations and/or transliterations and/or whether images and/or colors in any of the results are similar enough to the proposed mark (e.g., an image of a horse vs. an image of a donkey). Therefore, when searching for confusingly similar trademarks or service marks, it may be necessary to conduct a broad search. However, this may introduce a large quantity of irrelevant trademarks or services marks in the search results, which can make it difficult and time consuming for someone to review and identify potentially confusingly similar marks.

There remains a need for solutions to effectively and efficiently traverse data repositories to identify, retrieve, and process data that may be of interest to users, while simplifying the input required by the users to initiate such identification, retrieval, and processing.

SUMMARY

Exemplary embodiments of the present disclosure provide systems, methods, and non-transitory computer-readable media to address the disadvantages of conventional search engines and data searching processes to facilitate efficient and effective traversal of source repositories. Based on search terms received from a user, exemplary embodiments of the present disclosure can advantageously transform the search terms into one or more queries, using one or more query languages. The queries can be generated from search strategies and can add to, enhance, and/or improve upon the search terms originally provided by the user to improve the quality and comprehensiveness of the results returned by the repository beyond what would have been normally provided if only the user-provided key terms formed the query. Exemplary embodiments of the present disclosure can advantageously reduce the complexity and burdensome processes often associated with interfacing with syntax-driven repositories or repositories using key terms and syntax specific to the encoding scheme of the repositories or repositories.

Once results from the repositories have been retrieved, exemplary embodiments of the present disclosure can discount or remove some of the results before any of the results are provided to the user. For example, some results can be removed based on a determination that the removed results are not deemed to be confusingly similar to the terms in the search order. As such, while the search and retrieval processes of exemplary embodiments can expand the scope of a search to be more inclusive, the presentation processes of exemplary embodiments can then narrow or reduce the quantity of results before sending the results to user; thereby reducing the time and effort required by a user to parse through the results, while at the same time providing trademarks and/or service marks (e.g., word marks, trademark images, logos) that may be phonetically, graphical, semantically, translation, morphological, and/or contextually, similar to the user-provided key terms used to initiate the search.

In accordance with embodiments of the present disclosure, a method of searching one or more repositories associated with an information retrieval system to identify confusingly similar trademarks in the one or more repositories is disclosed. The method includes receiving, by one or more servers, an electronic search order including a trademark input string, a reference description of goods and/or services, and a reference trademark class; transforming the search order into one or more queries based on execution of conditional logic of one or more rules; and retrieving a set of registered trademarks from the one or more repositories using the one or more queries to generate search results, the set of registered trademarks including descriptions of goods and/or services for the registered trademarks, and trademark classes associated with the registered trademarks. The method also includes generating trademark similarity values between the trademark input string and each of the registered trademarks; generating goods similarity values between the reference description of goods and/or services and each of the descriptions of goods and/or services for the registered trademarks; and generating a presentation of at least a subset of the registered trademarks, via a graphical user interface, the presentation including graphics emphasizing the registered trademarks in the subset based on the trademark similarity values and the goods and/or services similarity values.

In accordance with embodiments of the present disclosure, a method of identifying similar trademarks from one or more repositories is disclosed. The method includes training a goods and/or services similarity engine to identify similarities between pairs of descriptions of goods and/or services in a corpus of training data that includes the descriptions of goods and/or services for registered trademarks and classes associated with the description of goods and/or services; receiving a trademark input string, a reference description of goods and/or services for the trademark input string, and a reference trademark class for the trademark input string and the reference description of goods and/or services; and receiving a set of trademarks from the one or more repositories, the set of trademarks including registered trademarks, descriptions of goods and/or services associated with the registered trademarks, and trademark classes associated with the registered trademarks. The method also includes generating, by the goods and/or services similarity engine, based on the training, a plurality of goods and/or services similarity values indicative of similarities between the reference description of goods and/or services and each of the descriptions of goods and/or services associated with each of the registered trademarks; and generating a presentation of at least a subset of the set of trademarks for a user via a graphical user interface, the presentation including graphics emphasizing the registered trademarks in the subset based, at least in part, on the plurality of goods and/or services similarity values.

In accordance with embodiments of the present disclosure, a system for identifying similar trademarks from one or more repositories is disclosed. The system includes one or more repositories and a distributed server environment. The one or more repositories store trademarks and metadata associated with the trademarks. The distributed server environment includes servers operatively coupled to each other via a communication network, the servers being configured to interact with the one or more repositories to train a goods and/or services similarity engine to identify similarities between pairs of descriptions of goods and/or services in a corpus of training data that includes the descriptions of goods and/or services for registered trademarks and classes associated with the description of goods and/or services; receiving a trademark input string, a reference description of goods and/or services for the trademark input string, and a reference trademark class for the trademark input string and the reference description of goods and/or services; receive a set of trademarks from the one or more repositories, the set of trademarks including registered trademarks, descriptions of goods and/or services associated with the registered trademarks, and trademark classes associated with the registered trademarks; generate, by the goods and/or services similarity engine, based on the training, a plurality of goods and/or services similarity values indicative of similarities between the reference description of goods and/or services and each of the descriptions of goods and/or services associated with each of the registered trademarks; and generate a presentation of at least a subset of the set of trademarks for a user via a graphical user interface, the presentation including graphics emphasizing the registered trademarks in the subset based, at least in part, on the plurality of goods and/or services similarity values.

In accordance with embodiments of the present disclosure, a method of extracting confusing similar trademarks from one or more repositories is disclosed. The method includes receiving, by one or more servers, an electronic search order including a text-based input string, a list of jurisdictions, a list of international classes, and/or a list of goods and/or services text-based input strings, executing conditional logic of one or more rules to process the search order, and transforming the search order into one or more queries based on execution of the conditional logic of one or more rules. The method also includes retrieving a set of trademarks from one or more repositories using the one or more queries to generate search results. The set of trademarks retrieved can be limited to the list of jurisdictions and the list of international classes. The method further includes transmitting, via a communication network, at least a portion of the search results to a user computing device to be rendered in a graphical user interface of a display device associated with the computing device.

In accordance with embodiments, a system of extracting confusingly similar trademarks from one or more repositories is disclosed. The system includes one or more repositories, one or more rule bases, and a distributed server environment. The one or more repositories store trademarks and metadata associated with the trademarks. The one or more rule bases include rules formed by conditional logic. The distributed server environment includes servers operatively coupled to each other via a communication network. The servers configured to interact with the one or more repositories and rules bases and are collectively programmed to receive an electronic search order including a text-based input string, a list of jurisdictions, a list of international classes, and/or a list of goods and services text-based input strings; execute conditional logic of one or more of the rules in the one or more rule bases to process the search order; transform the search order into one or more queries based on execution of the conditional logic; and retrieve a set of trademarks from the one or more repositories using the one or more queries to generate search results. The set of trademarks retrieved is limited to the list of jurisdictions and the list of international classes. The servers are also programmed to transmit at least a portion of the search results to a user computing device to be rendered in a graphical user interface of a display device associated with the computing device.

In accordance with embodiments, a non-transitory computer readable medium is disclosed, which stores instructions that are executable by one or more processing devices. Execution of the instructions by one or more servers causes the one or more servers to receive an electronic search order including a text-based input string, a list of jurisdictions, a list of international classes, and/or a list of goods and services text-based input strings; execute conditional logic of one or more of the rules in the one or more rule bases to process the search order; transform the search order into one or more queries based on execution of the conditional logic; retrieve a set of trademarks from the one or more repositories using the one or more queries to generate search results. The set of trademarks retrieved are limited to the list of jurisdictions, and depending on a specified list of international classes, stricter or broader variations can be applied. Execution of the instructions further causes the one or more servers to transmit at least a portion of the search results to a user computing device to be rendered in a graphical user interface of a display device associated with the computing device.

In accordance with embodiments of the present disclosure, the search order can be transformed into one or more queries by identifying visual, semantic, translation, morphological or phonetic equivalents (or combinations thereof) of the text-based input string in response to execution of the conditional logic, transforming the search order into a search strategy including one or more directives for processing the search order based on execution of the conditional logic and the visual, semantic, translation, morphological or phonetic equivalents, and interpreting the directives of the search strategy to transform the search strategy into the one or more queries.

In accordance with embodiments, it can be determined whether each of the trademarks retrieved from the one or more repositories satisfies a filtering criteria. Trademarks that satisfy the filtering criteria can be transmitted to a user device, while trademarks that do not satisfy the filtering criteria are not transmitted to the user device. To determine whether each of the trademarks retrieved from the one or more repositories satisfies a filtering criteria exemplary embodiments can compare each of the trademarks to the text-based input string of the order, generate a similarity score for each of the trademarks in response to the comparison, and compare each of the similarity scores to a similarity score threshold. The trademarks having a similarity score that exceeds the similarity score threshold can be transmitted to the user device.

In accordance with embodiments of the present disclosure, the text-based input string of the order can describe a word mark or a trademark image/logo. With respect to the latter, embodiments can identify recognized words in the input string and map the recognized words onto a set of concepts used to annotate trademark images in a trademark repository. The order can be transformed into one or more queries based on execution of the conditional logic by executing a rule matcher to identify which of the one or more rules apply to query generation based on one or more concepts extracted from the text based input string, executing the one or more rules identified by the rule matcher to transform the search order into the one or more queries; extracting one or more low level codes associated with trademark images stored in the one or more repositories based on executing the identified rules; and forming the one or more queries based on the low level codes. In the event that it is determined that the set of trademarks returned by the one or more queries is a null set, embodiments of the present disclosure can generalize the one or more rules used to generate the one or more queries and generate one or more new queries based on generalizing the rules. Further generalization can occur when it is determined that a further set of trademarks returned in response to the one or more new queries is a null set. In some embodiments, the one or more rules can be generalized for a specified number of terms in the one or more queries to generate the one or more new queries.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying figures. In the drawings, like reference numerals refer to like parts throughout the various views of the non-limiting and non-exhaustive embodiments of the present invention, and wherein.

DETAILED DESCRIPTION

Figure 1:
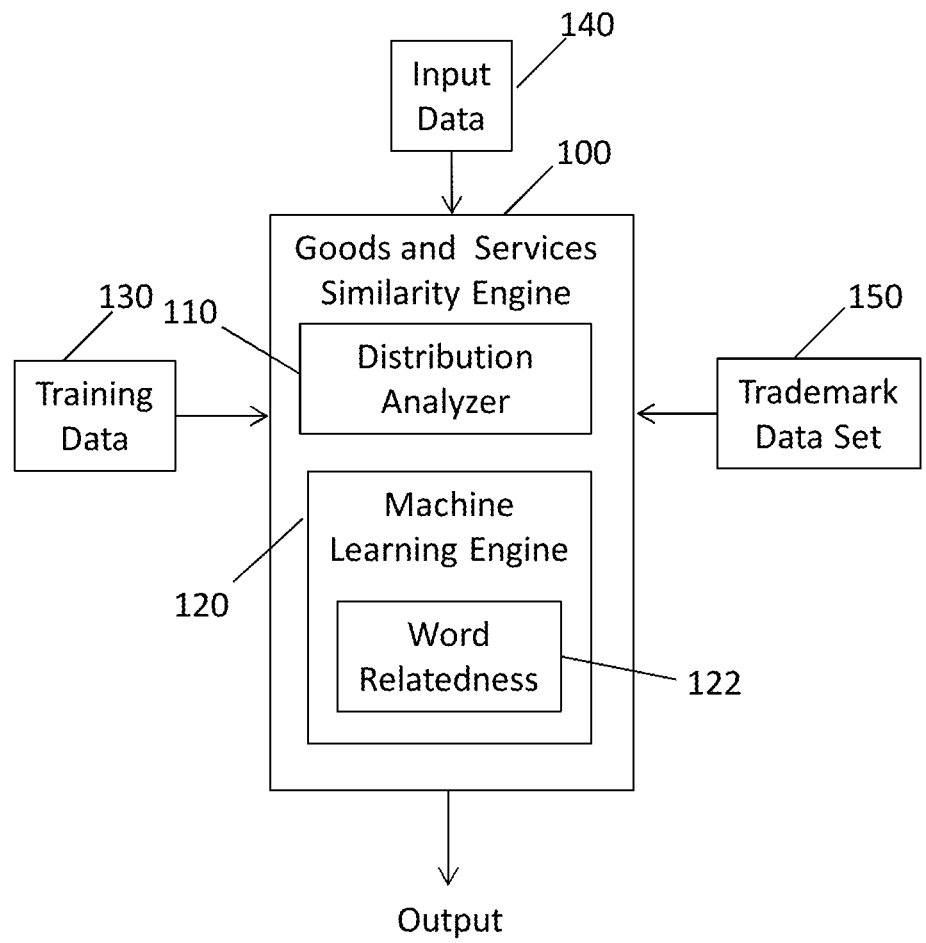
FIG. 1 is a block diagram of a goods and/or services similarity engine that can be implemented in accordance with embodiments of the present disclosure.

Exemplary embodiments of the present disclosure provide systems, methods, and non-transitory computer-readable media for efficiently and effectively traversing source repositories (e.g., databases) and/or for contextual analysis of data sets (e.g., returned from the source repositories).

Exemplary embodiments can use one or more processes to transform user-provided search terms into one or more queries in one or more query or programming languages. The transformation of the user-provided search terms to the one or more queries can be based on an application of one or more conditional rules to the search terms, which can change the search terms, can add additional search terms, and/or can associate equivalents and/or very close similar variations (visual, phonetic, contextual, semantic, translation, morphological) to form a search strategy that optimizes, enhances, and/or improves the quality and comprehensiveness of the results returned by the repository. By generating queries in accordance with exemplary embodiments of the present disclosure, exemplary embodiments can control an input to an information retrieval system to provide a comprehensive search of repositories while reducing the complexity and burden experienced by a user when interfacing, for example, with syntax-driven repositories.

In exemplary embodiments, once results from the repositories have been retrieved in response to queries or a data set is otherwise formed, post search processes can be performed to limit and/or enhance the results presented to users. For example, for embodiments in which one or more searches are performed, some of the results returned by the queries can be discounted or removed to control an output of the information retrieval system. Exemplary embodiments can assess the results to determine that some of the results will not be relevant to a user, and can remove the results that are determined to be irrelevant to reduce the quantity of results and the time required by a user to parse through the results. The results can also be grouped based on metadata associated with the results and/or based on the results themselves.

The post search processing can include contextual analysis of the results/data set based on the content of the results/data set, metadata associated with the results/data set, and/or in response to another data set associated with the results/data set. The contextual analysis can provide a basis by which the results/data set is presented to a user through a graphical user interface as described herein.

In one non-limiting example application, exemplary embodiments of the present disclosure can be configured to facilitate extraction and contextual analysis of confusingly similar trademarks or service marks from one or more trademark repositories. The terms trademark and service mark can be used interchangeably herein and refer to word marks, trademark images/logos, trademarked sounds, trademarked colors, and/or any other suitable identifier of the source of goods/services. While the present disclosure describes such a non-limiting example application, exemplary embodiments of the present disclosure can be utilized to search for or contextually analyze any data stored in repositories based on the application of visual, semantic, translation, morphological, phonetic, contextual (or any other suitable methodology that expresses some form of similarity) equivalents and/or similarity measures as described herein.

FIG. 1 is a block diagram of a goods and/or services similarity engine 100 that can be implemented in accordance with embodiments of the present disclosure. The goods and/or services similarity engine 100 can include a distribution analyzer 110 and machine learning engine 120 configured to implement word relatedness component 122. The goods and/or services similarity engine 100 can be configured to receive input data 130 including an input string forming a reference description of goods and/or services and one or more trademark classes to be associated with the reference description of goods and/or services. For each of the one or more trademark classes included in the input data, the goods and/or services similarity engine 100 can be trained to detect and distinguish between words/terms in the reference description of goods and/or services that are strongly associated with the one or more class (kernel terms), words/terms in the reference description of goods and/or services that are generic across the trademark classes (generic terms), and/or words/terms that can modify the words that are kernel terms (modifier terms), and/or process descriptions of goods and/or services associated with trademarks stored in one or more trademark repositories and one or more input descriptions of goods and/or services. In response to detecting and distinguishing kernel terms, modifier terms, and generic terms, the goods and/or services similarity engine 100 can be trained to determine similarity values between the word/terms in the reference description of goods and/or services and the words/terms in the description of goods and/or services in existing trademarks based on the type of term (e.g., kernel, modifier, generic).

The goods and/or services similarity values can be used, for example, in search processes to facilitate query generation and repository searches to not only identify trademarks that include an identical description of goods and/or services to the reference description of goods and/or services, but also to automatically, and without user intervention, expand the queries and search to include variations of words/terms in the reference description of goods and/or services that are substantially similar to the words/terms of the reference description of goods and/or services. At the same time, the variations of the description of goods and/or services can preserve the meaning, context, and/or scope of the reference description of goods and/or services. Expansion of the queries and search in this manner can ensure that the repository is being efficiently searched to discover trademarks that are relevant to the reference description of goods and/or services without simply including trademarks in the results because they include one or more of the words/terms recited in the reference description of goods and/or services.

The goods and/or services similarity values can be used, for example, in post-search processes to facilitate detection of trademarks in the search results that are more relevant to the input data (e.g., the reference description of goods and/or services and associated classes). For example, the trademarks returned by a search that have the highest similarities between the reference description of goods and/or services and the description of goods and/or services for the trademarks can be ranked or prioritized to present those trademarks to a user as being particularly relevant or important. Likewise, a similar post-search process can be used to filter out irrelevant trademarks in the search results.

Figure 2:
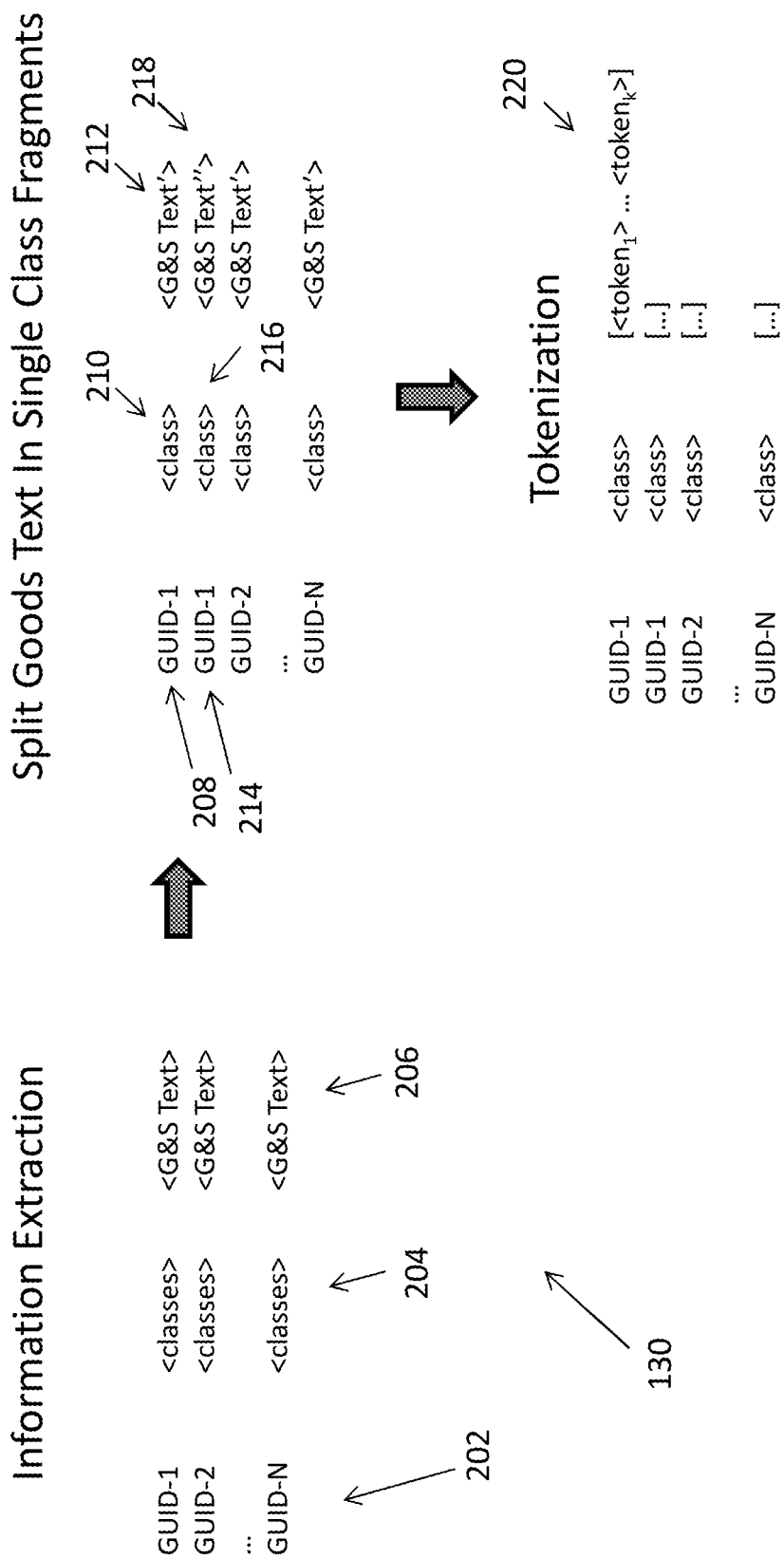
FIG. 2 illustrates exemplary training data for training embodiments of a goods and/or services similarity engine.

Referring to FIGS. 1-2, to train the similarity engine 100, the similarity engine 100 can receive training data 140 in the form of a set of existing registered trademarks that includes, for example, trademark names, a description of goods and/or services associated with the trademarked names, and trademark classes for which the trademarked names are registered. For example, the training data 140 can be derived from one or more repositories of registered trademarks including, for example, a trademark repository maintained by the United States Patent and Trademark Office or other administrative or government agency, a proprietary trademark repository, which can be enhanced, curated, and/or annotated.

The training data can be used to train the distribution analyzer 110 and the machine learning engine 120. As shown in FIG. 2, each trademark (represented by identifiers 202, e.g., GUID-1-GUID-N) in the training data 140 can be associated with one or more trademark classes 204 and a description of goods and/or services 206. During the training process, trademarks that include multiple classes are split into separate entries. For example, the trademark associated with GUID-1 can include two classes, and therefore, can be split into two separate entries, where a first entry 208 includes the identifier, GUID-1, a first one of the classes 210, and a description of goods and/or services 212 for the first one of the classes 210, and a second entry 214 includes the identifier, GUID-1, a second one of the classes 216, and a description of goods and/or services 218 for the second one of the classes 216. The words/terms included in the descriptions of goods and/or services for each entry can be tokenized using tokenization processes described herein. For example, the words/terms in the first entry 208 can be tokenized such that the words/terms in the description of goods and/or services are replaced by tokens 220, e.g., $token_1$-$token_k$.

After the training data has been separated such that each entry includes a single class and the words/terms in the description of goods and/or services have been tokenized, the tokens can be evaluated to determine a frequency with which the tokens appear in each of the trademark classes to generate class distributions of tokens across the trademark classes. The class distributions of the tokens can be normalized to account for differences in class sizes so that the frequency with which the tokens appear in each of the trademark class is defined relative to the total number of tokens appearing in each class. The distribution analyzer 110 can utilize the normalized class distributions to detect and distinguish words/terms included in descriptions of goods and/or services as being associated with types of terms for a class (e.g., kernel, modifier, generic).

The machine learning engine 120 implemented by the goods and/or services similarity engine 100 can utilize machine learning techniques, such as deep neural network techniques and/or any other suitable machine learning techniques. For example, the similarity engine can implement word relatedness based on, for example, word embeddings that can be trained based on a corpus of existing descriptions of goods and/or services for registered trademarks in the training data 140. Initially, the tokens generated for the words/terms in the descriptions of goods and/or services in the training data are assigned arbitrary or random vector values. Based on the training data (the description of goods and/or services), the machine learning engine 120 can map the tokens to, for example, vectors, where each vectors includes a real number. The mapping can be based on vectors associated with tokens that surround the token for which a vector is being generated. For example, a vector for a token in a description of goods and/or services can be determined, at least in part, based on the tokens to the left or right of the token. By defining a vector of a token based on the tokens that surround the token, the machine learning engine 120 can define context-based vectors such that a similarity between two tokens can be determined based on the context within which the two tokens are used as opposed to on the form or content of the token itself. Tokens having identical or similar vectors can be identified by the machine learning algorithm as being similar. In some embodiments, the word relatedness component 122 of the machine learning engine 120 can utilize stemming, inflections, normalizations, and contextual usage to generate the vectors.

In operation, after the goods and/or services similarity engine 100 has been trained, the goods and/or services similarity engine 100 can receive the input data 130 including an input string forming a reference description of goods and/or services and one or more trademark classes to be associated with the reference description of goods and/or services and can receive a set of trademark data 150. The set of trademark data 150 can include trademarked names, descriptions of goods and/or services associated with the trademarked names and trademark classes associated with the descriptions of goods and/or services. Tokens can be generated for each of the words/terms in the reference description of goods and/or services. Using the distribution analyzer 110 and/or the machine learning engine 120, the goods and/or services similarity engine 100 can generate similarity values between the reference description of goods and/or services in the input data 130 and descriptions of goods and/or services in the set of trademark data 150.

The distribution analyzer 110 can detect and distinguish between tokens in the reference description of goods and/or services and can decompose the reference description of goods and/or services into tokens that are strongly associated with the one or more class (kernels), tokens that are generally distributed across the trademark classes (generic), and/or tokens that can modify the kernel tokens (modifiers), In response to detecting and distinguishing kernel tokens, modifier tokens, and generic tokens, the similarity engine 100 can determine similarity values between the tokens in the reference description of goods and/or services and the tokens in the description of goods and/or services in existing trademarks based on the type of token (e.g., kernel, modifier, generic).

Figure 3A:
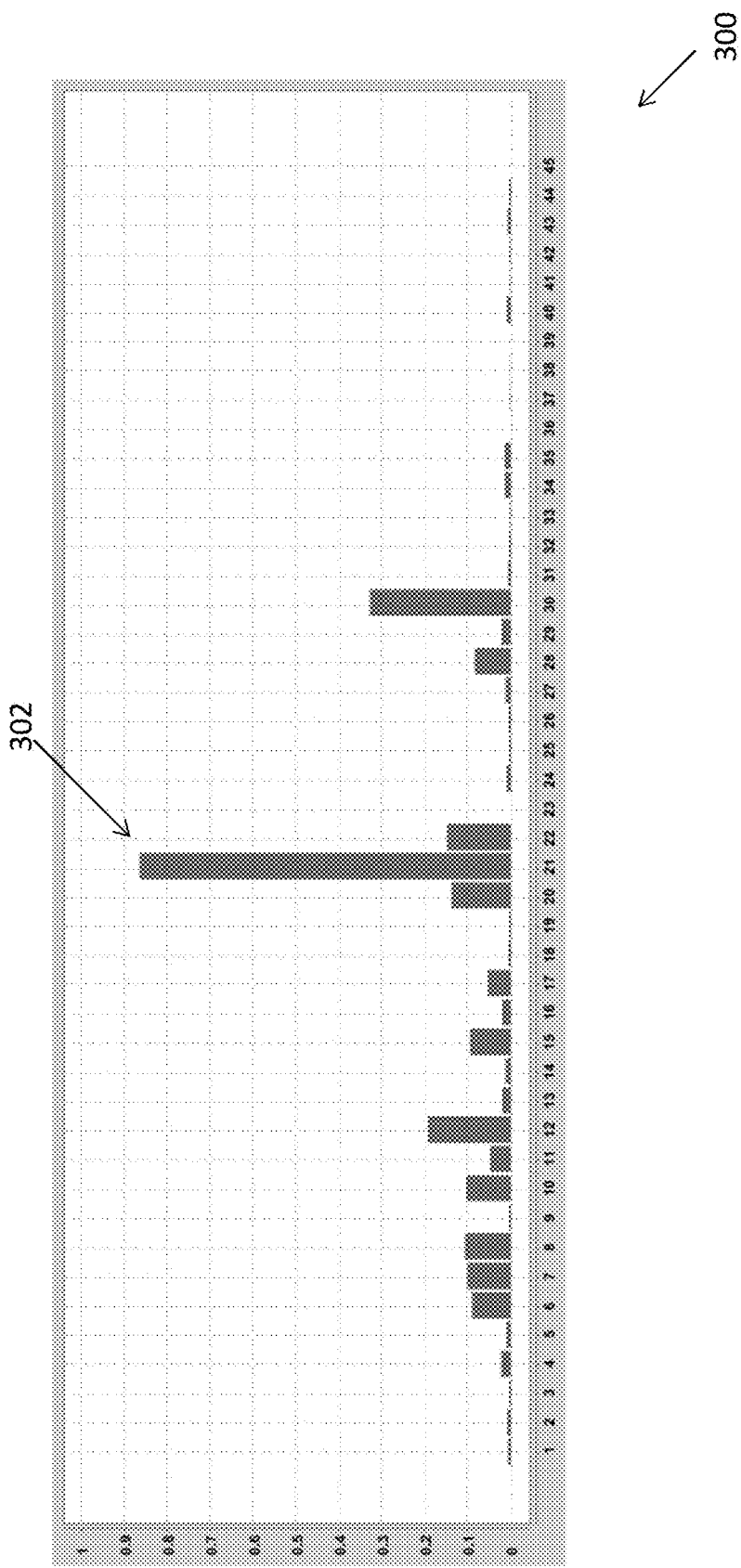
FIG. 3A shows a graph illustrating a distribution of a term across trademark classes having a peak associated with a class corresponding to a class associated with a description of goods and/or services from which the term originated.
Figure 3B:
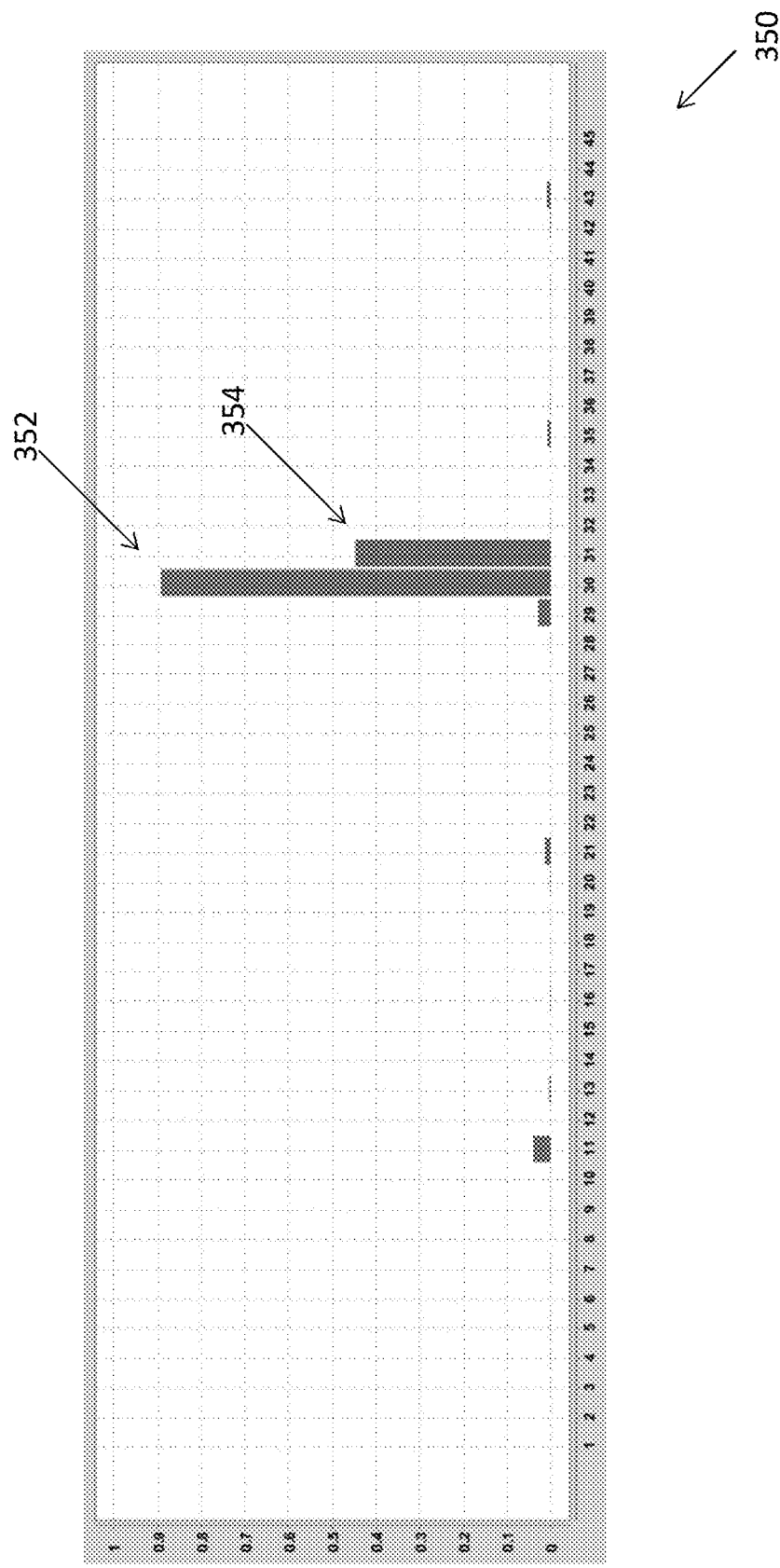
FIG. 3B shows a graph illustrating a distribution of a term across trademark classes having a peak associated with a class that does not correspond to a class associated with a description of goods and/or services from which the term originated.

As a non-limiting example, the input data reference description of goods and/or services can be "PAPER CUPS FOR HOLDING POPCORN" for class 21 (Housewares and Glass). FIGS. 3A-B show example normalized distributions 300 and 350 for the terms "CUP" and "POPCORN", respectively, as a function of the trademark class. As shown in FIG. 3A, the term "CUP" has a peak 302 (e.g., a high frequency of occurrence) in class 21, and a generally lower value across the remaining classes. Based on this normalized class distribution, the distribution analyzer 110 can determine that the term "CUP" is a kernel term for the reference description of goods and/or services because it is strongly associated with class 21, which was specified in the input data 130. Similarly, as shown in FIG. 3B, the term "POPCORN" has peaks 352 and 354 (e.g., a high frequency of occurrence) in classes 30 and 31, and a generally lower value across the remaining classes. Based on this normalized class distribution, the distribution analyzer 110 can determine that the term "POPCORN" is not a kernel term for the reference description of goods and/or services because it is not strongly associated with class 21, but is a modifier term because it is strongly associated with one or more other classes. Similar distributions and analyses can be performed for each of the words/terms in the reference description of goods and/or services and for the class or classes specified in the input data 130 to determine whether the words/terms are kernels, modifiers, or generics.

In exemplary embodiments, scores can be generated for each token in the reference description of goods and/or services as they relate to the specified class(es) in the input data 130 (e.g., class 21) and as they relate to a class (or classes) outside of the specified class in the input data 130 (e.g., classes other than class 21).

Figure 4A:
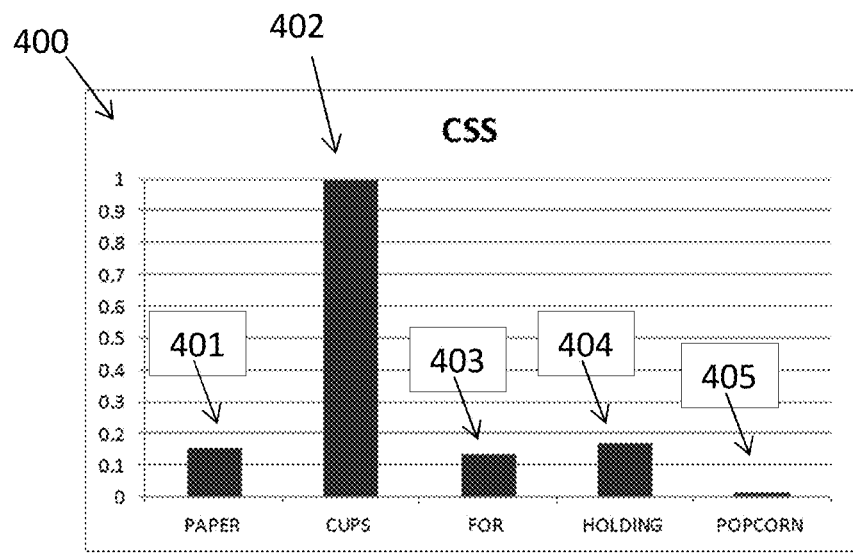
FIG. 4A shows a graph illustrating class specific scores for terms in a description of goods and/or services.
Figure 4B:
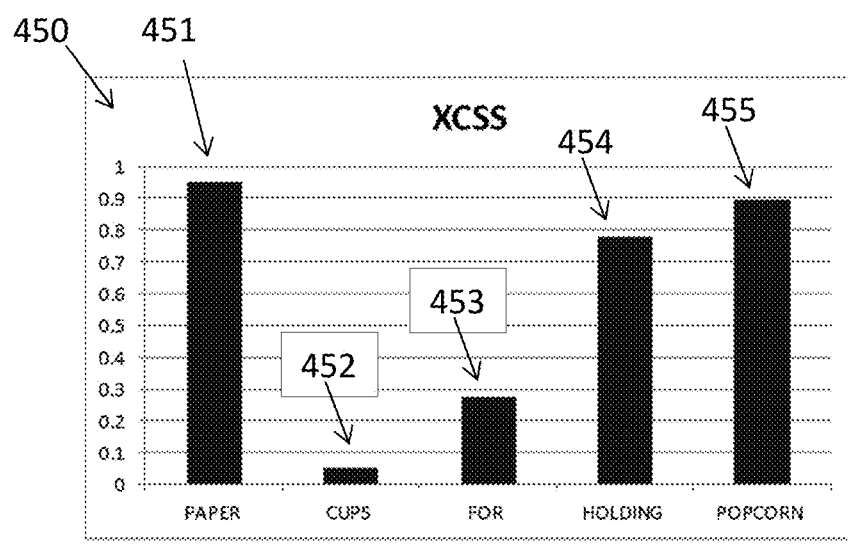
FIG. 4B shows a graph illustrating excluded class specific scores for terms in a description of goods and/or services in accordance with embodiments of the present disclosure.

FIG. 4A shows a graph 400 illustrating class specific scores 401-405 for the terms "PAPER", "CUPS", "FOR", "HOLDING", and "POPCORN", respectively, for the specified class 21. As shown in graph 400, the term "CUPS" is the only term that is strongly associated with class 21 based on its class specific score, and therefore is identified by the distribution analyzer 110 as the only kernel in the reference description of goods and/or services. FIG. 4B shows a graph 450 illustrating excluded class specific scores 451-455 for the terms "PAPER", "CUPS", "FOR", "HOLDING", and "POPCORN", respectively, for classes outside of the specified class 21. As shown in graph 450, the terms "PAPER", "HOLDING", and "POPCORN" have strong associations with classes outside of class 21, and therefore are identified by the distribution analyzer 110 as the modifiers in the reference description of goods and/or services.

The distributed analyzer 110 can utilize the normalized scaled class distribution generated for tokens based on the distribution of tokens across the class using the training data to generate distribution similarity scores between two tokens. For example, distribution similarity scores between tokens in the reference description of goods and tokens in one of the description of goods in the set of trademark data 140 can be generated by the distribution analyzer 110.

Figure 5A:
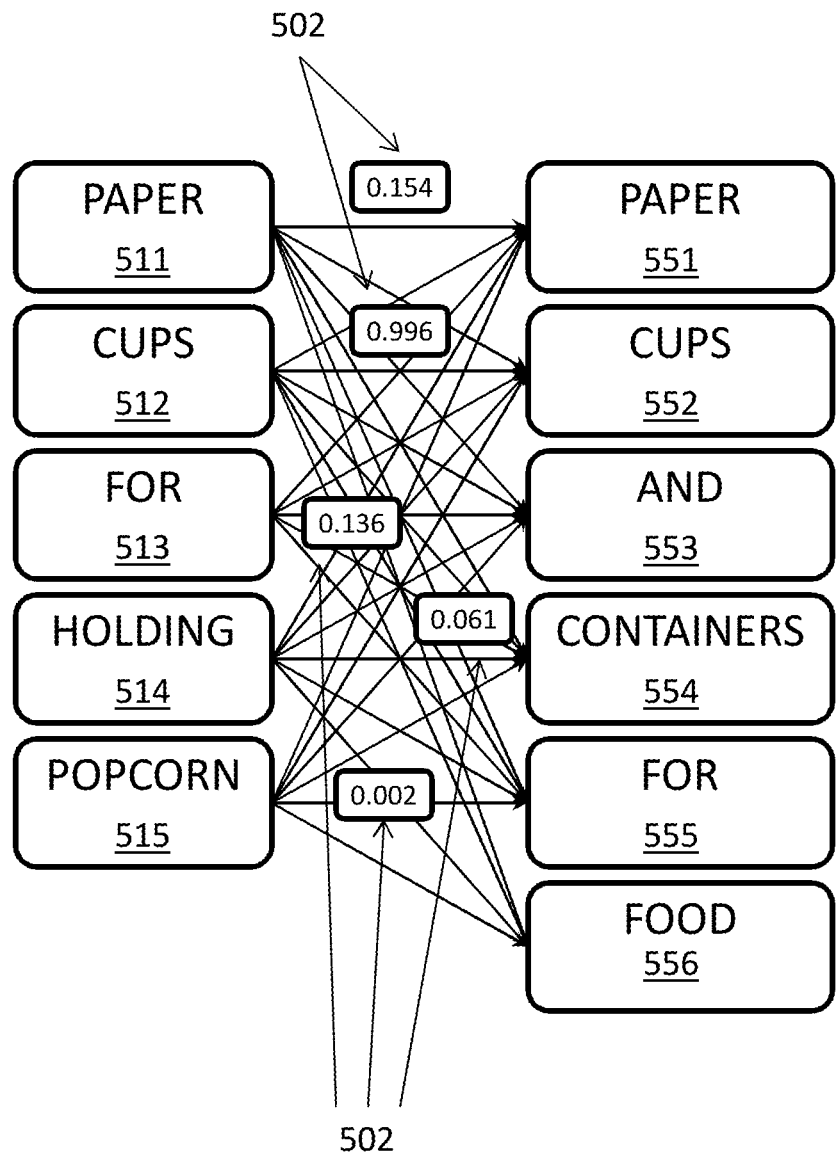
FIG. 5A shows class specific similarity scores being generated between tokens of a first description of goods and/or services and tokens of a second description of goods and/or services based on class specific scores in accordance with embodiments of the present disclosure.
Figure 5B:
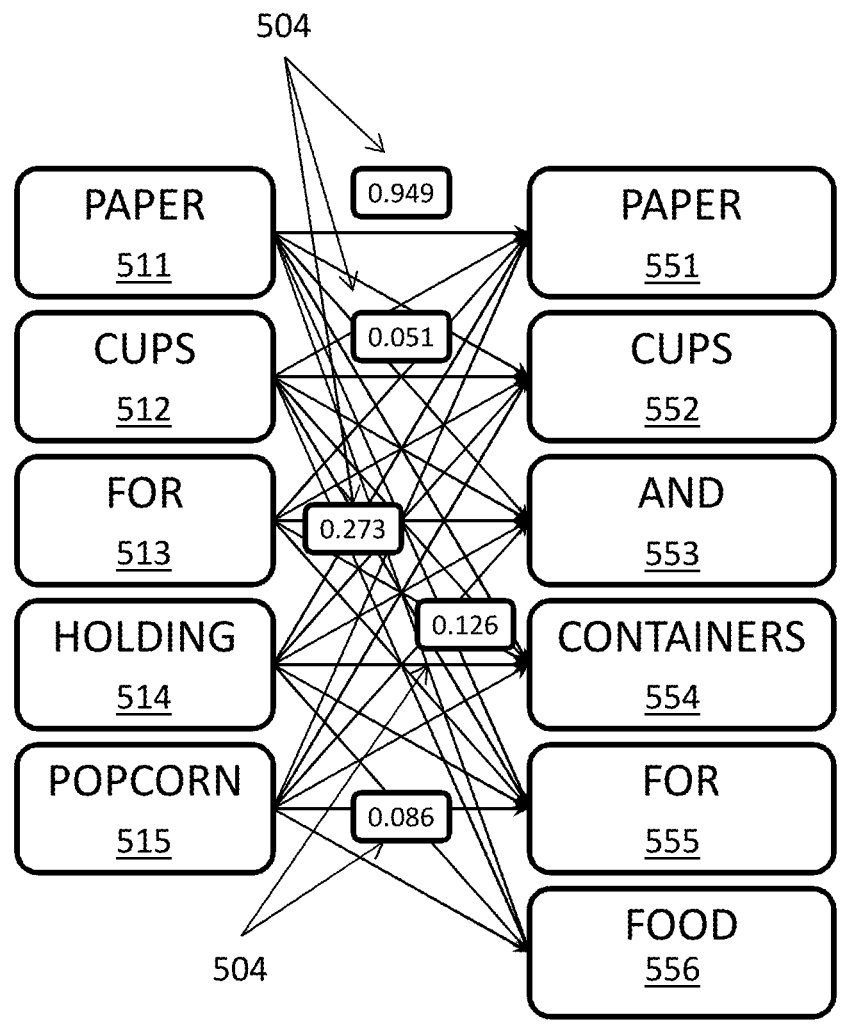
FIG. 5B shows similarity scores being generated between tokens of a first description of goods and/or services and tokens of a second description of goods and/or services based on excluded class specific scores.

Similarity scores between two descriptions of goods and/or services T and U can be generated by the distribution analyzer 110 based on the class specific scores and the excluded class specific scores. FIG. 5A shows class specific similarity scores 502 being generated between tokens 511-515 (e.g., tokens $t_1$ to $t_n$) of a first description of goods T (e.g., PAPER CUPS FOR HOLDING POPCORN) and tokens 551-556 (e.g., tokens $t_1$ to $t_m$) of a second description of goods U (e.g., PAPER CUPS AND CONTAINERS FOR FOOD) based on class specific scores and FIG. 5B shows similarity scores 504 being generated between tokens 511-515 of a first description of goods and/or services T and tokens 551-556 of a second description of goods and/or services U based on excluded class specific scores.

When determining a description similarity between the reference description of goods and/or services and one of the descriptions of goods and/or services in the set of trademark data 140, the distribution analyzer 110 can utilize a similarity function to determine the similarity between the two descriptions of goods and/or services by determining the normalized similarity of the two descriptions of goods and/or services based on the class specific score and determining the similarity of the two descriptions of goods and/or services based on the excluded class specific score and combining these (potentially weighted) in an overall score.

Referring still to FIG. 1, the machine learning engine 120 can utilize the vectors generated for tokens based on word relatedness using the training data to generate word relatedness similarity scores between two tokens. For example, similarity scores between tokens in the reference description of goods and/or services and tokens in one of the description of goods and/or services in the set of trademark data 140 can be generated by the machine learning engine 120.

The similarity engine 100 can use one or more of the similarity scores generate by the distribution analyzer 110 and/or machine learning engine 120 to generate an overall similarity score. The similarity engine 100 can use the word relatedness similarity score, the distribution similarity score, the class specific similarity scores, the excluded class specific similarity scores, and/or a combination thereof. For example, the similarity engine can generate an aggregate of the similarity scores. Each similarity score that forms the aggregate can be assigned a weighting factor to emphasis some of the similarity scores contributions to overall similarity score and to de-emphasize some of the similarity scores contributions to the overall similarity score. In some embodiments, the similarity engine 100 can select the greater of the word relatedness similarity score or the distribution similarity score as a contributing similarity score to the overall similarity score or can select both the word relatedness similarity score and the distribution similarity score as a contributing similarity scores for the overall similarity score.

The output of the goods and/or services similarity engine 100 can include the goods and/or services similarity scores and an association between the goods and/or services similarity scores and each of the corresponding descriptions of goods and/or services of the trademark. For example, the goods and/or services similarity engine 100 can output the class specific similarity score, the excluded class specific similarity score, and the overall similarity score for each comparison between the reference description of goods and/or services and the descriptions of goods and/or services in the set of trademark data 140.

The goods and/or services similarity values output by the similarity engine can be used, for example, in post-search processes after search results have been retrieved from the trademark repository and before the results are presented to the user via a graphical user interface. For example, the similarity values can be used by a search engine to facilitate detection of trademarks in the search results that are more relevant to a search string received from a user (e.g., a trademark name, a reference description of goods and/or services, and associated classes). In embodiments of the present disclosure, the trademarks returned by a search that have the highest similarities between the reference description of goods and/or services and the description of goods and/or services for the trademarks can be ranked or prioritized by the search engine based on the similarity values to present those trademarks to a user as being particularly relevant or important. In the same way, these goods and/or services similarity values can be used to filter away those trademarks that are below a certain threshold of relevancy to the user.

The goods and/or services similarity values output by the goods and/or services similarity engine 100 can be used, for example, in search processes of a search engine to facilitate robust query generation and repository searches to not only identify trademarks that include an identical description of goods and/or services to the reference description of goods and/or services, but also to automatically, and without user intervention, expand the queries and search to include variations of the reference description of goods and/or services and/or of words/terms in the reference description of goods and/or services that are similar to the reference description of goods and/or services and/or the words/terms in the reference description of goods and/or services. Using the similarity values generated by the similarity engine to define the search can provide for an enhanced and/or improved traversal of the source repositories to retrieve a robust set of data that is relevant to the user. At the same time, the variations of the description of goods and/or services based on the output of the goods and/or services similarity engine 100 can preserve the meaning, context, and/or scope of the reference description of goods and/or services. Expansion of the queries and search in this manner can ensure that the repository is being efficiently searched to discover trademarks that are relevant to the reference description of goods and/or services without simply including trademarks in the results because they include one or more of the words/terms recited in the reference description of goods and/or services.

Figure 6:
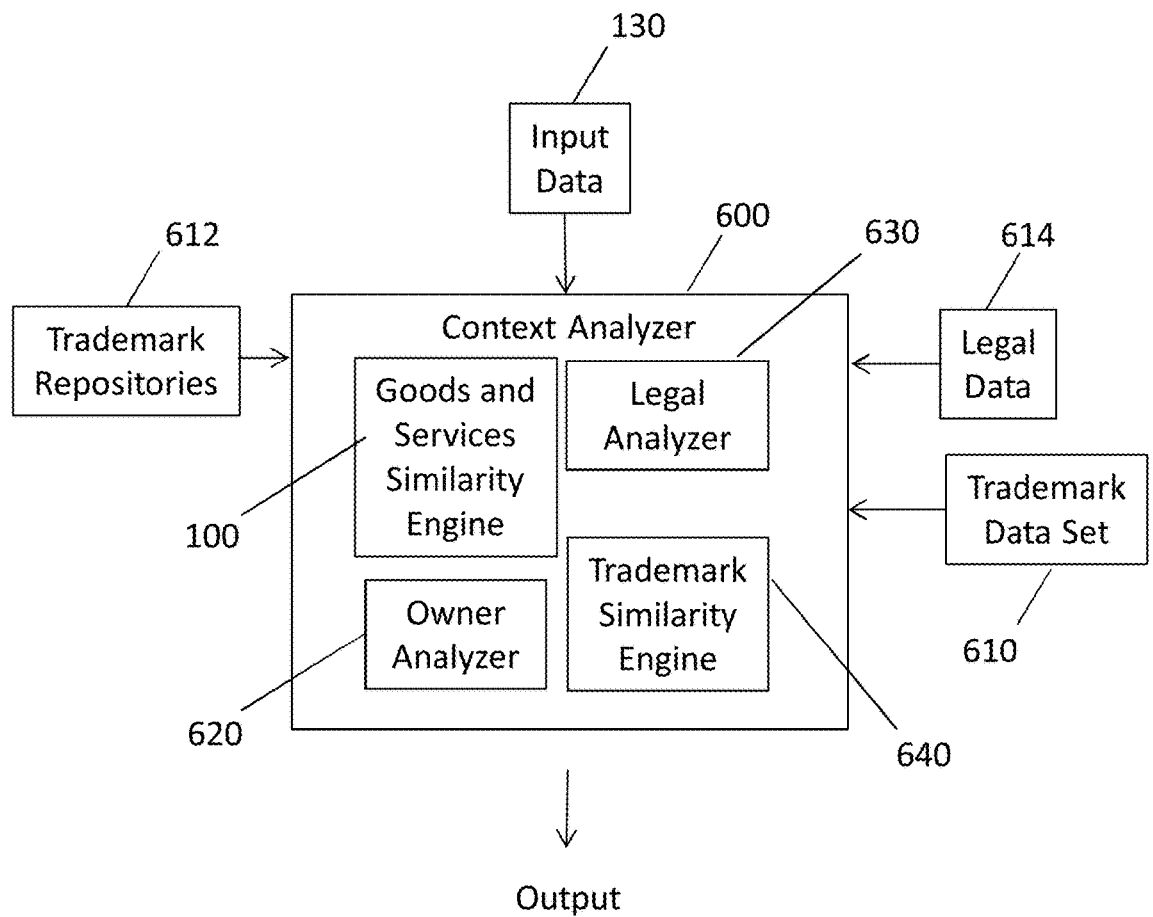
FIG. 6 is a block diagram of a context analyzer that can be implemented in accordance with embodiments of the present disclosure.

FIG. 6 is a block diagram of a context analyzer 600 that can be implemented in accordance with embodiments of the present disclosure to perform contextual analysis of one or more data sets. The context analyzer 600, or portions thereof, can operate as a standalone component, can be incorporated in an information retrieval system to facilitate post-processing of data retrieved from one or more repositories, and/or can be implemented in other suitable systems. For example, the context analyzer can generate and evaluate search results based on one or more attributes to rank and/or prioritize the search results in the presentation to a user. As shown in FIG. 6, the context analyzer 600 can include an embodiment of the similarity engine 100, an owner analyzer 620, a legal analyzer 630, and a trademark similarity engine 640. The outputs of the similarity engine 100, the owner analyzer 620, the legal analyzer 630, and/or the trademark similarity engine 640 can be used in combination and/or independently to rank and/or prioritize the search results. The similarity engine 100 can be trained and operate in the manner described herein to output one or more similarity values.

The owner analyzer 620 can output an owner score for trademarks returned for a trademark search. In exemplary embodiments, the owner analyzer 620 can receive the trademark data 610 in the search results, including trademarked names, the names of owners of the trademarks, the geographic locations of the owners, the classes associated with the trademarked names, and/or any other suitable information. In addition to receiving the trademark returned by the search, the owner analyzer 620 can be trained based on contents of one or more trademark repositories 612 that include registered trademark data, such as trademarked names, descriptions of goods associated with the trademark names, owners of the trademarked names, address of the owners of the trademarked names, classes associated with the trademarked names, and/or any other suitable information.

In exemplary embodiments, the owner analyzer 620 can generate an owner spread that correspond to the geographic scope of trademarks owned the by the owner. The owner analyzer 620 can use any definition and/or combination of regions of the world, such as Africa, Asia, Caribbean, Central America, Europe, Middle East, North America, Oceania, South America, and the like. To determine the owner spread, for each trademark returned in the search results, the owner analyzer 620 can identify the owner of the trademark, and then based on the data from the trademark repositories, the trained owner analyzer 620 can assign the owners of each returned trademark in the search results a spread, which can be "local", "regional", "multi-regional", and/or "world-wide" or use any other definition of increasing/decreasing globality. As a basic non-limiting example, if the owner analyzer 620 determines that all of the trademarks owned by an owner are in one country, the owner analyzer 620 assigns the "local" spread to the owner. If the owner analyzer determines that all of the trademarks owned by the owner are in one region, the owner analyzer 620 assigns the "regional" spread to the owner. If the owner analyzer determines that the trademarks owned by the owner are distributed between two regions, the owner analyzer 620 assigns the "multi-regional" spread to the owner. If the owner analyzer 620 determines that the trademarks owned by the owner are distributed between more than two regions, the owner analyzer 620 assigns the "world-wide" spread to the owner.

The owner analyzer 620 can determine a portfolio size for each owner of trademarks returned by the search. The portfolio size and the owner spread can be used by the owner analyzer 620 to generate a base owner score. As an non-limiting example, the base owner score can be generated for each owner identified in the search results based on, for example, the following table (Table 1)

TABLE 1

Base Owner Score

| | | Owner Spread | | | |
|---|---|---|---|---|---|
| | | Local | Regional | Multi-Regional | World-Wide |
| Portfolio Size | Small | 0 | 0 | 1 | 2 |
| | Medium | 0 | 0 | 1 | 2 |
| | Large | 1 | 1 | 1 | 2 |
| | Extra Large | 2 | 2 | 2 | 2 |

The portfolio size can be specified by the owner analyzer 620 based on the number of trademarks owned by an owner. For example, if an owner in the returned search results owns a quantity of trademarks that is less than a first value (e.g., ten trademarks), the owner analyzer 620 can assign the "small" portfolio size to the owner. If an owner in the returned search results owns a quantity of trademarks in a range between the first value and a second value (e.g., between ten and one hundred trademarks), the owner analyzer 620 can assign the "medium" portfolio size to the owner. If an owner in the returned search results owns a quantity of trademarks in a range between the second value and a third value (e.g., between one hundred and one thousand trademarks), the owner analyzer 620 can assign the "large" portfolio size to the owner. If an owner in the returned search results owns a quantity of trademarks that exceeds the third value (e.g., between ten and one hundred trademarks), the owner analyzer 620 can assign the "extra-large" portfolio size to the owner. The owner analyzer 620 can assign the base owner score based on the portfolio size and owner spread assigned to an owner, the owner analyzer 620 can assign. For example, as shown in Table 1, if the owner's portfolio size is "small", and the owner spread is "local", the base owner score is determined to be zero, but if the owner's portfolio size is "small", and the owner spread is "worldwide", the base owner score is determined to be two.

The owner analyzer 620 can add to the base owner score to generate an overall owner importance score based on additional analysis of trademark owner data. As one example, if for the trademark name to be searched, a threshold of quantity of trademarked names are returned as a result of the search, and an owner of a trademarked name returned by the search shares one or more similar terms with one or more of those trademarked names returned (e.g., if the trademark names and the name of the owner have one or more identical or similar terms), the owner analyzer 620 can emphasize the similarity by adding to the base owner score. The rationale for this being that a trademarked name that is very similar to the name of the owner is likely of higher importance to the owner as compared to a trademark which has no resemblance to the owner's name. If the owner analyzer 620 determines that there is similarity between the owner name and the threshold quantity of trademark names is satisfied, the owner analyzer 620 can add a specified number to the base owner score (e.g., three). If the owner analyzer 620 determines that there is no similarity between the owner name and the threshold quantity of trademark names is not satisfied, the owner analyzer 620 does not add to the base owner score.

As another example, if a quantity of trademarked names associated with a given owner are returned by a search that are similar to the trademark name input by the user and being searched exceeds a first threshold value and is less than a second threshold value, the owner analyzer 620 can add a first number to the base owner score (e.g., two). If the quantity of trademarked names associated with a given owner are returned by a search that are similar to the trademark name input by the user and being searched exceeds the second threshold value, the owner analyzer 620 can add a second number to the base owner score (e.g., three). If the quantity of trademarked names associated with a given owner are returned by a search that are similar to the trademark name input by the user and being searched does not exceed the first threshold value, the owner analyzer 620 does not add to the base owner score. Any number of threshold values can be used this way. The overall owner importance score can be projected on to an interval from zero to one hundred (e.g., projected owner score equals one hundred multiplied by the quotient of overall score divided by the maximum possible overall owner importance score). The projected owner score can be output by the owner analyzer 620 and used in conjunction with the output of the similarity engine 100 to generate a context score for a give trademark-owner combination.

The legal analyzer 630 can output a legal score for trademarks and owners of trademarks returned in response to a trademark search. In exemplary embodiments, the legal analyzer 630 can receive the trademark data in the search results, including trademarked names, the names of owners of the trademarks, the geographic locations of the owners, the classes associated with the trademarked names, and/or any other suitable information. In addition to receiving the trademark returned by the search, the legal analyzer 630 can be trained based on contents of one or more repositories 614 storing judicial and/or administrative proceeding associated with trademarks. For example, the one or more repositories 614 include legal and/or administrative proceedings for oppositions, cancelations, infringement, dilution, and/or the like. As one example, the repositories maintained by the U.S. Patent and Trademark Office for the trademarks trails and appeal board (TTAB) can be used to train the legal analyzer regarding administrative proceedings associated with particular trademarks and/or owners. The legal analyzer 630 can determine whether the trademark has be implicated in a judicial/administrative proceeding (and in what role) as well as a frequency with which the trademark has been implicated in a judicial/administrative proceeding. Likewise, the legal analyzer 630 can determine whether the owner has been implicated in a judicial/administrative proceeding as well as the frequency with which the owner has been implicated in judicial/administrative proceedings. Based on these determinations, the legal analyzer can generate the legal score for a trademark and/or a trademark owner.

As a non-limiting example, to determine the legal score for each trademark included in the results of the search, the legal analyzer 630 can initially set the legal score to zero. Subsequently, each trademark is analyzed against the judicial/administrative repositories to determine whether the trademark is involved in a trademark trial and appeal board proceeding in opposition against a similar trademark to that included in the search (e.g., in the input string received from the user). If so, the legal analyzer 630 sets the legal score to a first value (e.g., one hundred). If the trademark has not been opposed, but the owner of the trademark returned by the search has been involved in a trademark trial and appeal board proceeding in opposition against a trademark, the legal analyzer 630 sets the legal score to a second value (e.g., seventy five). If a trademark returned by the search is involved in a trademark trial and appeal board proceeding as a plaintiff, then the legal score is set to a third value based on a current value of the legal score (e.g., the legal score is set to legal score+(100−score)/2). If the owner of a trademark returned by the search is involved in a trademark trial and appeal board proceeding as a plaintiff and the legal score is currently zero, the legal analyzer sets the legal score a fourth value (e.g., twenty five). The legal score can be output by the legal analyzer 630 and used in conjunction with the output of the similarity engine 100 and the output of the owner analyzer 620 to generate a context score for a give trademark-owner combination.

The trademark similarity engine 640 can be configured to receive input data 130 including an input string forming a trademark string to be searched. The trademark similarity engine 640 to generate a trademark similarity score. The trademark similarity score can be based on, for example, similarity measures (prefix, suffix, string edit distance, and the like) on visual, phonetic, semantic, translation, morphological and transliterated representations of the trademarks returned by the search. The similarity measures can be used to determine and quantify similarities between the trademarks returned by the search and the trademark string received from the user. The trademark similarity score can be a number but also can be a string that reflects retrieval logic used to implement the similarity process as described herein.

The trademark similarity score can be output by the trademark similarity engine 640 and used in conjunction with the output of the similarity engine 100, the output of the owner analyzer 620, and the output of the legal analyzer 630 to generate a context score for a given trademark-owner combination. For example, the context score can be an aggregation of one or more of the similarity scores output by the goods similarity engine 100, the projected owner score output by the owner analyzer 620, the legal score output by the legal analyzer 630, and/or the trademark similarity score output by the trademark similarity engine 640. The context score can be utilized by the context analyzer to rank, sort, and/or prioritize the results of a search for presentation to a user via a graphical user interface. In addition, each of the results can be selectable to navigate to graphical user interfaces that provide an analysis of the output of each of the similarity engine 100, the owner analyzer 620, the legal analyzer 630, and the trademark similarity engine 640.

Figure 7:
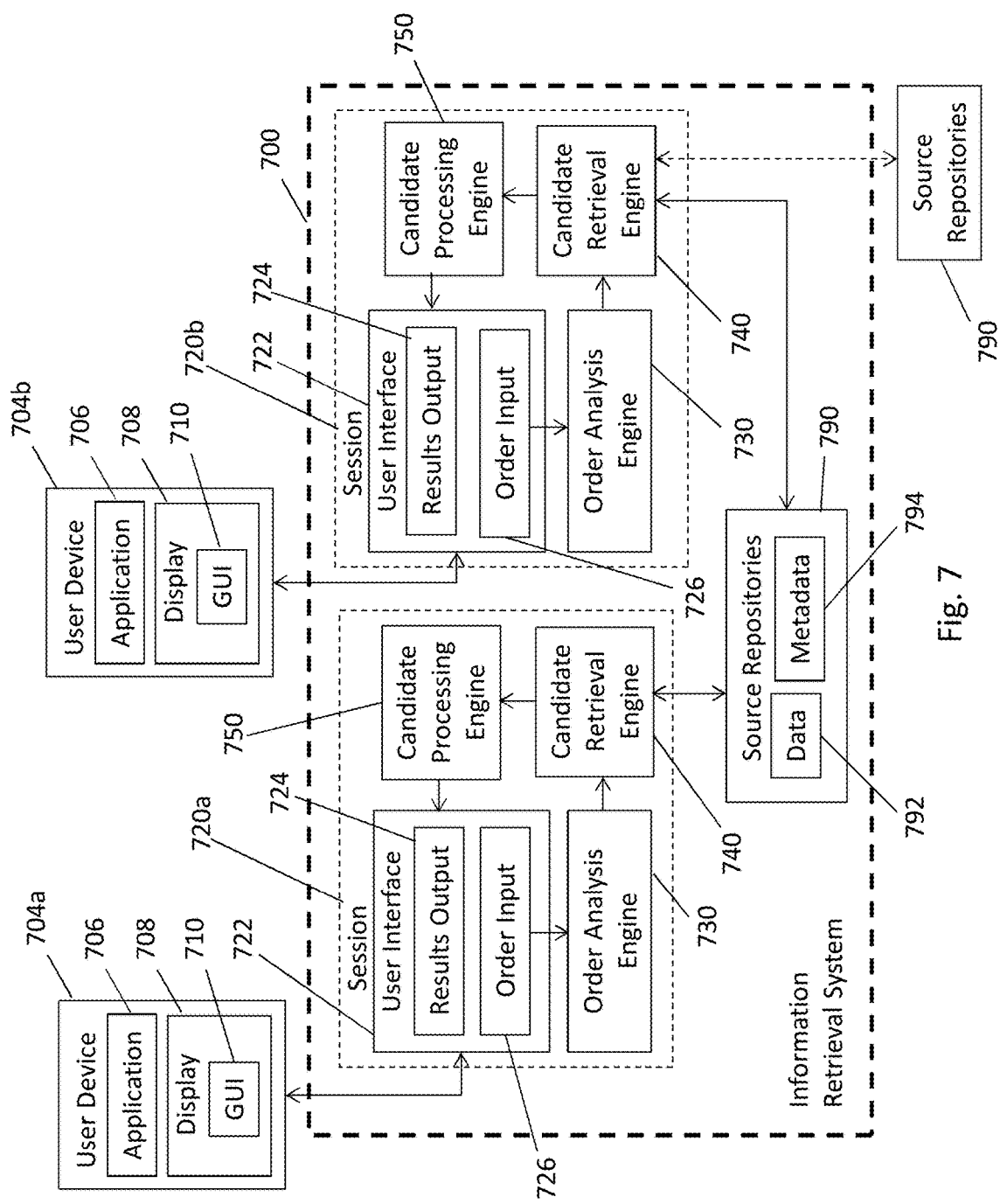
FIG. 7 is a block diagram depicting an information retrieval system in accordance with exemplary embodiments of the present disclosure.

FIG. 7 is a block diagram depicting an information retrieval system 700 for implementing a search engine in accordance with exemplary embodiments of the present disclosure. In exemplary embodiments, the information retrieval system 700 can be implemented by one or more servers and one or more repositories, which can communicate directly with each other and/or may communicate with each other via one or more communication networks as described herein. In some embodiments, user devices 704*a*-*b* can interact with the information retrieval system 700 to establish communication sessions 720*a*-*b*, respectively, to maintain a state of the communication between the user devices 704*a*-*b* and the information retrieval system 700. In some embodiments, the communication between the user devices 704*a*-*b* and the information retrieval system 700 can be sessionless or stateless. The user devices 704*a*-*b* can be computing devices (including a personal computer, a workstation, a tablet, a smart phone, a laptop, a server, and the like) configured to communicate with the information retrieval system 700 over one or more communication networks using one or more communication protocols.

For embodiments that manage a state of the communication, the sessions 720*a*-*b* persist for a period of time (e.g., from the time a user logs into or otherwise accesses the information retrieval system 700 to the time the user logs out of or disconnects from the information retrieval system 700 or until the session times out), can facilitate bidirectional communication between the information retrieval system 700 and the user devices 704*a*-*b*, and can maintain a state of the communication between the information retrieval systems 700 and the user devices, respectively. For example, the information retrieval system 700 can save information about the session history and/or can instruct and/or control the user devices 704*a*-*b* to save information about the session history (e.g., in the form of tokens and/or cookies) to enable the communication.

The user devices 704*a*-*b* can each include an application 706, such as a web browser or a stand-alone application specific to the information retrieval system 700. The application 706 can be downloaded, installed, and executed by the user devices 704*a*-*b* (e.g., by a processing device) to interact with the information retrieval system 700 and/or to render one or more graphical user interfaces (GUIs) 708 associated with the information retrieval system 700 on a display device 710 of the user devices 704*a*-*b* in response to, for example, data and/or instructions received from the information retrieval system 700. The GUIs 708 displayed to users can include data entry areas to receive information from the user; can include user-selectable elements or areas that can be selected by the user to cause the information retrieval system 700 to perform one or more operations, functions, and/or processes; and/or can include data outputs to display information to users. In exemplary embodiments, the GUIs 708 can enable navigation and/or traversal of the information retrieval system 700. Users can interact with the user devices 704*a*-*b* via the GUIs 708 to enter search orders to be submitted to the information retrieval system 700 and to view search results output by the information retrieval system 700.

In exemplary embodiments, the information retrieval system 700 can implement one or more instances of a user interface engine 722 for each user device interaction (e.g., an instance for each of the sessions 720*a*-*b*), and the instances of the user interface engine 722 can be programmed to transmit data and/or instructions to the user devices 704*a*-*b*, which can be used by the user devices 704*a*-*b* to render content of the GUIs 708 on the display devices 710. The users' devices 704*a*-*b* can interact with the information retrieval system 700 using the GUIs 708 to perform one or more activities in information retrieval system 700. As one example, the users can construct, via the GUIs 708, search orders including text-based strings forming one or more search terms, and may submit the search orders to the information retrieval system 700 (e.g., as order inputs 726 received via the user interface engine 722). The system 700 can perform one or more processes in response to the search request. For example, the system 700 can perform order analysis processes, which can be implemented by instances of an order analysis engine 730; candidate retrieval processes, which can be implemented by instances of a candidate retrieval engine 740; and/or candidate presentation processes, which can be implemented by instances of a candidate presentation engine 750, in accordance with embodiments of the present disclosure.

In exemplary embodiments, the instances of the order analysis engine 730 can receive search orders including search terms from the user devices 704*a-b* (e.g., entered by users via the GUIs 708), and can programmatically examine the orders and define the manner with which the orders will be processed by the information retrieval system 700. As one example, the order analysis engine 730 can generate a search strategy, based on the search terms of an order, that includes directives that define how the order is processed by the candidate retrieval engine 740 and the candidate presentation engine 750. The search strategy can include the information necessary to effectively carry out the candidate retrieval and presentation processes as described herein. As part of the search strategy generation, the order analysis engine 730 can apply order rules and natural language resources to annotate or otherwise modify the order to include the directives. As another example, the order analysis engine 730 can identify semantic equivalents of search terms in an order and can identify recognized concepts based on the search terms and semantic equivalents, which can be used to identify rules to be used during candidate retrieval and/or presentation processes of the information retrieval system 700.

The candidate retrieval engine 740 can generate one or more queries in one or more query languages based on, for example, a search strategy or rules identified by the order analysis engine 730. Using the generated queries, the candidate retrieval engine 740 can retrieve data 792 and metadata 794 from one or more source repositories (or databases) 790. The generation of the one or more queries transform the original search order into a robust set of precise queries that are generally defined to provide a comprehensive and robust set of search results according to the syntax or encoding associated with the source repositories 790.

In exemplary embodiments, the one or more source repositories 790 that can be searched by the candidate retrieval engine 740 can include the data 792 and metadata 794 associated with the data 792. In exemplary embodiments, the data 792 can include any suitable content or data that may be stored in a repository and retrieved in response to one or more queries (e.g., including documents, text, images, video audio), and the metadata 794 can generally be any metadata related to the source data 792. In some embodiments, one or more of the source repositories 790 can be included in the system 700 and/or one or more source repositories can be external to, and separate from, the system 700. In some embodiments, the source repositories 790 can include proprietary repositories including enriched metadata that can be generated automatically or manually to improve the search capabilities of the source repositories 790.

The candidate presentation engine 750 can receive the search results returned by the candidate retrieval engine 740, and can process the search results to prepare the data and metadata included in the search results for transmission to the requesting user device (e.g., user device 704*a* or 704*b*) via the results output 724 of the user interface engine 722. In exemplary embodiments, the candidate presentation engine 750 can perform one or more functions including scoring the search results, grouping the search results based on the metadata or the data itself, filtering the search results to create a subset of results to be transmitted to the user device, and preparing presentation instructions to be transmitted with the search results to instruct the user device how to display the search results in the GUIs 708 rendered by the display devices 706.

Figure 8:
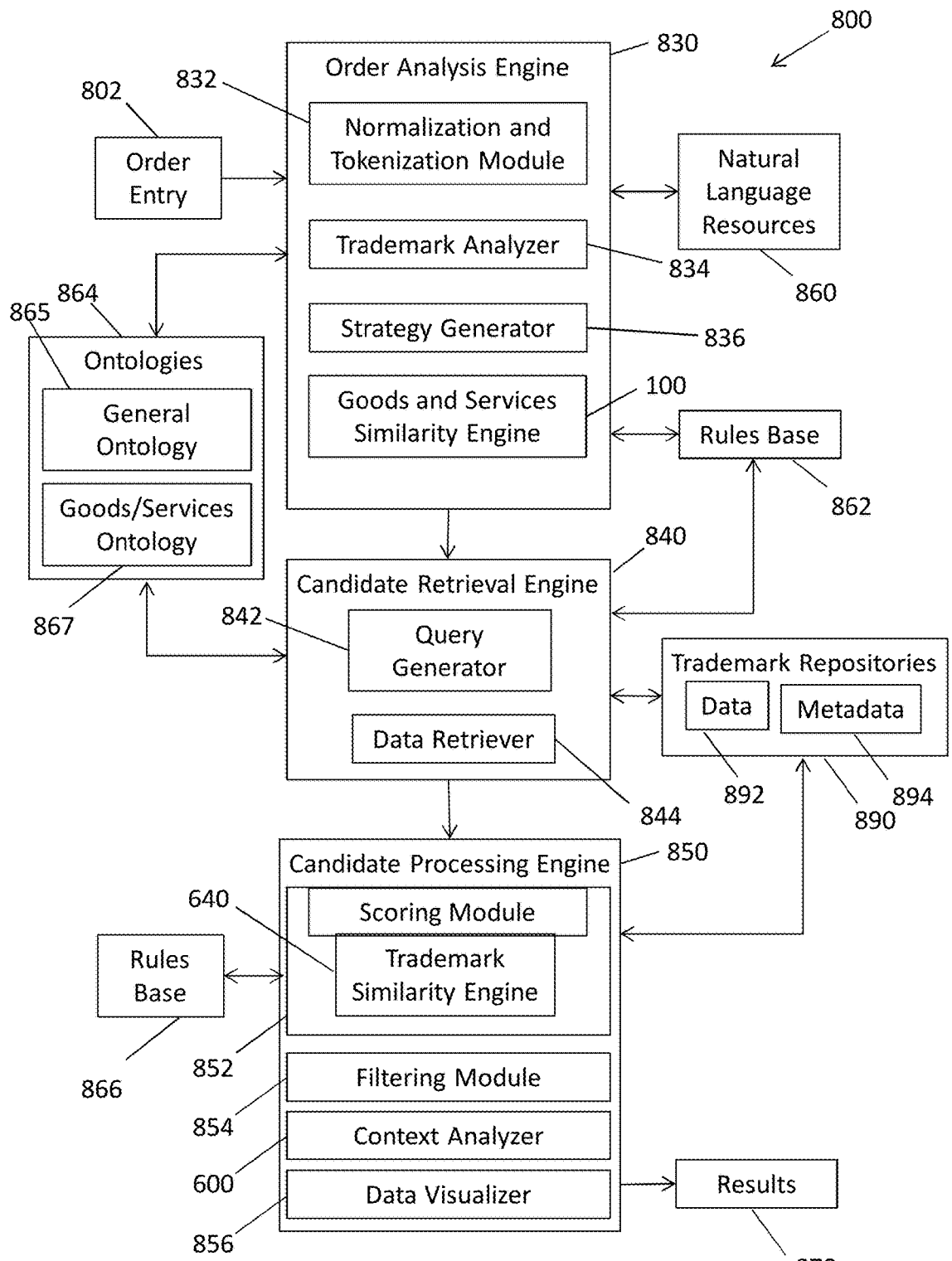
FIG. 8 is a block diagram of an exemplary embodiment of an information retrieval system that identifies confusingly similar word-based trademarks or service marks (e.g., word marks) based on a user supplied search order or request.

FIG. 8 is a block diagram of an exemplary embodiment of an information retrieval system 800 that implements a search engine for identifying confusingly similar word-based trademarks or service marks (e.g., word marks) based on a user supplied search order. The system 800 can include an order analysis engine 830, a candidate retrieval engine 840, and a candidate presentation engine 850. A user of the system 800 can submit, via one or more graphical user interfaces, an order 802. In response to the order 802, the system 800 can output a set of results that have been specifically generated to provide the user with a set of registered trademarks that may be confusingly similar to the order 802 (e.g., based on an operation of the engines 830, 840, and 850). For these trademarks, the results can include metadata associated with relevant information about the trademarks to identify, for example, the trademark office that published trademark document, the registration number, the date of registration, the owner of the trademark, the descriptions of goods and/or services, the trademark classes, the next renewal date or window, and/or any other suitable information about the trademark.

As described herein, the order 802 can include an input string (e.g., of textual elements) forming one or more words for the trademarks that the user wishes to search. The order 802 can also include international classes to be searched (e.g., as defined in the World Intellectual Property Organization (WIPO) classification) and lists of jurisdictions to be searched, as well as a list of input strings forming one or more words that indicate for which goods and services the searched trademark(s) will be or are associated with (e.g., a reference description of goods and/or services). Those skilled in the art will recognize that any suitable input string can be submitted by a user in any language using any recognized glyphs including Latin and non-Latin characters. The following input strings are provided as non-limiting examples to aid in describing an operation of various components of the system.

BOLUGREDO
MATCH
YELLOW LION
TRESATRE Cleaning Services

The order analysis engine 830 can include a normalization and tokenization module 832, a trademark analyzer 834, and a strategy generator 836. The order analysis engine 830 can receive the search order 802 transmitted to the system 800 by a user device (e.g., in response to submission of the order 802 by the user via one or more GUIs). In exemplary embodiments, the order analysis engine 830 can programmatically examine the order 802 and define the manner with which the order 802 will be processed by the information retrieval system 700. For example, the order analysis engine 830 can generate a search strategy, based on the search terms formed by the text-based input strings, specified international trademark classes in the search order, the goods/ services specified in the search order, and/or other portions of the search order. The search strategy can define one or more directives which control how the order is processed by the candidate retrieval engine 840 and the candidate presentation engine 850. The search strategy can include the information necessary to effectively carry out the candidate retrieval and presentation processes as described herein.

The normalization and tokenization module 832 can receive the text-based input string of the order as an input and can output a set of strings that contains only characters that can be processed by the system 800 by applying order rules of a rules base 862 and natural language resources 860. The rules base 862 and natural language resources 860 can be created to mimic or simulate human thought process to aid in formulation of a search strategy. The normalization and tokenization module 832 can clean-up and validate the input string (i.e. the search terms), can split the input string into different elements (tokenization), and can normalize (e.g., by converting diacritics characters into non-diacritics characters, if needed, e.g. β to s or ss, or performing character or string manipulations) the input string or elements to identify common or standardized spellings and/or usage associated with the terms. The normalization and tokenization module 832 can generate phonetic equivalents for the tokenized and normalized input strings in the submitted human language and/or in different human languages.

When the input string includes compound strings, the normalization and tokenization module 832 can split or parse the compound strings into parts (e.g., separate words and/or semantic units). For example, the normalization and tokenization module 832 can use natural language resources 860 to determine whether the input string is actually a compound of multiple words that are concatenated. When the normalization and tokenization module 832 determines that the input string resembles natural language, the normalization and tokenization module 832 can determine a function of the words in the input string (e.g., parts of speech, such as adjective, verb, or noun). Similarly, when the normalization and tokenization module 832 determines that the input string resembles natural language, the normalization and tokenization module 832 identifies various possibilities for stemming and inflections of the words in the input string for inclusion in the search strategy.

The trademark analyzer 834 can receive the text-based input string and can output a set of strings including annotations using the rules of the rules base 862 to determine, for example, a relative importance of the different words in the text-based input string as they relate to words that may form a dominant portion of a trademark, which can aid in defining a degree of variation the information retrieval system 800 is permitted to apply to each of the words included in the input string during the candidate retrieval processes. Similarly, when the input string includes multiple words, the trademark analyzer 834 can determine which combinations of words in the input string are important/valuable as they relate to words that may form a dominant portion of a trademark. In exemplary embodiments, the trademark analyzer 834 can process the words included in the input string against a repository of words to identify semantically equivalent words in one or more languages, and can add the semantically equivalent words to the search strategy. The trademark analyzer 834 can annotate one or more terms in the set of output strings with several characteristics that can be either absolute or relative, like familiarity (how familiar would a certain word be to an average human user), term type (existing word, fantasy term, long or short word, abbreviation, and the like) and relative importance of that word within the trademark (e.g., only word, most important word, one of multiple equally important words, and the like).

Based on the output of the normalization and tokenization module 832 and the trademark analyzer 834, and/or the strategy generator 836 can generate or build a search strategy that includes one or more directives that can be used by the candidate retrieval engine 840 to generate one or more queries. Also, based on the output of the normalization and tokenization module 832 and the trademark analyzer 834, the strategy generator 836 can determine whether the text-based input string as a whole should be processed as a one word mark, a two word mark, a slogan, some other type of mark, and/or any combination thereof (e.g., a single order can be processed to include one or more of the aforementioned).

As one example, the strategy generator 836 can determine which phonetic equivalents identified by the normalization and tokenization module 832 to include in the search, whether the compounded words identified by the normalization and tokenization module 832 should be processed together as a single word and/or separately as individual words, and/or can determine which of the various possibilities for stemming and inflections of the words in the input string should be included in the search strategy. As another example, the strategy generator 836 can define a degree of variation in the search strategy to apply to each of the words included in the input string, can add word combinations identified by the trademark analyzer 834, and/or can determine which semantically equivalent words identified by the trademark analyzer 834 to include in the search strategy. The directives of the search strategy can be selected from a set of directives based on the analysis of the output from the normalization and tokenization module 832 and the trademark analyzer 834.

In exemplary embodiments, the order analysis engine 830, e.g., via the normalization and tokenization module 832 and strategy generator 836 can also process the one or more strings associated with the goods/services specified in the search order. As one example, exemplary embodiments of the order analysis engine 830 can include an embodiment of the goods and/or services similarity engine 100 to identify similar descriptions of goods and/or services and/or similar words/terms in the descriptions of goods and/or services to be used by the candidate retrieval engine 840. The goods and/or services similarity engine 100 can compare the description of goods and/or services included in the search order (e.g., a reference description of goods and/or services) against a repository of descriptions of goods and/or services to identify the similar descriptions of goods and/or services and/or the similar words/terms in the descriptions of goods and/or services. The goods and/or services similarity engine 100 can generate goods and/or services similarity scores and those descriptions of goods and/or services that satisfy a threshold score can be used in addition to the reference description of goods and/or services to generate directives and/or queries for candidate retrieval. As another example, the order analysis engine 830 can interface with one or more ontologies 864, such as a general term/word ontology 865, a goods/services ontology 867, and the like. The ontologies 864 can be utilized by the engine 830 to identify semantically related words. For example, the goods/services ontology can be utilized by the order analysis engine 830 to identify goods/services that are semantically related to the goods/services specified in the search order 802. The goods/services ontology can include a repository of terms (e.g., such as common terms for goods and services) and can be structured such that semantically related terms are linked or otherwise associated with each other. When a term in the goods/service specified in the search order is compared against the terms in the goods/services ontology, the goods/services ontology can map the term to its semantically related terms, and the order analysis engine 830 can use the semantically related terms to generate the search strategy.

Some search strategies that can be generated or built by the strategy generator 836 are described using the above example input strings "BOLUGREDO," "MATCH," "YELLOW LION," and "TRESATRE Cleaning Services."

With respect to the input string "BOLUGREDO," the output of the strategy generator 836 of the order analysis engine 830 is a search strategy containing directives that include all info needed to effectively carry out the retrieval and presentation processes described herein. As an example, the search strategy can be represented as follows:

Strategy→-BOLUGREDO {coined, length_long, no split, . . . }

As shown above, the input string has been modified to include directives. The directives are recognized by the system 700 and define how the system should process the search strategy. In the present example, the dash "-" before the input string can be a directive that indicates that the information retrieval system should obtain the broadest variation when processed by the candidate retrieval engine 840 and the candidate presentation engine 850. For example, the candidate retrieval engine 840 should include as many variation of the input string as possible (e.g., phonetic and semantic variations) when creating or building the queries and the candidate presentation engine should include a wide variation of trademarks in the results that are semantically and/or phonetically similar to the input string. The additional directives between the brackets "{" and "}" are used by the candidate retrieval engine 840 and the candidate presentation engine 850 when executing the rules base. For example, the additional term "coined" can instruct the candidate retrieval engine 840 to use the broadest variations available and trigger specific models suited for fantasy terms and can instruct the candidate presentation engine 850 to create, e.g., a representation of all matching terms combined with their frequency to give the user a quick (interactive) overview of what to expect in the final list, as well as the ability to reject certain (types of) matches; the additional term "length_long" can instruct the candidate retrieval engine 840 to trigger specific rules and associated retrieval models that would not make sense for short(er) words and can instruct the candidate presentation engine 850 to show a specific (interactive) representation indicating which parts of the word are found to be more or less distinctive in trademark space; and the additional term "no split" can instruct the candidate retrieval engine 840 to ignore rules and associated retrieval models that work specifically on terms that could also be split up into several individual terms and can instruct the candidate presentation engine 850 to ignore showing specific representations that indicate what exists in trademark space for specific split options of the original term or interactively allow the user decide on one or more splits anyway and feed that info back into the system 800.

With respect to the input string "MATCH," the search strategy generated by the strategy generator 836 can be represented as follows:

Strategy→-MATCH {dictionary (English), length_medium, no split, noun, . . . }

The dash "-" before the input string can be a directive that indicates that the information retrieval system should obtain the broadest variation when processed by the candidate retrieval engine 840 and the candidate presentation engine 850, while taking into account the additional directives between the brackets "{" and "}". For example, the candidate retrieval engine 840 should include as many variation of the input string as possible (e.g., phonetic and semantic variations) when creating or building the queries, and the candidate presentation engine 850 should include a wide variation of trademarks in the results that are semantically and/or phonetically similar to the input string.

The additional directives between the brackets "{" and "}" are used by the candidate retrieval engine 840 and the candidate presentation engine 850 when executing the rules base. For example, the additional term "dictionary (English)" can instruct the candidate retrieval engine 840 to trigger specific rules and associated retrieval models that work on natural language words (e.g., inflections, translations, etc.), while ignoring models that, e.g., turn an existing word into a similar looking or sounding but semantically different word and can instruct the candidate presentation engine 850 to indicate to the user specific decisions were made (such as ignoring the semantically different but otherwise similar words so the user can reverse that decision if he or she deems them relevant despite the decision made by the system 800) the additional term "length_medium" can instruct the candidate retrieval engine 840 to ignore rules and associated retrieval models that are specifically designed for very short or very long words or trigger these with different constraints (such as allowing more or less variation than the model usually allows depending on whether the word is longer or shorter respectively) and can instruct the candidate presentation engine 850 to indicate which specific decisions were taken as compared to the treatment of either a longer or shorter word; the additional term "no split" can instruct the candidate retrieval engine 840 to ignore rules and associated retrieval models that work specifically on terms that could also be split up into several individual terms and can instruct the candidate presentation engine 850 to ignore showing specific representations that indicate what exists in trademark space for specific split options of the original term or interactively let the user decide on one or more splits anyway (if the system incorrectly split the original term) and feed that info back into the retrieval engine 840; and the additional term "noun" can instruct the candidate retrieval engine 840 to, e.g., understand semantic equivalents should also be nouns so other part of speech words can be ignored as alternatives and can instruct the candidate presentation engine 850 to indicate to the user why specific semantic alternatives were picked, or allow the user to indicate other part of speech options he or she deems valid as well (or instead) and feed that info back into the retrieval engine.

With respect to the input string "YELLOW LION," the search strategy generated by the strategy generator 836 can be represented as follows:

Strategy → (/YELLOW/LION)
/YELLOW{dictionary(English),<COLOR>, length_normal, adjective,... }
/LION{dictionary(English), <ANIMAL>, length_short, noun,...}

As shown above, the system 800 has transformed the input strings into combined and separate terms, where of the terms generated by the system 800 has been annotated with directives. The forward slashes "/" can be a directive that indicates that the individual words should contain reduced variation (e.g., because the word that is preceded by a slash is considered as not being dominant in the trademark, or not being a very strong word). The parentheses "(" and ")" can be directives that indicate that the search should also include the conjoined word YELLOWLION and variations thereof (e.g., semantic, phonetic, or otherwise). The additional directives between the brackets "{" and "}" for each word/element are used by the candidate retrieval engine 840 and the candidate presentation engine 850 when executing the rules base.

For example, the additional term "dictionary(English)" can instruct the candidate retrieval engine 840 to trigger specific models that deal with language dependent alternatives (semantic alternatives—preferably in English, translations where the word should be interpreted as being in English, inflections—preferably in English, and the like) and can instruct the candidate presentation engine 850 to indicate English specific and natural language specific logic was used for each of the words YELLOW and LION; the additional term "<COLOR>" can instruct the candidate retrieval engine 840 to trigger specific semantic resources that provide alternative colors or words related to the concept of color and can instruct the candidate presentation engine 850 to indicate the reason why specific alternatives for a given word were preferred over others; the additional term "length normal" can instruct the candidate retrieval engine 840 to avoid triggering rules and associated retrieval models tuned specifically for (very) short or (very) long words not appropriate here, or call these models but with constraints different than the ones they usually apply and can instruct the candidate presentation engine 850 to indicate the reason(s) why certain models were not triggered (so the user knows what not to look for since it will not be there anyway, like e.g. typical variations the machine only considers for very long words); the additional term "adjective" can instruct the candidate retrieval engine 840 to, e.g., guide semantic alternative logic to prefer semantic alternatives that also have "adjective" as their typical part of speech over other semantic alternatives and can instruct the candidate presentation engine 850 to let the user know that behavior was picked by the engine, giving the user the ability to correct this if he/she finds that result invalid or valid yet undesirable and feed that information back into the retrieval engine; the additional term "<ANIMAL>" can instruct the candidate retrieval engine 840 to trigger very specific semantic resources that propose other animals as retrieval terms, despite these terms being neither phonetically nor visually similar to the original term and can instruct the candidate presentation engine 850 to indicate to the user why these other animals were seen as alternatives for this word, despite their phonetic/visual difference; the additional term "length_short" can instruct the candidate retrieval engine 840 to trigger specific logic only suited for short(er) words, and ignore logic that only produces valid results for longer words, or trigger that logic with other constraints better suited for shorter words and can instruct the candidate presentation engine 850 to indicate to the user why certain logic was executed and other logic was not; and the additional term "noun" can instruct the candidate retrieval engine 840 to e.g. understand semantic equivalents should also be nouns so other part of speech words can be ignored as alternatives and can instruct the candidate presentation engine 850 to indicate to the user why specific semantic alternatives were picked, or allow the user to indicate other part of speech options he or she deems valid as well (or instead) and feed that info back into the retrieval engine.

With respect to the input string "TRESATRE Cleaning Services," the search strategy generated by the strategy generator 836 can be represented as follows:

```
Strategy → -TRESATRE/CLEANING/SERVICES
-TRESATRE {dominant, coined, length_long, no split, ...}
/CLEANING {submissive, dictionary (English), length_medium,
goods_related,
stem(CLEAN), ...}
/SERVICES {submissive, dictionary (English), length_medium,
goods_related,
stem(SERVICE), ...}
```

In the present example, the dash "-" before the element TRESATRE can be a directive that indicates that this is the most important element of the search order (since the other words CLEANING and SERVICES are preceded by a directive in the form of a forward slash "/"). The elements CLEANING and SERVICES are processed by the system 800 taking into account their additional directives included in the brackets "{" and "}".

As one example, the additional term "dominant" can instruct the candidate retrieval engine 840 to explore more variations for this term than for the other terms of the trademark and can instruct the candidate presentation engine 850 to indicate to the user this term was seen as the most important (and most to be varied on) term in the trademark, allowing the user to change this behavior by giving feedback on this dominance (indicating this word is not dominant and potentially indicating other trademark words that are instead, or in addition to it); the additional term "coined" can instruct the candidate retrieval engine 840 to use the broadest variations available and trigger specific models suited for fantasy terms and can instruct the candidate presentation engine 850 to create, e.g., a representation of all matching terms combined with their frequency (and/or other relevant information) to give the user a quick (interactive) overview of what to expect in the final list, as well as the ability to reject certain (types of) matches; the additional term "length_long" can instruct the candidate retrieval engine 840 to trigger specific rules and associated retrieval models that would not make sense for short(er) words and can instruct the candidate presentation engine 850 to show a specific (interactive) representation indicating which parts of the word are found to be more or less distinctive in trademark space; and the additional term "no split" can instruct the candidate retrieval engine 840 to ignore rules and associated retrieval models that work specifically on terms that could also be split up into several individual terms and can instruct the candidate presentation engine 850 to ignore showing specific representations that indicate what exists in trademark space for specific split options of the original term or interactively allow the user decide on one or more splits anyway and feed that info back into the system 800. As another example, the additional term "submissive" can instruct the candidate retrieval engine 840 to treat this word as less important than certain other words in the trademark, hence varying less broadly on it and can instruct the candidate presentation engine 850 to indicate why this word was treated much stricter than certain other words, also giving the user the ability to override the machine's decision on this and feed that knowledge back in to the retrieval engine to change the behavior for this trademark; the additional term "dictionary(English)" can instruct the candidate retrieval engine 840 and the candidate presentation engine 850 to perform one or more actions described herein; the additional term "length_medium" can instruct the candidate retrieval engine 840 and the candidate presentation engine 850 to perform one or more actions described herein; the additional term "goods_related" can instruct the candidate retrieval engine 840 and the candidate presentation engine 850 to perform one or more actions as described herein; and the additional terms "stem(CLEAN)" and "stem(SERVICE)" can instruct the candidate retrieval engine 840 and the candidate presentation engine 850 to perform one or more actions as described herein for each of the word CLEANING and SERVICES.

The strategy generator 836 of the order analysis engine 830 creates the search strategy by combining the information from a number of resources: (1) a trademark word frequency engine of the trademark analyzer 834; (2) a trademark indexing frequency engine of the trademark analyzer 834; (3) a natural language frequency engine of the normalization and tokenization module 832 in conjunction with the natural language resources 860; (4) a general ontology (e.g., ontologies 864); (5) an NLP suite (NLP=Natural Language Processing) (e.g., the natural language resources 860); (6) the goods similarity engine 100, and/or (6) several custom and/or proprietary resources including a goods ontology and lists of terms related to certain concepts (e.g., ontologies 864). The trademark word frequency engine can provide information related to how often words and parts of words (and word- and letter-based ngrams) occur in trademark space (or a specified subspace of it), where trademark space is generally the set of all trademarks worldwide (or with specified jurisdictions). The natural language engine provides information related to how often words or parts of words (and word- and letter-based ngrams) occur in any natural (human) language and also can provide information to identify natural language terms (versus fantasy terms that appear more frequently in trademark space than in everyday natural language use). The trademark indexing frequency engine inspects how often certain absolute and relative strength decisions (taking context into account) were made (in the trademark annotation process for a given trademark repository) for all words and word-based ngrams in the trademark space. The strength decisions can express how strong and important a word is within a trademark in a trademark database. The ontology can aid in ascertaining the nature of a word, like e.g. a geographical term, a name, a color, etc. The NLP suite can facilitate splitting, stemming, post-tagging, and other NLP tasks to be performed on words or ngrams of words. The custom and/or proprietary resources can facilitate tagging of words or ngrams of words with specific additional tags like being related to the user specified goods and/or services terms, being an indication of a company legal form, etc.

The resources are then integrated into a statistical approach (e.g., based on a comparison of a statistical score to a threshold score) to determine the likelihood of which absolute and relative strength(s) each word in an order should have, whether words of an order can also be seen as a combination of other words, which words of an order are of special types (like names, geographical terms, etc.), whether words of an order are typically familiar to people in a certain language or not, etc., as illustrated by the strategy examples above. All valid interpretations (i.e., those interpretations that are above certain thresholds and hence are likely to be correct) are incorporated into the search strategy, so the strategy potentially is a set of individual sub strategies, each of those resembling what needs to be done in a separate sub search—all depending on different ways of how the user input can be interpreted. As a basic example, a search where the input is MYADIDASLTD can be interpreted as (1) a single and very rare fantasy term; as well as (2) a three word search MY ADIDAS LTD where MY is a very common term and possessive pronoun, ADIDAS is a fantasy term that is fairly common in trademark space and dominates MY and LTD in this context and LTD being a company legal form; (3) a one word search ADIDAS where there can be a very broad variation on just that word; and finally (4) a two word search MY ADIDAS where LTD is omitted as it indicates the label form of the company only. Patterns derived from both past searches conducted as well as user input then determine the relative order of these alternative sub strategies to enable the candidate presentation engine to show a ranked result of all trademarks where the trademarks that are more important for the user are presented higher up in the ranking.

The candidate retrieval engine 840 can include a query generator 842, which can be configured to transform the search strategy generated or built by the order analysis engine 730 into one or more queries (e.g., database or web-based queries). In some embodiments, the query generator 842 can transform the search strategy into one or more queries in one or more query languages based on the directives included in the search strategy. Some examples of query languages includes Structured Query Language (SQL), Contextual Query Language (CQL), proprietary query languages, domain specific query languages and/or any other suitable query languages. In some embodiments, the query generator 842 can also transform the search strategy into one or more queries in one or more programming languages or scripts, such as Java, C, C++, Perl, Ruby, and the like. For example, the query generator 842 can be a code generator that processes the search strategy and generates code based on the terms and directives in the search strategy. In addition, the query generator can consult precomputed query templates that indicate which queries should be fired for a given search strategy, or specific parts of it. These templates are based on domain specific language mined from trademark specialist (and/or professional) behavior, opinions & strategies.

In some embodiments, the one or more queries can include or otherwise be formed using specified classes or goods/service included in the search order (as well as their similar or semantic equivalents). For example, the one or more queries can be limited to trademarks from a particular class that includes goods/services specified in the search order or that are similar or semantically related to the goods/service specified in the search (as determined by goods and/or services similarity engine 100 and/or the goods/services ontology).

Using the one or more queries, a data retriever 844 of the candidate retrieval engine 840 can identify and retrieve trademarks that are candidates for reporting to the user. The candidate retrieval engine 840 can execute one or more translation functions to implement the search strategies in one or more human languages (e.g., CHEVAL BLANC for a search order WHITE HORSE), which may use Latin characters and/or non-Latin characters. The candidate retrieval engine 840 can implement transliterations to transform words in Latin characters to words in non-Latin characters or vice versa. The output of the candidate retrieval engine 840 includes a set of trademarks returned in response to the one or more queries.

In exemplary embodiments, for each of the textual elements in a search strategy (as determined by the order analysis engine 830), the candidate retrieval engine 840 scans a rule set to determine which types of trademarks need to be retrieved. The rule set includes conditional logic designed to mimic or simulate human thought processes for a particular search strategy. As one example, textual elements having a search strategy that includes the directives "coined," "standalone," or "dominant" can trigger the largest set retrieval criteria included in the one or more queries to provide for the broadest search of the repository. The rules can include retrieval models that can be executed by the candidate retrieval engine 840 on both a visual representation of the trademark repository content and on a series of phonetic representations of the trademark repository content. The retrieval models are used to retrieve trademarks from the repository based on the search strategy and can be logical combinations of similarity primitives (e.g., functions and algorithms used to determine similarities between to two strings or sets of data).

Some examples of these models, which may be used in combination (e.g., connected with logical primitives, such as AND, OR, NOT) or alone, include, but are not limited to: common prefix models (various lengths) that can retrieve trademarks having prefixes in common with one or more of the terms in the search strategy; common suffix models (various lengths) that can retrieve trademarks having suffixes in common with one or more of the terms in the search strategy; common infix models (various lengths) that can retrieve trademarks having infixes in common with one or more of the terms in the search strategy; similar consonant pattern models that can retrieve trademarks having consonant patterns in common with one or more of the terms in the search strategy; similar vowel pattern models that can retrieve trademarks having vowel patterns in common with one or more of the terms in the search strategy; various models using string edit distance measures; common letter set models that can retrieve trademarks having common letter sets with one or more of the terms in the search strategy; number-of-letters-in-common-in-order that can retrieve trademarks having a specified number of letters in common and in order with one or more of the terms in the search strategy; word length that can retrieve trademarks having a similar number of characters as one or more of the terms in the search strategy, is-fantasy-term that can retrieve trademarks formed by made-up words that are similar to one or more of the terms in the search strategy and/or any other suitable retrieval models.

The retrieval models can be expressed as a number of primitives operations on indexes. These indexes can be specifically designed in order to support extreme high performance retrieval of variations important for retrieving confusingly similar trademarks. This includes pattern based retrieval indexes, word count indexes, word combination indexes, frequency indexes, anagram indexes, and/or any other suitable indexes. The indexes can be built upon delivery of new registered trademarks by various trademark offices. The candidate retrieval engine 840 contains functionality to manage these indexes in memory in order to support the performance requirements for the search engine implemented by the system 800. Multiple versions of the indexes are kept in order to support searching on different time points and to switch to newer data without interrupting ongoing searches.

The candidate retrieval engine 840 can retrieve the trademarks from the trademark repositories (or databases) 890, which can include data 892 in the form of trademarks and metadata 894 associated with the trademarks. In exemplary embodiments, the trademark repositories 890 can include registered trademarks for one or more jurisdictions and one or more internal classes of goods (e.g., based on the search order). The candidate retrieval engine 840 can limit the search of the trademark repositories 890 to the jurisdictions and international classes specified in a search order, and/or can limit or control the execution of the rules and retrieval models such that certain rules are executed for certain trademark repositories. For example, certain rules and retrieval models can be associated with certain trademark repositories such that they cannot be properly executed for other trademark repositories.

In some embodiments, the candidate retrieval engine 840 can limit or otherwise control the retrieval of trademarks from one or more of the trademark repositories based on the goods/services specified (e.g., via the goods and/or services similarity engine 100 and the goods and/or services ontology). For example, certain rules and retrieval models can be associated with goods/services, similar goods and/or services, and/or semantically equivalent goods and/or services, and can be used by the candidate retrieval engine 840 to identify trademarks within the repositories that correspond to the goods/services specified in the search order. In some embodiments, the candidate retrieval engine 840 can be programmed to execute the rules and retrieval logic with logical connectors (e.g., AND, OR) between the query terms associated with the text-based input string associated with trademark terms and the text-based input string associated with goods/services. Using this approach the candidate retrieval engine 840 can be programmed to, for example, retrieve only those trademarks corresponding the trademark terms which also have goods/services corresponding to the goods/services specified in the search order.

The candidate presentation engine 850 can include a scoring module 852 and a filtering module 854, and can filter out false positives or irrelevant trademarks provided in the set of trademarks output by the candidate retrieval engine 840. The candidate presentation engine 850 is programmed to execute comparisons between the order and each trademark returned by the candidate retrieval engine 840 based on a comprehensive rule base 866 including a set of rules to identify the trademarks that the candidate presentation engine 850 considers confusingly similar to the order. The trademarks and/or the terms of the order can be translated and/or transliterated prior to comparison.

In some embodiments, the rules of the rules base 866 can include conditional logic designed to mimic or simulate the human thought process of a subject matter expert. In some embodiment, the rule base 866 is a result of a logic refinement cycle in close cooperation with subject matter experts in order to obtain an as optimal as possible precision/recall value. To obtain this, the conditional logic of the rules combines similarity measures (prefix, suffix, string edit distance, and the like) on visual, phonetic, semantic, translation, morphological and transliterated representations of the trademarks returned by the candidate retrieval engine 840 with the meta information from the search strategy generated by the order analysis engine 830 and enriched trademark content in the trademark repositories 890. The similarity measures can be used to determine and quantify similarities between the retrieved trademarks and the terms identified in the search order. The rules base 866 can include, for example, rules for single word cases, for multiword cases, for semantic cases, for phonetic cases, and/or for any other suitable cases that can be used to identify confusingly similar trademarks. In exemplary embodiments, the rules of the rules base 866 can be written in a domain specific programming language and can be cross-compiled to executable code to achieve high performance. For example, the domain specific programming language can be translated to a common programming language, such as C, C++, Java, and the like, at build-time or run-time.

The scoring module 852 can include an embodiment of the trademark similarity engine 640 to generate a similarity score for each of the trademarks returned by the candidate retrieval engine 840 based on comparisons between the trademarks and the order (e.g., using the similarity measures). As described herein, the similarity score generated by the trademark similarity engine 640 can be a string that reflects which retrieval logic triggered a valid similarity to the text-based input string received in the search order. Execution of the rules of the rules base 866 can be implemented on a distributed computing platform to execute the comparisons in parallel to achieve a several performance benefits including faster execution of comparison and efficient use of computing resources. In exemplary embodiments, the candidate presentation engine 850 can be executed to process the rules as a forward chaining, backtracking inference engine. Using forward chaining, the conditional logic of the rules are executed sequentially, where the input to one of the rules is derived from an output of previously executed rule. Using backtracking, when execution of the rules fails to yield positive outcomes corresponding to a match between a trademark in the results set and the order, the candidate retrieval engine 850 apply more generalized rules that are higher in the rules hierarchy.

To single out relevant trademarks in densely populated trademark areas, exemplary embodiments of the candidate presentation engine 850 exploit additional trademark specific knowledge via an embodiment of the context analyzer 600. As one example, goods or services similarity measures and/or similarity scores generated by the goods and/or services similarity engine 100 can be integrated in the rules logic for certain jurisdictions to take this dimension into account when generating similarity scores for trademarks. For example, a registered trademark often include a list of goods or services that are intended to be covered by the trademark. When the order includes a list of proposed goods or services, the scoring module 852 can apply the goods or services similarity measures or scores generated by the goods and/or services similarity engine 100 to the returned trademarks to determine how closely the goods or service of the returned trademarks correspond to the goods or services identified in the order. To achieve this, the conditional logic of the rules can combine string similarity, meta information about the different textual elements and similarities between the goods entered by the client with their order and the published goods and services text associated with the returned trademarks, which can be in one or more languages. As another example, semantic similarity measures can be integrated into the conditional logic of the rules such that, when the scoring module 852 executes the conditional logic, the scoring module 852 considers certain concepts (e.g., <ANIMAL> or <COLOR>). For example, using tuned multilingual ontologies allow for retrieving and selecting, for example, all <COLOR><ANIMAL> trademarks or a subset of all <COLOR><ANIMAL> trademarks (e.g., YELLOW FELIDAE). The ontologies can be structured to identify relationships between words or concepts.

Upon completion of the comparisons, the candidate filtering module 854 can determine which of the trademarks it considers to be confusingly similar to the order. For example, the candidate filtering module 854 can determine whether the trademarks satisfy a filtering criteria. In exemplary embodiments, the filtering criteria can include a specified trademark similarity score threshold, and the filtering module 854 can be executed to compare the trademark similarity scores, generated by the trademark similarity engine 640 for each of the trademarks, to the specified trademark similarity score threshold. Trademarks having a trademark similarity score that exceeds the specified threshold can satisfy the filtering criteria and can be deemed to be confusingly similar by the candidate filtering module 854. The trademarks that are deemed to be confusingly similar to the order can be output as a filtered set of results 870 from the candidate presentation engine 850, and can be reported to a user by transmitting the filtered set of results to a user device via a communication network. Trademarks having scores that do not exceed the similarity score threshold are not transmitted to the user devices. Upon receiving the filtered results set, the user device can render the filtered results set in a GUI displayed on a display unit associated with the user device.

In exemplary embodiments, the candidate presentation engine 850 can include an embodiment of the context analyzer 600 and a data visualizer 856. As described herein, the context analyzer can be configured to receive the filtered results set and generate and evaluate search results based on one or more attributes derived from the search order 802 and the trademarks in the results set to rank and/or prioritize the search results in the presentation to a user. For example, the context analyzer 600 can include use the output of the goods and/or services similarity engine 100, the output of the owner analyzer 620, the output of the legal analyzer 630, and the output of the trademark similarity engine 640 in combination and/or independently to generate context scores to rank and/or prioritize the filtered search results. For example, the context score can be an aggregation of one or more of the similarity scores output by the goods and/or services similarity engine 100, the projected owner score output by the owner analyzer 620, the legal score output by the legal analyzer 630, and/or the trademark similarity score output by the trademark similarity engine 640. The context score can be utilized by the context analyzer to rank, sort, and/or prioritize the results of a search for presentation to a user via a graphical user interface.

The data visualizer 856 can utilize the output of the context analyzer to generate one or more graphical user interfaces to present the results of the search to the user. For example, the data visualizer can generate a graphical user interface that shows a matrix including quantities of the trademarks returned by the search according to the context scores and/or according to the trademark similarity scores and the goods and/or services similarity scores. In addition, the data visualizer 856 can generate graphical user interfaces that provide analysis of the output of each of the similarity engine 100, the owner analyzer 620, the legal analyzer 630, and the trademark similarity engine 640.

Exemplary embodiments of the information retrieval system 800 can advantageously provide improved searching abilities compared to conventional search engines and processes to provide comprehensive search results that go beyond simply submitting what a user provides as search terms to a repository in the form of a query and simply returning the results of such a query to a user.

Figure 9:
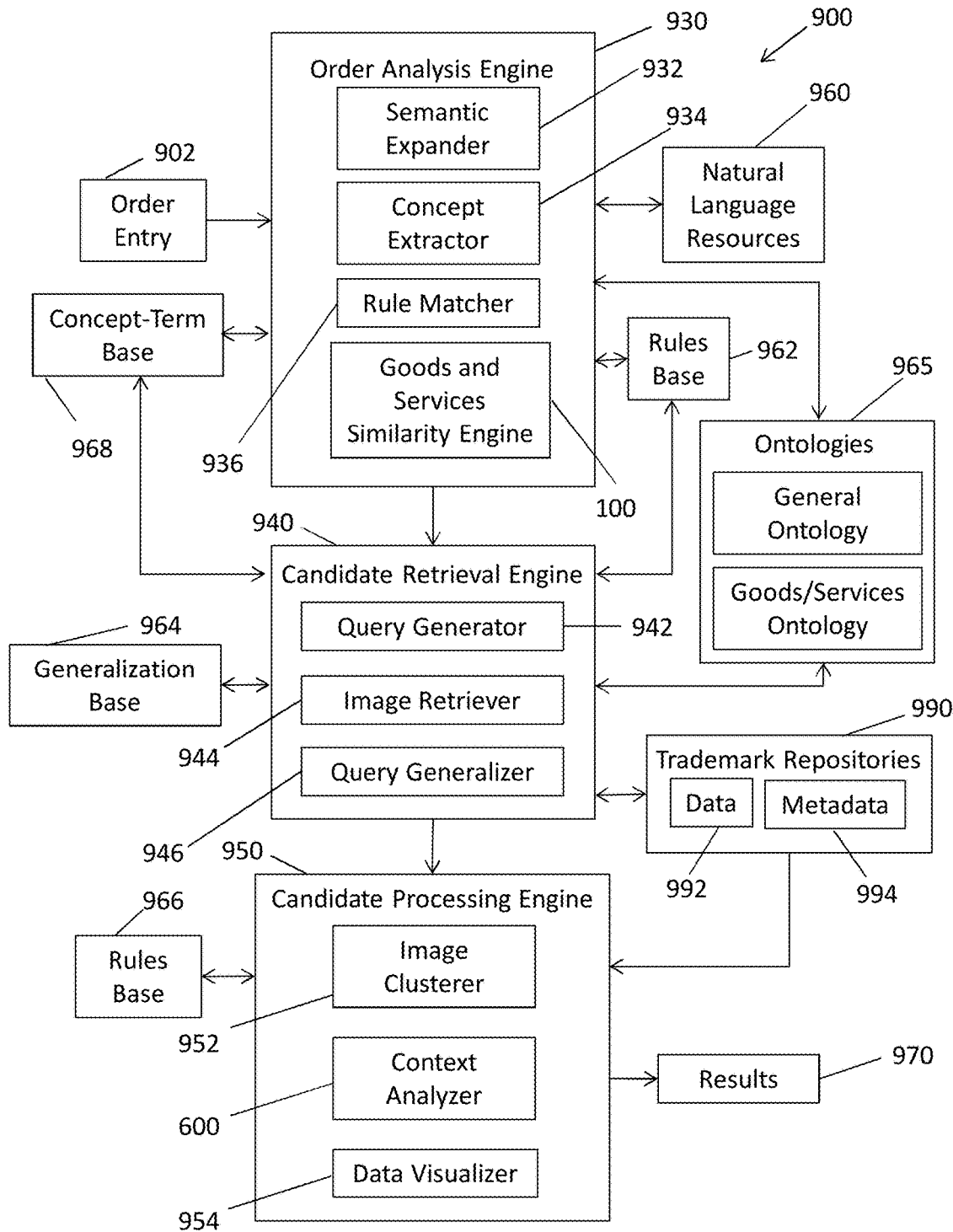
FIG. 9 is a block diagram of an exemplary embodiment of an information retrieval system that identifies confusingly similar image-based trademarks or service marks (e.g., trademark images or logos with or without words) based on a user supplied search order or request.

FIG. 9 is a block diagram of an exemplary embodiment of an information retrieval system 900 that identifies confusingly similar image-based trademarks or service marks (e.g., trademark images/logos with or without words) based on a user supplied search order. The system 900 can include an order analysis engine 930, a candidate retrieval engine 940, and a candidate presentation engine 950. The system 900 can receive as an input one or more orders including text-based strings in natural language that describe images. In response to an order, the system 900 outputs a set of trademark images (e.g., logos) that are ranked for relevance against text-based input stings of the order, i.e., images that contain a subset/combination of the concepts submitted in the text-based string.

Similar to the system 800, the system 900 makes trademark image retrieval accessible for non-professional trademark researchers as well as others (conducting such activities as trademark clearance, trademark infringement review, logo design, and the like). Users can simply describe the type of images to be searched in their own words and language without knowing anything about an underlying image encoding system utilized by trademark repositories (or databases) 990, which stores data 992 in the form of trademark images and metadata 994 associated with the trademark images. The system 900 further provides for easy integration into any other system or workflow that at some point in time has a piece of natural language text available that describes what is (or should/can be) in a trademark image, and needs to provide a set of relevant trademark images for that description.

In exemplary embodiments, a user of the system 900 can submit, via one or more graphical user interfaces, a search order 902, which includes a text-based string describing image concepts as well as an indication of which trademark repositories, classes of images, goods/services associated with the described image, and/or jurisdictions the system 900 should search to identify trademark images that may be confusingly similar to the concepts described in the search order. In response to the order 902, the system 900 can output a set of results that have been specifically generated to provide the user with a set of registered, trademarked images/graphics (with or without words) that may be confusingly similar to an image/graphic described by the text-based input strings of the order 902 (e.g., based on an operation of the engines 930, 940, and 950). In some embodiments, the results output by the system 900 can be restricted to jurisdictions and international classes specified in the order 902. In some embodiments, the system 900 can return all of the trademark images retrieved without filtering. The results output by the system 900 can include relevant information about the trademarked images to identify, for example, the trademark office that published trademark document, the registration number, the date of registration, the owner of the trademarked image, the next renewal date or window, the descriptions of goods and/or services, the trademark classes, and/or any other suitable information about the trademarked image.

The order analysis engine 930 can include a semantic expander 932, a concept extractor 934, and a rule matcher 936. In exemplary embodiments, the order analysis engine 930 can receive the order 902 including a text-based string from a user device. The order 902 describes a trademark image/logo using natural language terms, for example, by describing each item of an image separately. In some embodiments, the order 902 can supply a single input describing what needs to be in an image without explicitly separating the terms. To aid in illustrating an operation of the system 900, as a non-limiting example, the user can provide an order to search for images that feature at least a five-pointed star and an appaloosa, among possible other elements. For example, such an order can be include a text-based string set {"a star with five points", "appaloosa"} in a simple case, and {"a star with five points together with an appaloosa"} in the more advanced case. The text-based string set included in the order can be passed to the concept extractor 934 to be processed as described herein.

While conventional systems support the use of isolated terms as found in various encoding standards (or direct synonyms thereof), in exemplary embodiments of the system 900, the terms and synonyms can be used within a more open natural language context. This provides a user with more freedom in specifying the text-based string of the order. For example, the text "five pointed star" can just as well be expressed as, e.g., "a star with five points" or "stars having 5 arms", and regardless of which expression is received, the system 900 is programmed to return the same set of trademark images. By allowing natural language to be used as input instead of strict terminology and/or codes, exemplary embodiments of the system 900 advantageously eliminate the requirement that a user have special knowledge for interacting with the trademark image repositories, and allow for non-human and human input to provide text describing what should be featured on the trademark images.

The concept extractor 934 processes each element/term of text-based input string set in the order 902 and determines which concepts are potentially triggered by the input string set. For each element, the list of terms included in the input string set is analyzed to identify key words and phrases maintained by a concept-term base 968 of the system 900. For example, the concept-term base 968 can relate or link synonyms, near synonyms, hyponyms, and the like to one or more concepts. The concept extractor 934 can scan the concept-term base 968 to for the terms in the input string and upon locating the terms can identify the corresponding concept(s) associated with the terms. Terms in the input string set that are not recognized by the concept extractor 934 are analyzed to determine whether the unrecognized terms connect ("glue") the content of the text-based input together in a manner consistent with an expression provided in natural language, but with no relation to recognized concepts themselves. To distinguish between recognized and unrecognized words, a list of common words is provided in one or more human languages and is combined with information extracted from the semantic expander 932 (e.g., semantically equivalent words). Using the list of recognized words in combination with the information extracted by the semantic expander 932, the order analysis engine 930 extracts a set of possible concepts that are present in the order 902. Once the words and phrases of the order 902 have been processed through the semantic expander 932, the set of concepts representing the words and phrases in the order 902 (e.g., "orange" can either be a type of fruit or a color so both of these concepts can be considered present) is passed to a word recombiner function of the semantic expander 932, which combines words in an order. Exemplary embodiments of the system can receive text-based input strings in natural language in different ways (e.g., as a single string, as a set of strings). If the system receives a set of text-based input strings, the word recombiner function can operate to process the separate input strings in the set to recognize separate and distinct concepts, but also to recognize when different strings within a set can be combined in one or more combination or permutations into single words or strings. Continuing with the example, based on the output of the concept extractor 934 and the semantic expander 932, the order analysis engine 930 can map the text-based input "a star with five points" to a set of concepts {_isFivePointedStar,_isFive,_isPoint,_isStar} and can map "appaloosa" to a concept {_isHorse}. That is, the string "a star with five points" is mapped onto the concept _isFivePointedStar, as a whole, but also has terms that are individually map to the concepts _isFive ("five"), _isPoint ("points") and _isStar ("star").

By modeling the logic for the rules as described herein, exemplary embodiments of the system 900 advantageously provide an enriched set of rules that can be used to determine which terminology or combinations of terms should trigger specific codes (or logic combinations thereof), and can allow for using concepts instead of terms, making the models more generic.

The semantic expander 932 can utilize one or more repositories of concepts (e.g., one for each supported human language), which can be derived from one or more low-level image encoding schemes of one or more trademark repositories 990 to ensure all recognized concepts are covered, and that only the recognized concepts are covered. The concepts stored in the repositories can include features, such as a unique name and a list of natural language terms that correspond to the concept. This allows the semantic expander 932 to map individual terms or sequences of terms onto a set of recognized concepts. For example, the concept _isHorse can be correspond not only to the terms "horse" and its plural "horses", but also to synonyms, such as the Latin "equus caballus", as well as near synonyms, such as "pony" and hyponyms, such as all types of horse breeds, including "appaloosa" and/or any other suitable natural language terms that can be expressed as being semantically related.

Through automatic expansion combined with manual validation and additional ad hoc manual expansion, a list of understood synonyms can be maintained by the system 900 that far exceeds what may be conventionally supported. By supporting hyponyms, the system 900 can even map very specific descriptions onto concepts to facilitate retrieval of the correct images (e.g., images that would be considered confusing similar to that which is described in the order), which advantageously allows the system 900 to receive and process a wide variety of inputs describing the same or similar images; thereby reducing, for example, the number of error messages generated in response to orders as well as reducing the frustration and level of effort of the users of the system 900.

The rule matcher 936 uses the concepts identified by the concept extractor 934 and semantic expander 932 to determine which rules of the rules base 962 should be triggered to generate one or more queries. The rules of the rule base 962 can include conditional logic that has been defined based on input from expert trademark search analysts. Each rule in the rules repository can have a corresponding rule name, retrieval logic, and/or match logic. The rule name can be used to identify and distinguish one rule from another, and can be used to retrieve the rules from the rules repository. The retrieval logic can state which (logical combinations of) codes should be retrieved by the rule matcher for use in generating one or more queries. In exemplary embodiments, combinations of codes can be defined in terms of the logical operators AND, OR and NOT. In some embodiments, if a piece of logic used here was already defined before, the name of the defining rule can be used instead of the code itself. The match logic of the rule matcher 936 can state which (logical combinations of) concepts should be present for a corresponding rule to trigger. In exemplary embodiments, combinations of the concepts can be defined in terms of logical operators AND, OR, and NOT, as well as, a tuple-operator that indicates compound concepts, i.e., concepts that are formed from multiple other concepts.

As an example, consider a definition of rules that define, among other things, what needs to be retrieved when a user wants to see images featuring a dressed lion:

```
>isGriffin          040501            _isGriffin
>isSphinx           040302            _isSphinx
>isLion             030101 | isHeraldiclion | isSphinx | isGriffin _isLion
>isLioness          isLion _isLioness
>isLioninsignia     isHeraldiclion (_isLion,_isInsignia) | (_isLion,_isHeraldry) | (_isLion,_isShield)
>isHeraldiclion     030102                        _isHeraldicLion
>isCostumedLion     isLion & isCostumedanimal0301 (_isCostumed,_isLion)
>isCostumedanimal0301              030126
```

The third line in the above example shows the definition of the concept lion and indicates that if a user wants to see lions, the system 900 should also retrieve images that include sphinxes and griffins, as well as those images that have lions in heraldic style, which have a different coding than regular lions. The OR operator 'l' indicates that the presence of any of these codes is sufficient for the rule to trigger. The rule matcher 936 outputs, for each input element (e.g., each word in the text-based string), sets of rules that are triggered for the element.

The second to last line in the above example, beginning with "isCostumedLion", shows the definition of the concept of a dressed lion. For it to trigger, an order must include terminology referring to the concept of being clothed as well as to the concept of lion and that such an order should be described in the context of a single, compound concept (e.g., so the input string should have been, for example, {"a dressed lion"} or something semantically similar) If the latter condition does not hold, e.g., for an input like {"a lion","clothing"}, the system 900 will retrieve, in addition to images of clothed lions, images with a lion that includes another element that has to do with clothing. If the second to last line triggers, the system 900 will retrieve all images that have both the code for lion AND the code for costumed animal of category 0301 (which is the encoding category of, among other things, the lions). In some embodiments, for reasons of coverage completeness, the concepts lion and being clothed can be combined, using the word recombiner function, into the concept of a dressed lion so these concepts are retrieved as well.

Continuing with the running example for "a five pointed star", "appaloosa", the rule matcher 936 can identify the following rules:

>isFivepointedstar   010108_isFivePointedStar|(_isFive, _isPoint,_isStar)|
(_isFive,_isArm,_isStar)|(_isRepresenting,_isFive, _isPoint,_isStar)|
(_isRepresenting,_isFive,_isArm,_isStar)
>isHorse 030501_isHorse Based on the above, the rule matcher 936 outputs the rules set {{isFivepointedstar},{isHorse}} having corresponding low level retrieval codes 010108 and 030501, respectively. The actual parts of the matching logic that correspond to the order are "(_isFive,_isPoint,_isStar)" and "_isHorse". Since the matching logic for the "isFivepointedstar" rule is an OR statement of five options with one of these five being true, the entire statement is true, and hence the rule is triggered by the rule matcher 936. The "isHorse" rule (the concept for horse) is triggered because a horse is defined in the semantically expanded repository as, among other things, appaloosa.

In some embodiments, the rule matcher 936 can treat the matching parts of the rules as concept vectors, and can do the same with the concepts derived from the user input. Then, in a vector space defined by the rule vectors, the distance of the input vector to each of the rules can be determined. In this manner, the input can be restricted to a single string (with much more natural language freedom than conventional techniques) that will trigger any rule close enough (i.e. below a certain distance threshold). In one embodiment, vector difference is measured only after the rule match 936 executes natural language processing and determined that the input string can be split-up between positive and negative parts of text, where the positive parts are used to retrieve trademark images and negative parts are not used to retrieve trademark images or are used to filter out retrieved trademark images. Using the above described vector processing, the rule matcher 936, can return all (to a high degree of probability) valid results. Moreover, the retrieval logic of the rules also facilitates retrieval of trademark images using more than the basic code to which the input string is matched. By creating rules that include conditional logic to mimic or simulate years of retrieval experience of subject matter experts, exemplary embodiments of the system 900 provide for improved certainty that all relevant trademark images are retrieved and shown to the requesting user as compared to conventional systems that do not include such sophisticated rules.

In exemplary embodiments, the order analysis engine 930 can process the one or more strings associated with the goods/services specified in the search order. As one example, exemplary embodiments of the order analysis engine 930 can include an embodiment of the goods and/or services similarity engine 100 to identify similar descriptions of goods and/or services and/or similar words/terms in the descriptions of goods and/or services to be used by the candidate retrieval engine 940. The goods and/or services similarity engine 100 can compare the description of goods and/or services included in the search order (e.g., a reference description of goods and services) against a repository of descriptions of goods and/or services to identify the similar descriptions of goods and/or services and/or the similar words/terms in the descriptions of goods and/or services. The goods and/or services similarity engine 100 can generate goods and/or services similarity scores and those descriptions of goods and/or services that satisfy a threshold score can be used in addition to the reference description of goods and/or services to generate directives and/or queries for candidate retrieval. As another example, the order analysis engine 930 can interface with one or more ontologies 965, such as a general ontology and a goods/services ontology. The ontologies 965 can be utilized to identify semantically related words. For example, the goods/services ontology can be utilized by the order analysis engine 930 to identify goods/services that are semantically related to the goods/services specified in the search order 902. The goods/services ontology can include a repository of terms (e.g., such as common terms for goods and services) and can be structured such that semantically related terms are linked or otherwise associated with each other. When a term in the goods/service specified in the search order is compared against the terms in the goods/services ontology, the goods/services ontology can map the term to its semantically related terms, and the order analysis engine 930 can use the semantically related terms to generate the search strategy.

The candidate retrieval engine 940 can include a query generator 942, an image retriever 944, and a query generalizer 946. The query generator 942 of the candidate retrieval engine 940 receives the set of sets of rules that are triggered during processing of the order by the order analysis engine 930 (e.g., one set of rules for each recognized concept), which in continuing the example from above would be: {{isFivepointedstar},{isHorse}}. Using the set of sets of rules, the query generator 942 generates all combinations that feature exactly one rule from each set. For every such rule combination, the query generator 942 extracts retrieval logic from the rule combination, and through continuous substitution (if needed) transforms the retrieval logic into a query including a logic statement (with AND, OR and NOT operators), which combines low level retrieval codes attached to the images. For the "five pointed star", "appaloosa" example, the low level retrieval codes can be expressed as follows:

010108 AND 030501

The query generator 942 uses continuous substitution when the code logic of a rule features other rules' code logic in addition to the low level retrieval codes. Trademark images in the trademark repository can be associated with one or more low level retrieval codes. For example, the low level retrieval code 010108 can be associated with all trademark images in the trademark repository that correspond to the "isFivepointedstar" rule including semantic equivalents, and the low level retrieval code 030501 can be associated with all trademark images in the trademark repository that correspond to the "isHorse" rule includes semantic equivalents.

In embodiments of the present disclosure, the one or more queries can include or otherwise be formed using specified classes or goods/service included in the search order (as well as their semantic equivalents). For example, the one or more queries can be limited to trademark from a particular class that includes goods/services specified in the search order or that are similar or semantically related to the goods/service specified in the search (as determined by the goods and/or services similarity engine 100 and/or the goods/services ontology).

The image retriever 944 executes a query plan, including queries generated by the query generator 942 (e.g., a query for each combination of rules) in one or more query languages (from the example above, "010108 AND 030501"), to search for trademark images in one or more trademark image repositories.

In some embodiments, the candidate retrieval engine 940 can limit or otherwise control the retrieval of trademark images from one or more of the trademark repositories based on the goods/services specified. For example, certain rules and retrieval models can be associated with goods/services, similar goods and/or services, and/or semantically equivalent goods and/or services, and can be used by the candidate retrieval engine 940 to identify trademark images within the repositories that correspond to the goods/services specified in the search order. In some embodiments, the candidate retrieval engine 940 can be programmed to execute the rules and retrieval logic with logical connectors (e.g., AND, OR) between the query terms associated with the text-based input string associated with trademark terms and the text-based input string associated with goods/services. Using this approach the candidate retrieval engine 940 can be programmed to, for example, retrieval only those trademark images corresponding the trademark terms and having goods/services corresponding to the goods/services specified in the search order.

Using the queries, the image retriever 944 retrieves trademark images that match the criteria provided. If results are returned, the results are passed to the candidate presentation engine 950. If the queries fails to return any results, the query information is passed to the query generalizer 946.

The query generalizer 946 receives as input, the rule names triggered by the rule matcher 936 and outputs the according set of rule names to which the rules should be generalized. For example, for each rule in the original query or queries, the query generalizer 946 returns a generalized set of rule names. In some embodiments, the query generalizer can identify the concepts associated with the rule names that were used to generate the one or more queries, and can scan a generalization base 964 to identify a generalization of the concepts. The generalization base 964 can include a hierarchy of concepts and can relate concepts in the hierarchy from general to specific (or specific to general) such that each concept in the hierarchy can be associated with a hierarchical level. When performing a generalization, the query generalizer 946 can identify the concept that is one level higher (or more general) in the hierarchy and can use this more general concept to generate new queries (e.g., by identifying the rules that are associated with the more general concept and using the low level codes associated with the rules). Depending on the number of levels, L, the user or the system 900 specifies for expansion, and the number of query elements, E, the user or system 900 specifies for expansion, the image retriever 944 generates a new set of queries, and retrieves images (if any) satisfying the new set of queries. The level, L, determines whether, after the query generalizer 946 generalizes a certain rule into a more general rule, the more general rule should be generalized as well if needed (e.g., if no results are returned with the more general rule). Thus, the level, L, determines how many successive generalization steps the query generalizer 946 and query generator 942 are maximally allowed to perform- i.e. this controls how deeply the user or system 900 will allow queries to deviate from the original query. The query element, E, determines how many elements in one query should be generalized for each iteration of generalization, which controls how broadly the user or system 900 will allow the query generalizer 946 and query generator 942 to deviate from the original query. If no images are returned when all specified limits (e.g., as determined by L and E) are reached, an empty result can be returned. In the running example, the number of levels, L, can be set to one, and the number of elements, E, can be set to two, such that the system 900, upon finding no images that feature both a five pointed star together with a horse, would perform one iteration of generalization to generalize the rules by generalizing one or both of the terms.

In exemplary embodiments, in addition to the rule and term generalizations, the query generalizer 946 can broaden the query by modifying logical connectors of a query. For example, if a query includes a logical AND statement of a quantity, n, codes, the query generalizer 946 can generate all other AND statements of size I where 1<=I<n; thereby allowing the image retriever 944 to search for a monkey with a banana in a circle will also return images of a monkey with a banana without circle, or even images having just a monkey. Such images may be relevant to a trademark clearance, e.g., if the monkey has no banana and there is no circle, but the monkey depicted can be confusingly similar to the image of monkey for which the subject search is performed (e.g., in case of a search for potential trademark logo infringement).

The query generalizer 946 can be used to advantageously determine how to generalize queries in a way that mimics or simulates how a subject matter expert may generalize queries. The query generalizer 946 can advantageously eliminate the need, time and, burden for users to generate extra queries when no images are found in response to an original order, and can advantageously return images, based on generalized queries, that the user may not have thought of. Additionally, the query generalizer 946 advantageously imposes a natural order on the images returned by the system 900 from most specific to most general.

In the running example, if images that feature both a five pointed star AND a horse are not found, the query generator 942 or image retriever 944 can send one or more requests to the query generalizer 946 to generalize the rules isFivepointedstar and isHorse in consultation with a generalization rule database, which can include the following lines:

>isDonkey,isZebra,isMule isHorse

>isStarisFivepointedstar

Based on the above, the query generalizer 946 output is {isStar} for the isFivepointedstar input and is {isDonkey, isZebra,isMule} for the isHorse input. Using this generalization, the system 900 would generalize the rules to search for images that include, for example, the following combinations.

a five pointed star and a donkey a five pointed star and a mule a five pointed star and a zebra a star and a horse a star and a donkey (only when E≥2)

a star and a mule (only when E≥2)

a star and a zebra (only when E≥2)

The following provides another non-limiting example of query generalization through a hierarchy of concepts that can be implemented by the candidate retrieval engine 940. When a user searches for a trademark image that contains "a church and a javan tiger", these consecutive steps can be taken by the candidate retrieval engine. First, the order analysis engine 930 or the candidate retrieval engine 940 can deduce which recognized concepts are contained in the order based on in information found in the concept-term base 968 (e.g., an ontology or other resource) that relates or links terms to concepts they represent. For example, the content-term base 968 can include the following:

_isChurch church,churches,church building,church buildings,basilica,basilicas,kirk,kirks _isTiger tiger,tigers,panthera tigris,tiger cub,tiger cubs, tigress,tigresses,bengal tiger,bengal tigers,saber-toothed tiger,saber-toothed tigers,sabertooth,sabertooth tiger,sabertooth tigers,siberian tiger,siberian tigers,bali tiger,bali tigers,balinese tiger,balinese tigers,javan tiger,javan tigers,sumatran tiger,sumatran tigers,caspian tiger,caspian tigers,hyrcanian tiger,hyrcanian tigers,turanian tiger,turanian tigers,turan tiger,turan tigers Based on the above, the term "tiger" and "javan tiger" can correspond to the concept "_isTiger" and the term "church" correspond to the concept "_isChurch".

Second, the candidate retrieval engine 940 can deduce which internal low level codes correspond to the identified concepts. For example, the candidate retrieval engine 940 can scan the rules base 962 for the concepts, which can return the following rules:

```
>isChurchCathedralAbbeyMonastery    070103      _isChurch |
_isCathedral |
_isAbbey | _isMonastery
>isTigerLargeFeline  030104    _isTiger | _isBigCat
```

Based on the above, as a third step, the candidate retrieval engine 940 queries the repository 990 for all images annotated with code 030104 AND 070103. If any images are found, the images are returned. If no images found, the candidate retrieval engine 940 generalizes retrieval by searching for concepts that generalize previously utilized concepts _isTiger and _isChurch, as described in the generalization base 964 (e.g., an ontology or other resource) that organizes all recognized concepts in a hierarchical manner. As shown below, the generalization base 964 can include the following:

_isReligiousBuilding _isChurch
_isReligiousBuilding _isPagoda
_isReligiousBuilding _isMosqueMinaret
_isWildCat _isLion
_isWildCat _isTiger
_isWildCat _isBigCat Based on the above, the candidate retrieval engine 940 can retrieve images that either contain (1) a church and a lion (_isLion) or other wild cat (_isBigCat) like panther, cheetah, and the like, or (2) a tiger combined with another religious building like a pagoda (_isPagoda), a mosque, a minaret (_isMosqueMinaret), a temple (_isTemple), and the like. For example, the candidate retrieval engine 940 scan the rules base for rules associated with these concepts and can identify the corresponding low level codes to generate one or more queries. If this generalization does not yield any results, the candidate retrieval engine can identify additional generalizations by (1) allowing more concepts to vary (retrieve logo's that generalize _isTiger as well as _isChurch) or (2) generalize to higher levels in the concept hierarchy (e.g. to all cats instead of only wild cats, to all buildings instead of only ones that have to do with religion).

The candidate presentation engine 950 can receive the images retrieved by the candidate retrieval engine 944 and can output the results by transmitting the results to a user device to be rendered in a graphical user interface displayed by a display unit of the user device. The candidate presentation engine 950 can include the image clusterer 952 and data visualizer 954.

The image clusterer 952 compares metadata (e.g., owner, applicant, encoding, classes, registers, and the like) associated with all images returned in response to the order as well as some image data such as a color distribution or histogram associated with the images. The image clusterer 952 includes logic that allows the image clusterer 952 to group related trademark images, identical trademark images, and/or old/newer versions of the same brand logo together based on the metadata and image data so that images sharing common parameters can be displayed together (e.g., next to each other), which cannot be achieved based on processing of the image itself due to potentially large differences between image pixel data of images.

In some embodiments, the image clusterer 952 can group and/or rank the returned images based on color, using a distance metric between color values (e.g. based on the Pantone color index) in combination with the percentage of the image each color covers. Within this ranking, the images can be grouped or further ranked based on their respective metadata to keep related images together, despite color differences. For example, images can be grouped together with respect to the dominant colors or color combinations, while still keeping images associated with the same owner and associated with the same product (e.g., goods, services, brand, and the like) together. Continuing with the running example, if a user was trying to identify confusingly similar trademark images that include a large red five pointed star and a blue appaloosa, where no other colors are really present to a significant extent. The image clusterer 952 can cluster the images returned by the candidate retrieval engine 940 such that images dominated by red and blue being displayed first (e.g., with the images having combined color distance and distribution over red and blue that most closely correspond to the color of the star and appaloosa being first) and images having either less similar reds or blues or in a totally different ratio being displayed last.

By clustering images based on metadata and/or image data (including color data), exemplary embodiments of the present disclosure provide an output that makes it easier and less time consuming for a user to find the most relevant images and provides. In some embodiments, the user can interact with a graphical user interface to influence the way the images are sorted and/or grouped by the image clusterer 952. Once clustering is completed, the final selection can be passed to the data visualizer 954 for presentation.

The data visualizer 954 prepares and presents the final data for viewing by a user. For example, the data visualizer can cause the system to transmit search results 970 (i.e. the returned images) and presentation instructions to the user device, and the user device in response to the presentation instructions, can render the images in an arrangement in a graphical user interface displayed by the display device according to the clustering provided by the image clusterer 952. The form of visualization can be online (webpage), report (electronic or printed), graphs or charts, or any other suitable form of visualization.

In some embodiments, the candidate presentation engine 950 can apply one or more filters to images returned by the candidate retrieval engine 940 such that the system 900 can output a reduced (or filtered) set of images to be viewed by a user. For example, the candidate presentation engine 950 can use processes similar to those described herein with relation to the candidate presentation engine 950.

In exemplary embodiments, the candidate presentation engine 950 can include an embodiment of the context analyzer 600, which receives the results after image clustering is complete and before the results are provided to the data visualizer. As described herein, the context analyzer 600 can be configured to generate and evaluate search results based on one or more attributes derived from the search order 902 and the trademarks in the results set to rank and/prioritize the search results in the presentation to a user. For example, the context analyzer 600 can include use the output of the goods and/or services similarity engine 100, the output of the owner analyzer 620, the output of the legal analyzer 630, and the output of the trademark similarity engine 640 in combination and/or independently to generate context scores to rank and/or prioritize the filtered search results. For example, the context score can be an aggregation of one or more of the similarity scores output by the goods and/or services similarity engine 100, the projected owner score output by the owner analyzer 620, the legal score output by the legal analyzer 630, and/or the trademark similarity score output by the trademark similarity engine 640. The context score can be utilized by the context analyzer to rank, sort, filter and/or prioritize the results of a search for presentation to a user via a graphical user interface.

Figure 10:
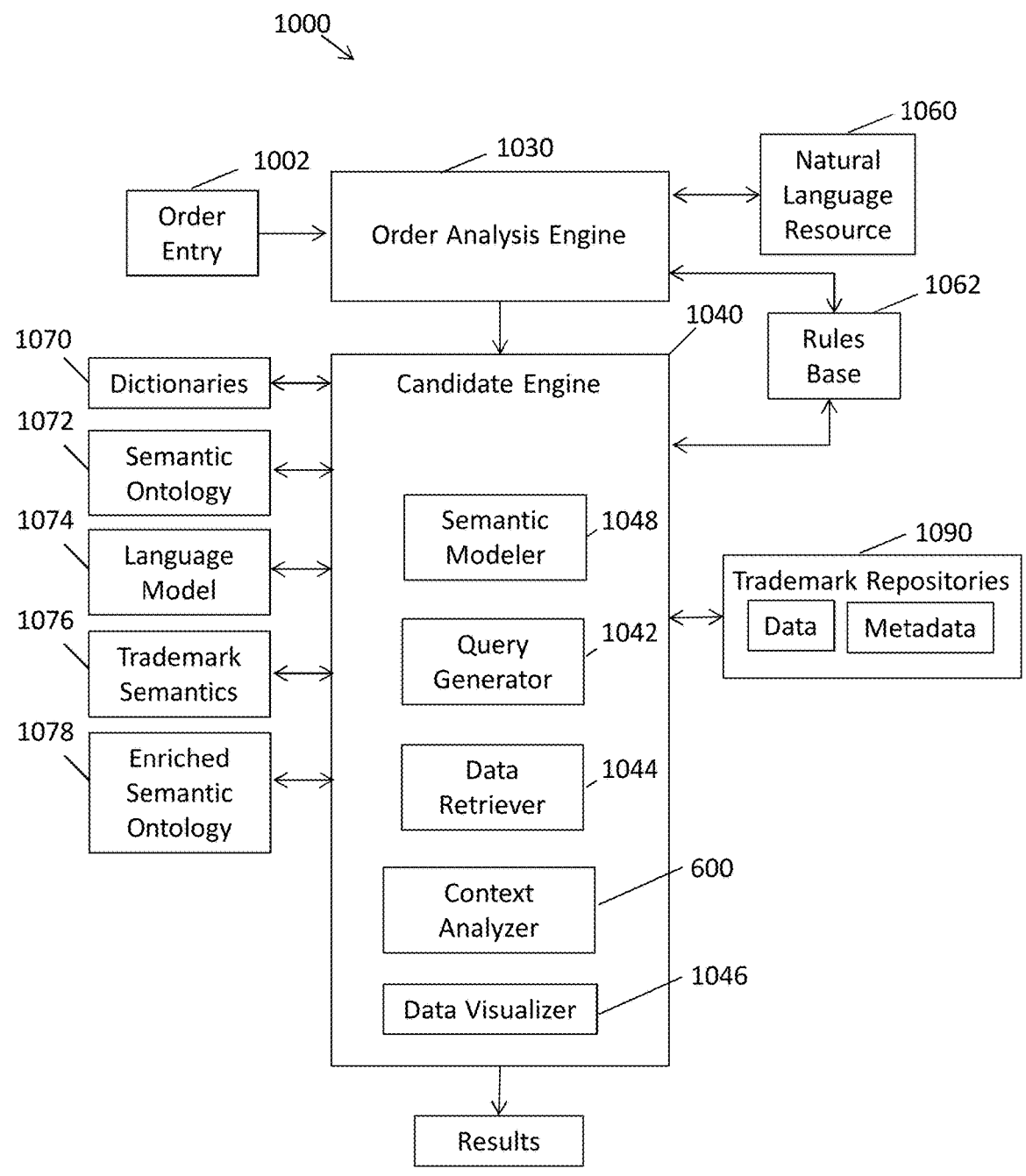
FIG. 10 is a block diagram of an exemplary embodiment of an information retrieval system that identifies confusingly similar trademarks or service marks utilizing semantically related terms identified according to a semantic model.

FIG. 10 is a block diagram depicting an information retrieval system 1000 for implementing a search engine in accordance with exemplary embodiments of the present disclosure. In exemplary embodiments, the information retrieval system 1000 can be implemented by one or more servers and one or more repositories, which can communicate directly with each other and/or may communicate with each other via one or more communication networks as described herein. The system 1000 can include an order analysis engine 1030 and a candidate engine 1040. In exemplary embodiments, the order analysis engine 1030 can be implemented using the order analysis engine 730, 830, or 930 as described herein in conjunction with the various elements described in relation to the order analysis engines 730, 830, and 930 (e.g., natural language resources 1060, rules bases 1062).

The candidate engine 1040 can include a query generator 1044, a data retriever 1046, and a semantic modeler 1048. In exemplary embodiments, the query generator 1044 can be implemented using the query generator 842 or 942, and the data retriever can be implemented using the retriever 844 or 944. The semantic modeler 1048 can use a voting scheme to unify different resources/approaches to identifying semantic equivalents and semantic relatedness.

Some examples of different resources/approaches that the semantic modeler can interact with include one or more dictionary repositories 1070, a semantic ontology 1072, a (statistical) language model 1074, a trademark semantics resource 1076, and an enriched semantic ontology. The dictionary repositories can include words from a large set of languages. Words in the dictionary repositories can be considered semantically related if they translate to the same concept. The semantic ontology 1072 stores relationships like synonymy, antonym, hyponymy, and alike of various words and/or phrases. The language model 1074 includes results of training a language model to obtain word relatedness where vector logic (e.g., cosine similarity or any other vector distance measure) is used to compute semantic distance between words such that words within a specified semantic distance of each other are considered semantically related. The semantic trademark resource 1076 can include semantic alternatives mined from human annotations in a full backlog of trademark searches maintained by the system 1000. The enriched semantic ontology 1078 can be similar to the ontology 1072, but can include semantic clusters derived from the ontology 1072. The ontology 1078 can be organized in a hierarchy to allow for extra flexibility as this creates a natural degree of semantic relatedness.

Each of the example resources can have specific strengths and specific weaknesses, such that none of the resource can be used alone to provide a complete or accurate semantic model for trademarks. The approach to get to a complete and accurate model is by identifying those combination of patterns of the aforementioned resources of the semantic modeler 1048 that lead to valid results based on historic data and/or training data. The semantic modeler 1048 can interact with each of the resources to identify whether each of the resources consider which words the resources consider to be semantically related to a term or element. A resource may vote for a particular word by indicating that it is semantically related to a term. The semantic modeler 1048 can consider the votes from the resources to select the most correct, accurate, or appropriate semantic relationships based on the voting patterns of the resources. For example, it can be determined that certain voting patterns can provide correct semantic relationships. The voting patterns can be integrated into logic of the semantic modeler 1048 that decides which conditions allow for which patterns to be used.

Using this voting approach, the semantic modeler 1048 can accurately identify semantically related words based on the evidence of semantic relationship present as determined by the voting patterns, which can increase a number of words that can be utilized in addition to the matching words. A voting pattern can be represented by a set P of triplets (r, rw, rs) where each triplet originates from one of the resources used. The 'r' in the triplet corresponds to an identifier of the particular resource, the 'rw' corresponds to a weight assigned to the resource 'r', and the 'rs' corresponds to the normalized scoring of the resource r for the term for which other semantically related terms are desired.

After a validation process that identifies which (order, trademark) couples are valid and/or accurate (i.e., good couples) and which are not in the context of semantic relatedness, the weights rw can be tuned to find the optimal balance between maximal coverage of the good couples versus minimal inclusion of the couples that are not considered to be good from the validation process. This process leads to a set PS of patterns P that allows for automatic retrieval of order-trademark couples from repositories (or databases) 1090 that are deemed to be (confusingly) similar to the an input string of an order 1002 without requiring an filtering or query generalization; thereby potentially reducing the use of resources required to conduct and a search and prepare result sets. For example, the query generator 1044 can generate one or more queries encompassing the semantic equivalents identified by the semantic modeler 1048 using one or more rules including retrieval logic, and the data retriever 1046 can retrieve only those trademarks that correspond to the identified semantic equivalents such that the system identifies and returns only those trademarks the system 1000 deems to be confusingly similar to the text-based input strings received by the system 1000.

In exemplary embodiments, the candidate engine 1040 can include an embodiment of the context analyzer 600 and a data visualizer 1046. As described herein, the context analyzer can be configured to receive the filtered results set and generate and evaluate search results based on one or more attributes derived from the search order 1002 and the trademarks in the results set to rank, sort, filter and/or prioritize the search results in the presentation to a user. For example, the context analyzer 600 can include use the output of the goods and/or services similarity engine 100, the output of the owner analyzer 620, the output of the legal analyzer 630, and the output of the trademark similarity engine 640 in combination and/or independently to generate context scores to rank, sort, filter and/or prioritize the filtered search results. For example, the context score can be an aggregation of one or more of the similarity scores output by the goods and/or services similarity engine 100, the projected owner score output by the owner analyzer 620, the legal score output by the legal analyzer 630, and/or the trademark similarity score output by the trademark similarity engine 640. The context score can be utilized by the context analyzer to rank, sort, filter and/or prioritize the results of a search for presentation to a user via a graphical user interface.

The data visualizer 1046 can utilize the output of the context analyzer to generate one or more graphical user interfaces to present the results of the search to the user. For example, the data visualizer can generate a graphical user interface that shows a matrix including quantities of the trademarks returned by the search according to the context scores and/or according to the trademark similarity scores and the goods and/or services similarity scores. In addition, the data visualizer 1046 can generate graphical user interfaces that provide analysis of the output of each of the similarity engine 100, the owner analyzer 620, the legal analyzer 630, and the trademark similarity engine 640.

While embodiments of the systems 700, 800, 900, and 1000 have been illustrated as separate systems in FIGS. 7-10, in exemplary embodiments, the systems 700, 800, 900 and/or 1000 can form a single system that includes all or some of the functionality and structure of the systems 700, 800, 900 and/or 1000. For example, in exemplary embodiments, the system 700 can include one or more of the systems 800, 900, and/or 1000, where the functionality supported by the systems 800, 900, and/or 1000 can be executed based on input received from the user (e.g., when the user submits an order to search for word marks, the system 800 or the system 1000 can be executed, and when the user submits an order to search for trademark images (e.g., logos), the system 900 or the system 1000 can be executed. Furthermore, while exemplary embodiments of the systems 700, 800, 900, and/or 1000 have been illustrated as having various components, the systems 700, 800, 900, and/or 1000 may have more or fewer components and the components may combined or integrated with one another.

Figure 11:
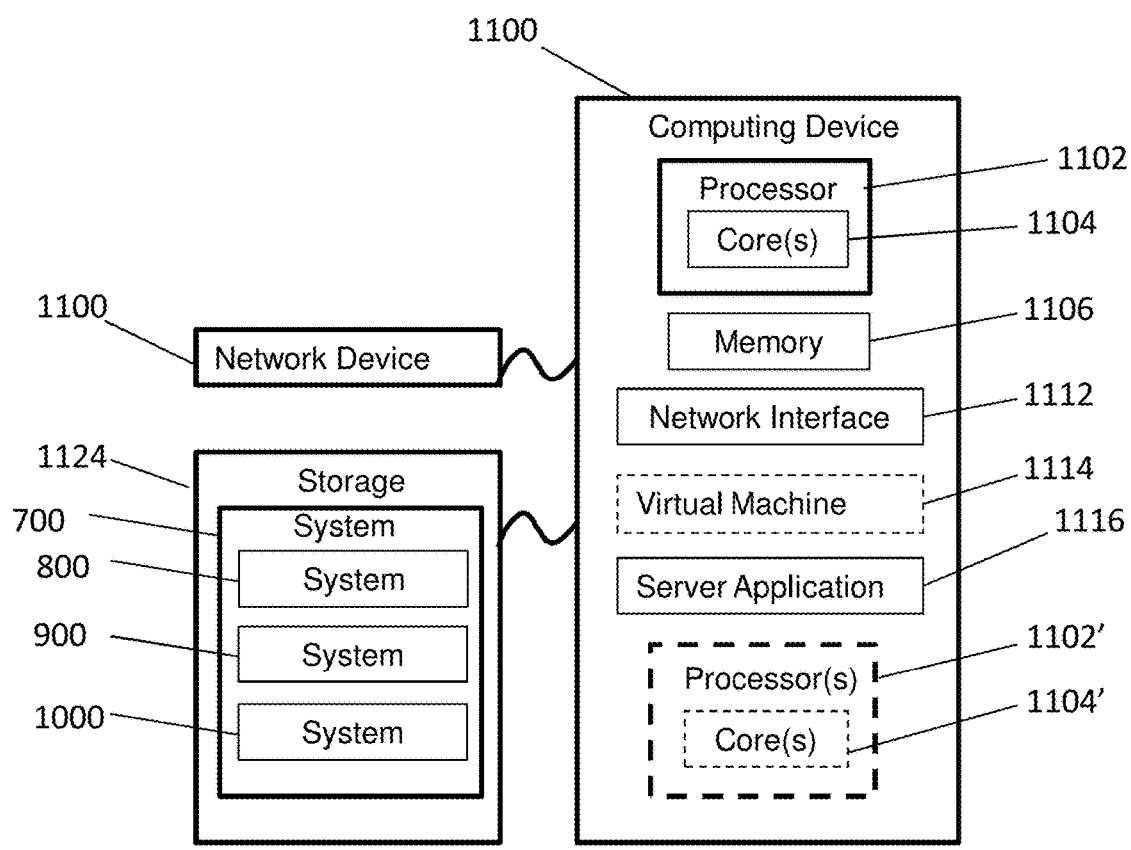
FIG. 11 depicts an exemplary server for implementing embodiments of the information retrieval system in accordance with exemplary embodiments of the present disclosure.

FIG. 11 depicts a block diagram of an exemplary computing device 1100 that can be utilized to implement embodiments of the information retrieval system (e.g., the systems 100, 800, 900, 1000). For example, the computing device 1100 can be implement embodiments of the information retrieval system 700 that includes the systems 800 and 900 or portions thereof. In the present embodiment, the computing device 1100 is configured as a server that is programmed and/or configured to execute one of more of the operations and/or functions of the information retrieval system and to facilitate communication with user devices (e.g., user devices 704*a-b*). The computing device 1100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1106 included in the computing device 1100 may store computer-readable and computer-executable instructions or software for implementing exemplary embodiments of the information retrieval system or portions thereof. The computing device 1100 also includes configurable and/or programmable processor 1102 and associated core 1104, and optionally, one or more additional configurable and/or programmable processor(s) 1102' and associated core(s) 1104' (for example, in the case of computer systems having multiple processors/cores), for executing computer-readable and computer-executable instructions or software stored in the memory 1106 and other programs for controlling system hardware. Processor 1102 and processor(s) 1102' may each be a single core processor or multiple core (1104 and 1104') processor.

Virtualization may be employed in the computing device 1100 so that infrastructure and resources in the computing device may be shared dynamically. A virtual machine 1114 may be provided to handle a process running on multiple processors so that the process appears to be using only one computing resource rather than multiple computing resources. Multiple virtual machines may also be used with one processor.

Memory 1106 may include a computer system memory or random access memory, such as DRAM, SRAM, EDO RAM, and the like. Memory 1106 may include other types of memory as well, or combinations thereof.

The computing device 1100 may also include one or more storage devices 1124, such as a hard-drive, CD-ROM, mass storage flash drive, or other computer readable media, for storing data and computer-readable instructions and/or software that can be executed by the processing device 1102 to implement exemplary embodiments of the systems described herein. For example, FIG. 11 shows system 100 stored in storage 1124, where system 700 includes embodiments of the systems 800 and 900 or portions thereof.

The computing device 1100 can include a network interface 1112 configured to interface via one or more network devices 1122 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections (including via cellular base stations), controller area network (CAN), or some combination of any or all of the above. The network interface 1112 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein. While the computing device 1100 depicted in FIG. 11 is implemented as a server, exemplary embodiments of the computing device 1100 can be any computer system, such as a workstation, desktop computer or other form of computing or telecommunications device that is capable of communication with other devices either by wireless communication or wired communication and that has sufficient processor power and memory capacity to perform the operations described herein.

The computing device 1100 may run any server application 1116, such as any of the versions of server applications including any Unix-based server applications, Linux-based server application, any proprietary server applications, or any other server applications capable of running on the computing device 1100 and performing the operations described herein. An example of a server application that can run on the computing device includes the Apache server application.

Figure 12:
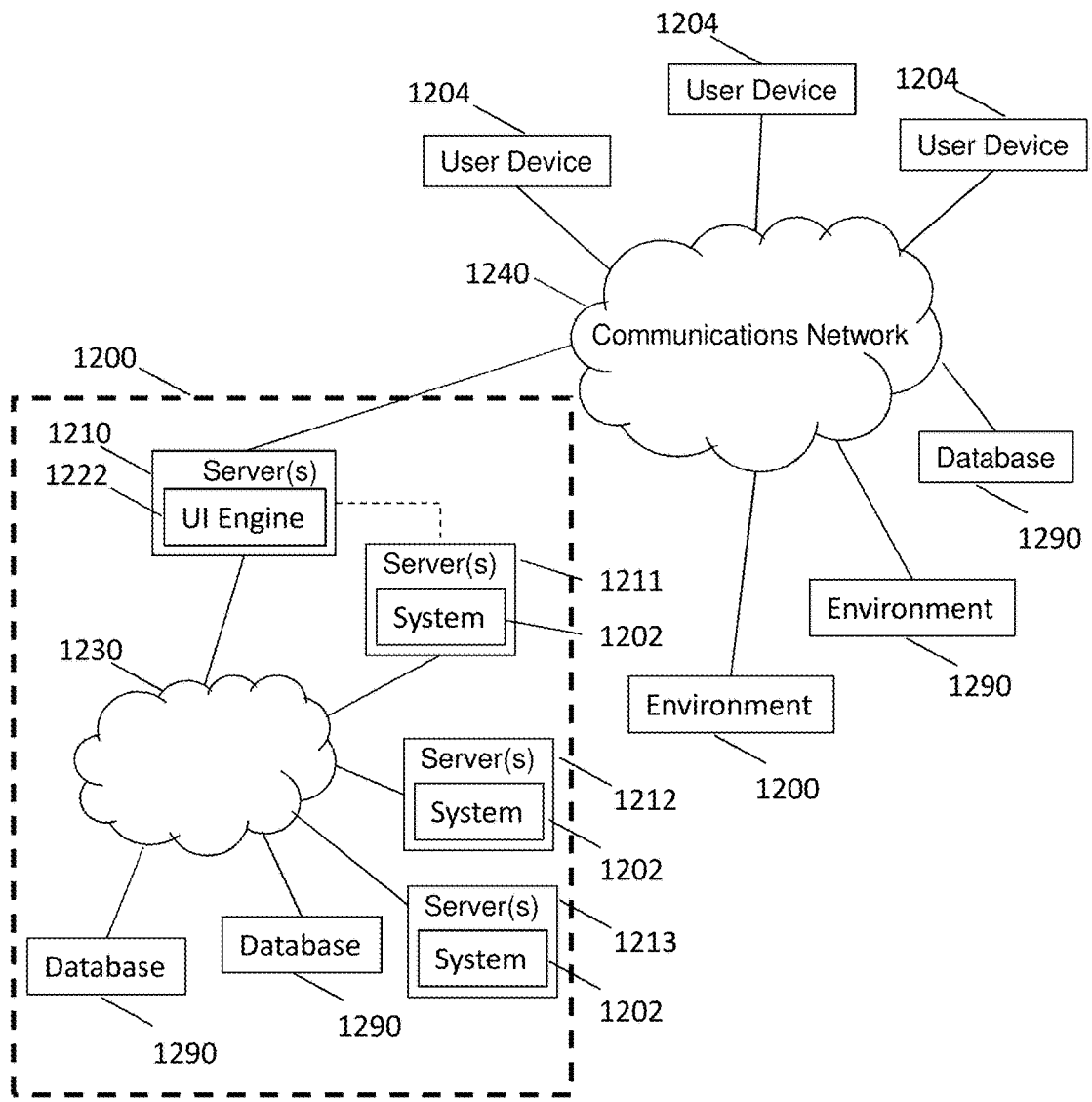
FIG. 12 depicts an exemplary distributed server environment for implementing embodiments of an information retrieval system in accordance with exemplary embodiments of the present disclosure.

FIG. 12 depicts an exemplary distributed server environment 1200 for implementing instances of embodiments of an information retrieval system 1202 or portions thereof in accordance with embodiments of the present disclosure, as shown, for example, in FIGS. 7-9. As shown in FIG. 12, the environment 1200 can include servers 1210-1213, repositories (or databases) 1290 (e.g., source repository 790, repositories 890 and/or repositories 990, repositories 1090), which can be operatively coupled to each other through a communication network 1230. The communication network can be implemented as an Intranet, virtual private network (VPN), wide area network (WAN), local area network (LAN), and/or other suitable communication network.

Any one of the servers 1210-1213 can be programmed to implement instances of the information retrieval system 1202 or portions thereof including embodiments of the user interface engine, the order analysis engine, the candidate retrieval engine, and/or the candidate presentation engine described herein, as well as, any rules and other operations described herein including for example natural language processing using natural language resources (e.g., the servers 1210-1213 can be collectively programmed to implement embodiments of the information retrieval system). In some embodiments, particularly servers can be programmed to implement particular portions of the system 1202 such that the group of server is collectively programmed to implement embodiments of the information retrieval system (e.g., the server 1211 can execute instances of the order analysis engine; the server 1212 can execute instances of the candidate retrieval engine; and the server 1213 can implement instances of the candidate presentation engine). In the present example, the server 1210 can execute a user interface engine 1222 to facilitate interaction between user devices 1204 and the instances of the information retrieval systems 1202. The server 1210 can receive search orders and provide presentation instructions and the search results to the requesting user devices 1204. The presentation instructions can be used by the user devices 1204 to render the search results via one or more GUIs.

The user devices 1204 can be operatively coupled to the sever 1210 via a communication network 1240, which can be the Internet, a wide area network (WAN), local area network (LAN), and/or other suitable communication network. The user devices 1204 can initiate communication with the server 1210 to establish communication sessions and can submit one or more search orders to the server 1210. Upon receipt of a search order, the server 1210 can interact with the servers 1210-1213 to process the order by executing embodiments of the user interface engine 1222, which may correspond to the user interface engine 722, executing embodiments of the order analysis engine (e.g., order analysis engine 730, 830, 930, 1030) to generate a search strategy; executing embodiments of a candidate retrieval engine (e.g., candidate retrieval engines 740, 840, and/or 940 or candidate engine 1040) to generate one or more queries in one or more query languages based on the search strategies and retrieve trademarks and metadata from the one or more repositories 1290, which may correspond to the repositories 790, 890, and/or 990; and executing embodiments of the candidate presentation engine (e.g., candidate presentation engines 750, 850, and/or 950 or candidate engine 1040).

FIGS. 13-26 depict exemplary graphical user interfaces (GUIs) that can be displayed on a user device in response to data and instructions received from embodiments of the system(s) (e.g., systems 700, 800, 900, and/or 1000). The GUIs can allow a user to interact with the system by generating an order and transmitting the order from a user device to one or more servers executing the system or portion thereof, e.g., as described with reference to FIG. 6. The GUIs can also present search results via the GUIs in response to received orders by transmitting results data and instructions from the one or more servers to the user device.

Figure 13:
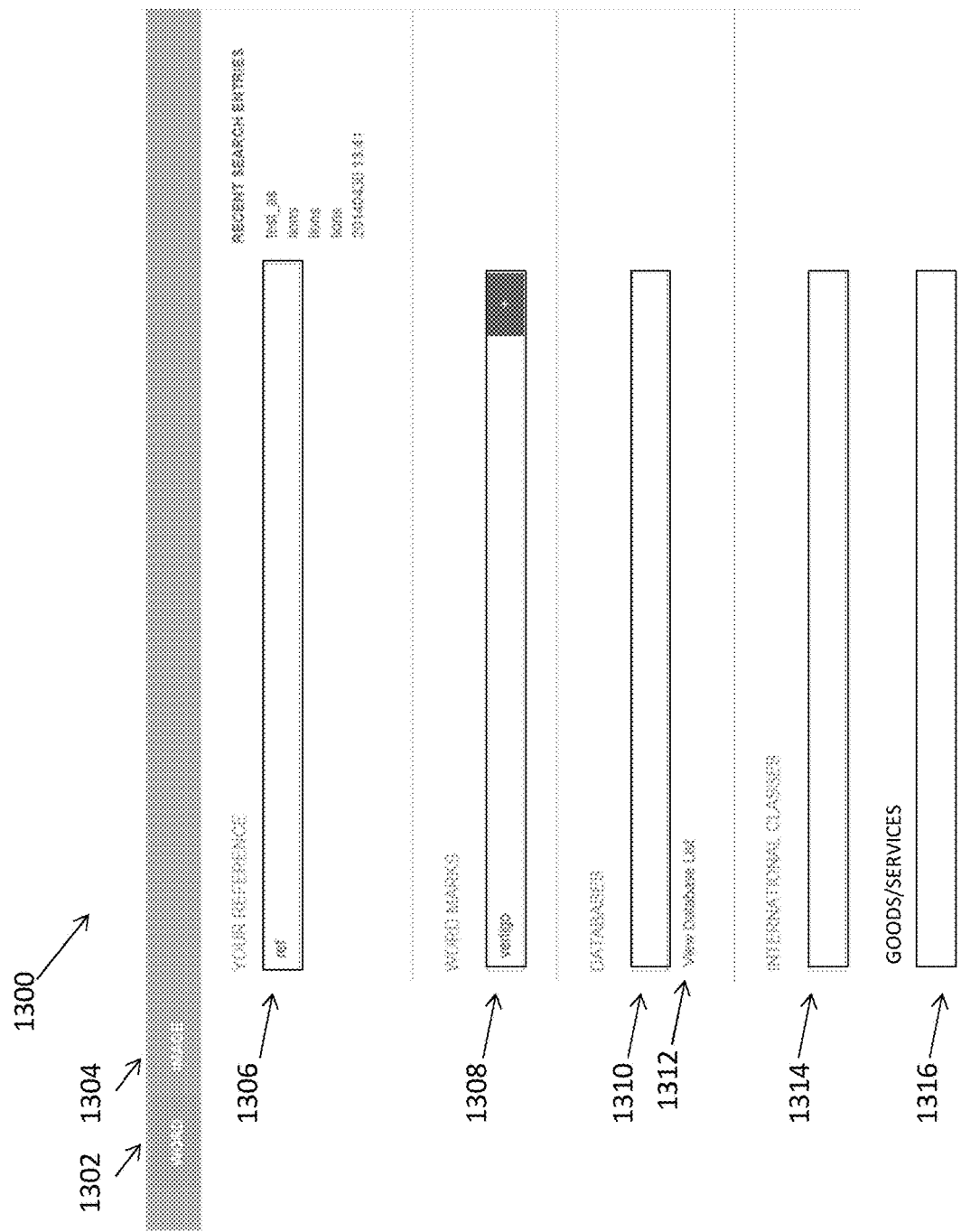
FIG. 13 depicts an exemplary graphical user interface that can be rendered on a display of a user device in response to data and one or more instructions being transmitted to the user device based on an execution of the information retrieval system shown in FIG. 2.

FIG. 13 depicts an exemplary graphical user interface 1300 that can be rendered on a display of a user device in response to data and one or more instructions being transmitted to the user device in response to an execution of the system 800 or 1000 shown in FIG. 8 or 10. For example, to begin the user can select to search for word marks by selecting a link 1302 or can select a link 1304 to search for trademark images. As shown in FIG. 13, the user has selected the link 1302.

The GUI 1300 can include data entry fields 1306, 1308, 1310, 1314, 1316. The data entry field 1306 is provided by the GUI 1300 to allow the user to enter a user reference to associate with the search. The data entry field 1308 is provided by the GUI 1300 to allow the user to enter one or more terms (e.g., corresponding to a trademark for which the user wishes to identify confusingly similar trademarks). The data entry field 1310 is provided by the GUI 1300 to allow the user to specify which repositories the user wishes to have the system 800 or 1000 search. In exemplary embodiments, the user may begin typing the names of repositories and the system 800 or 1000 can utilize an automatic completion function to identify and select a particular repository or the user can select a link 1312 to open another GUI to provide a list of repository that can be selected by the user. The data entry field 1314 is provided by the GUI 1300 to allow the user to specify which international classes the user would like to include in the search (e.g., based on the type of goods or services that are or will be associated with the terms entered in the data entry field 1308). The data entry field 1316 is provided by the GUI 1300 to allow the user to specify goods or services that are or will be associated with the terms entered in the data entry field 1308, and which can be expanded upon by the system as well as used by the system to identify and return marks that may be confusingly similar to the terms provided in the data entry field 1308. Once the user has entered the information in the data entry fields 1306, 1308, 1310, 1314, and/or 1316 the user can submit an order including the information to a distributed server environment for processing by the system 800 or 1000.

Figure 14:
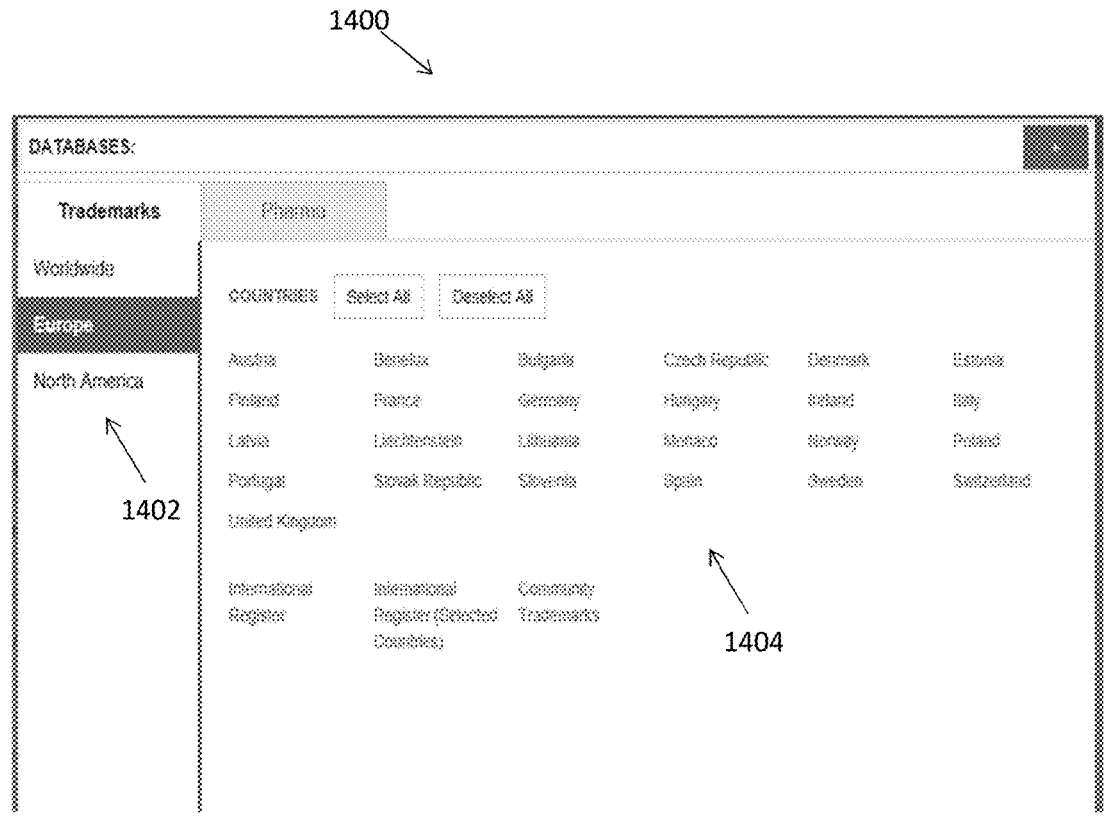
FIG. 14 depicts an exemplary graphical user interface that can be rendered on a display of a user device to provide a list of selectable repositories that can be included in a search order.

FIG. 14 depicts an exemplary graphical user interface 1400 that can be rendered on a display of a user device to provide a list 1404 of selectable repositories that can be included in the order. As shown in FIG. 14, the GUI 1400 can include links 1402, which can be selected by the user to provide lists of repositories by geographic location (e.g., worldwide, Europe, North America). For example, FIG. 14 shows repositories associated with trademark repositories for European countries. To include the repositories listed in the GUI 1400 in a search order, the user can select the repositories from the list 1404.

Figure 15:
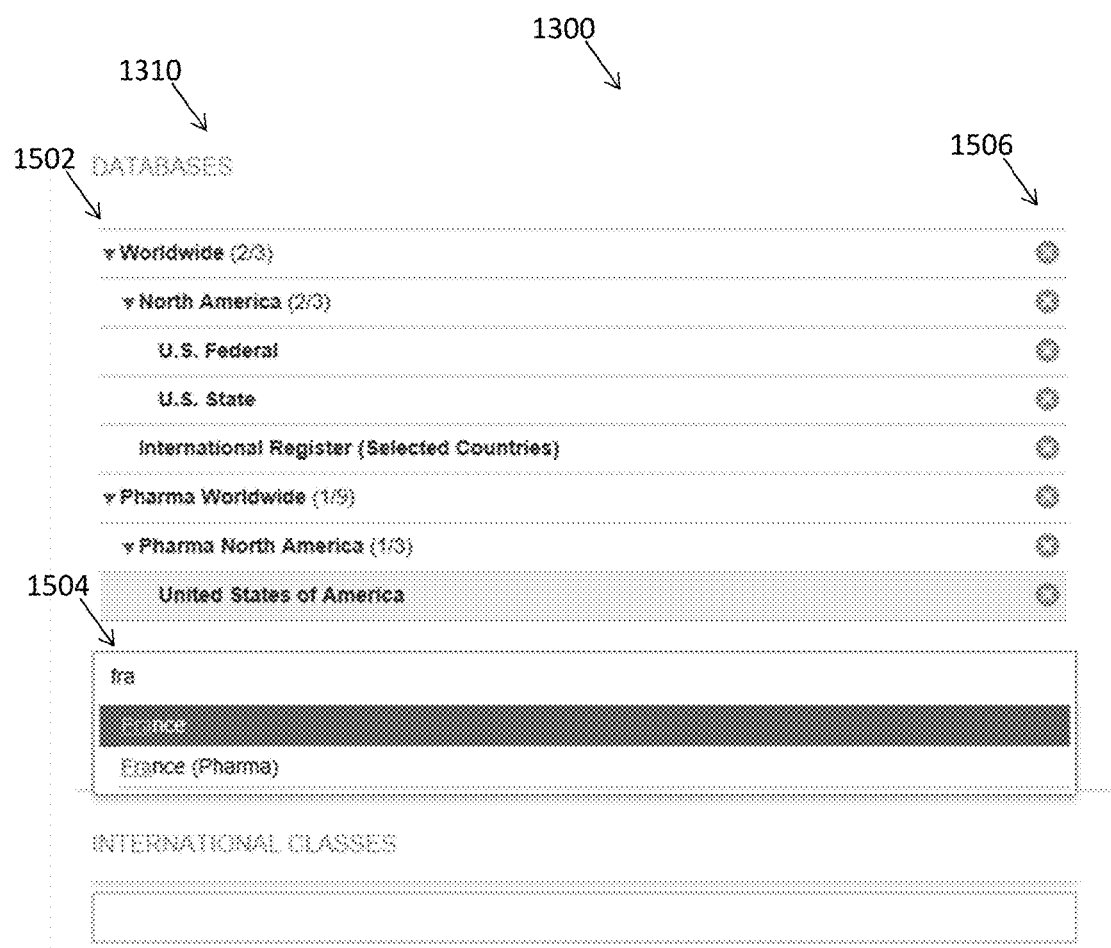
FIG. 15 depicts a portion of a GUI showing a data entry field for repository selection.

FIG. 15 depicts a portion of the GUI 1300 showing the data entry field 1310 for the repository selection. As shown in FIG. 15, the user has selected repositories 1502 for search and is entering text 1504 to add another repository to the selected repositories 1502. The user can remove selected repository by selecting the remove link 1506 associated with a respective one of the selected repositories.

Figure 16:
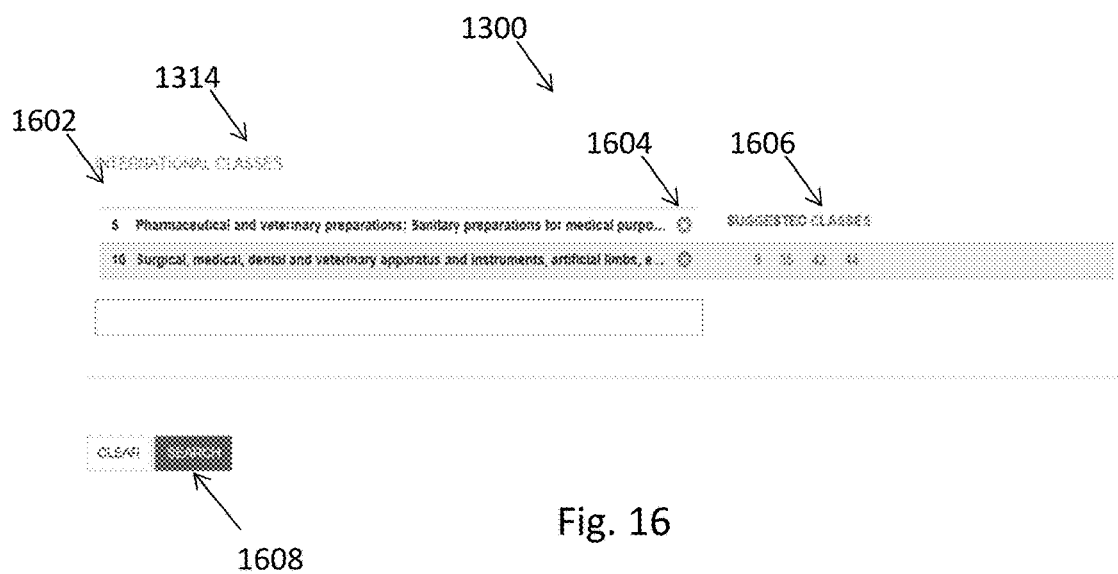
FIG. 16 depicts a portion of a GUI showing a data entry field for international class selection.

FIG. 16 depicts a portion of the GUI 1600 showing the data entry field 1314 for the international class selection. As shown in FIG. 16, the user has selected international classes 1602 for search. The user can remove selected repository by selecting the remove link 1604 associated with a respective one of the selected repositories. In exemplary embodiments, the system 800 can suggest additional classes 1606 to be included in the search order based on, for example, a correlation of relationship between the selected classes and other classes that have not yet been selected. After the user has entered the information in GUI 1300, the user can select the search button 1608 to instruct the user device to transmit the search order to a distributed server environment, which executes the system 800 as described herein.

Figure 17:
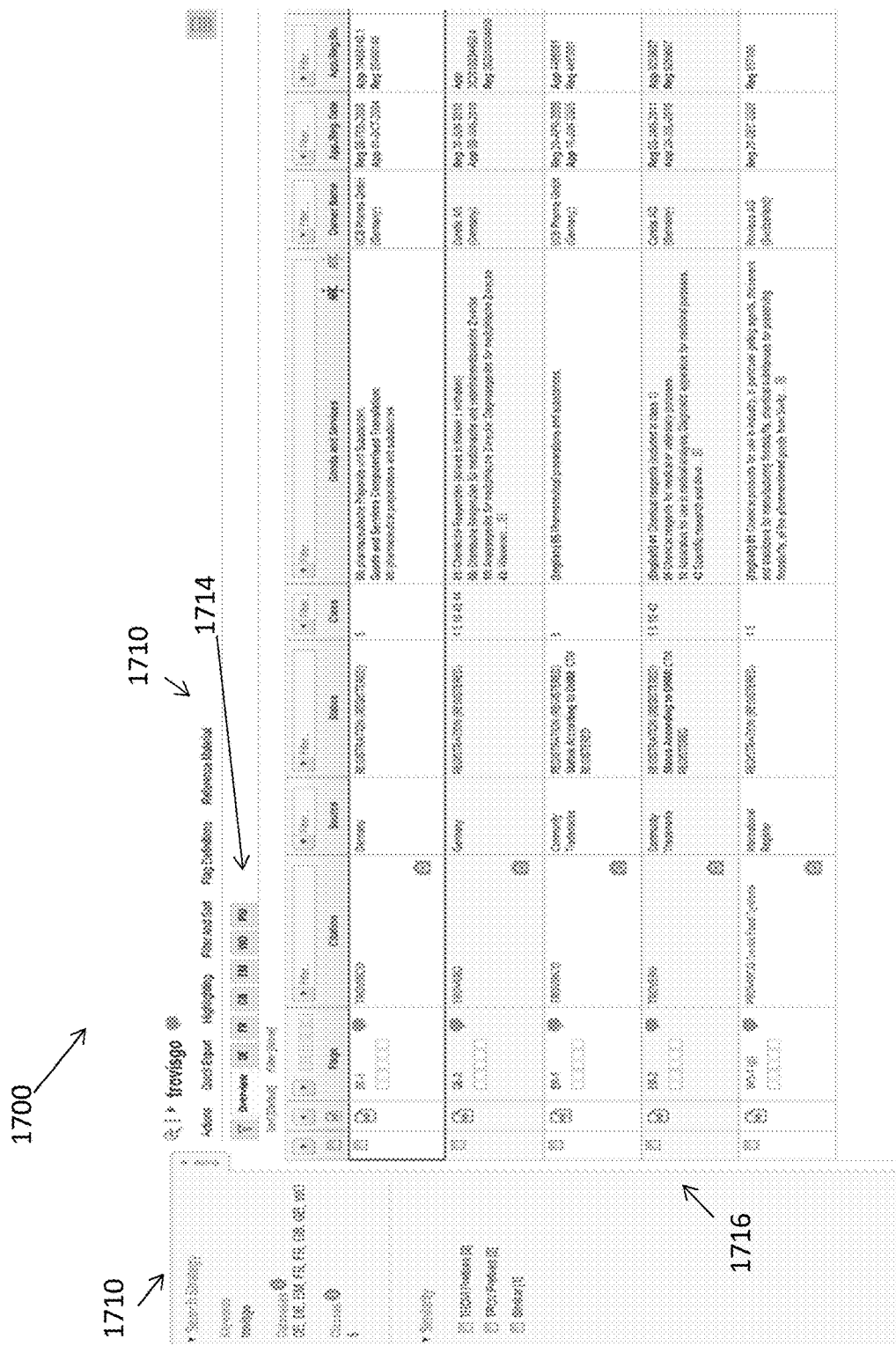
FIG. 17 depicts an exemplary graphical user interface that can be rendered on a display of a user device in response to search results and one or more presentation instructions being transmitted to the user device from the distributed server environment upon completion of a search by the system shown in FIG. 8.

FIG. 17 depicts an exemplary graphical user interface 1700 that can be rendered on a display of a user device in response to search results and one or more presentation instructions being transmitted to the user device from the distributed server environment upon completion of a search by the system 800 or 1000 shown in FIGS. 8 and 10. The GUI 1700 can display the search strategy 1710 used by the system 800 to retrieve results 1716. As shown in FIG. 17, the user select different options 1712 to control a presentation of the results in the GUI 1700 and/or to initiate one or more actions. The results 1716 can be listed in the GUI 1700 according to the jurisdiction or repository from which the results are received. For example, the user can select tabs 1714 to view the results by jurisdiction or repository.

Figure 18:
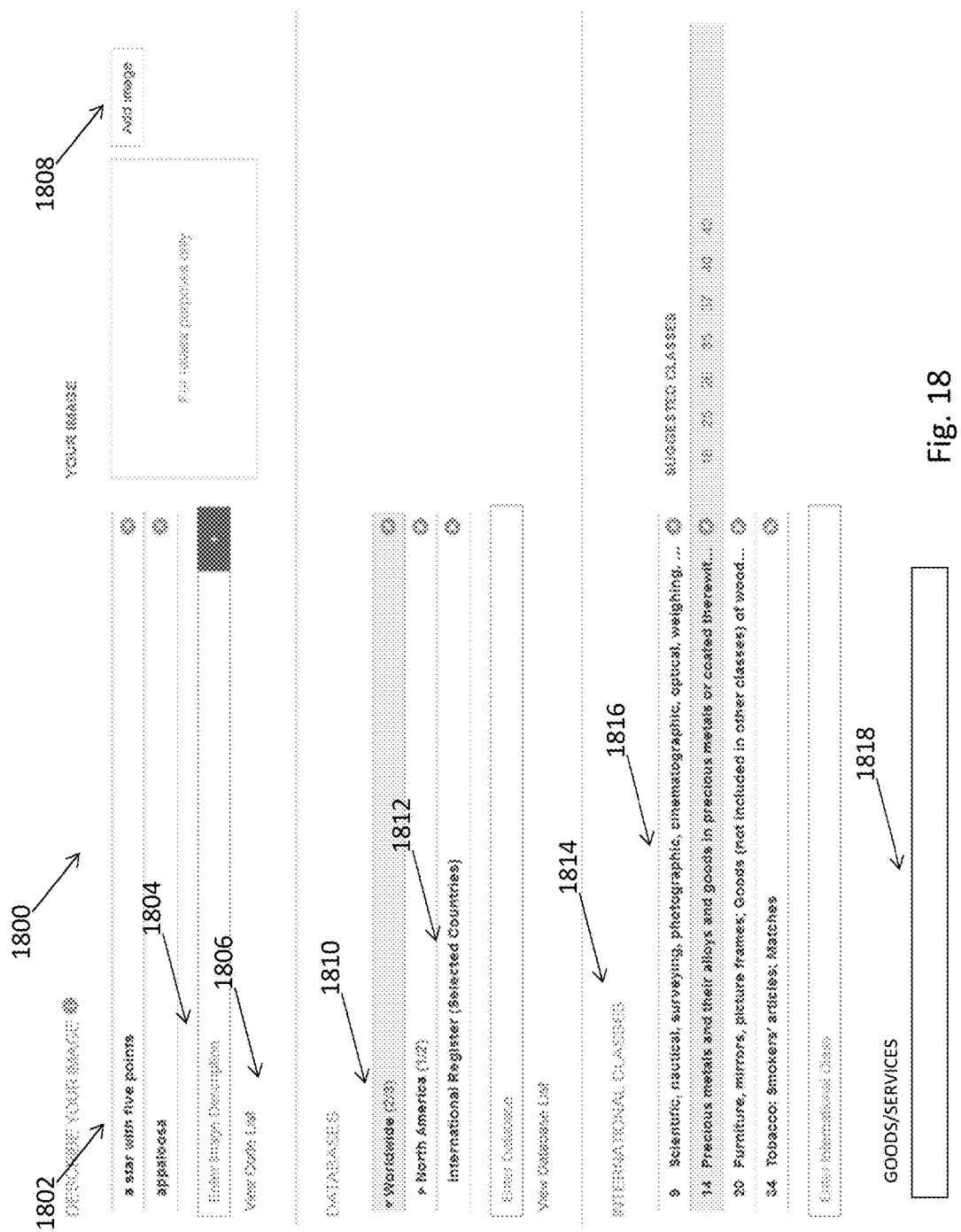
FIG. 18 depicts an exemplary graphical user interface that can be rendered on a display of a user device in response to data and one or more instructions being transmitted to the user device in response to an execution of the system shown in FIG. 9.

FIG. 18 depicts an exemplary graphical user interface 1800 that can be rendered on a display of a user device in response to data and one or more instructions being transmitted to the user device in response to an execution of the system 900 or 1000 shown in FIGS. 9-10. For example, to begin the user can select to search for trademark images by selecting a link to navigate to the GUI 1800 for trademark image searching (e.g., link 1304 shown in FIG. 13).

The GUI 1800 can include data entry fields 1802, 1810, and 1814. The data entry field 1802 is provided by the GUI 1800 to allow the user to enter a description 1804 of an image for which confusingly similar results are desired (e.g., "a star with five points", "appaloosa"). The user can also select the link 1806 to navigate to a GUI that displays code lists for describing images. In some embodiments, the user can add the image being described in the data entry field 1802. For example the user can select an add image button 1808 to upload an image to the GUI 1800. The data entry field 1810 is provided by the GUI 1800 to allow the user to specify which repositories 1812 the user wishes to have the system 900 or 1000 search, which can be implemented, for example, as described with reference to data entry field 1310 of FIGS. 13-15. The data entry field 1814 is provided by the GUI 1800 to allow the user to specify which international classes 1816 the user would like to include in the search (e.g., based on the type of goods or services that are or will be associated with the terms entered in the data entry field 1802. The data entry field 1814 can be implemented, for example, as described with reference to data entry field 1310 of FIGS. 13 and 16. The data entry field 1818 is provided by the GUI 1800 to allow the user to specify goods or services that are or will be associated with the terms entered in the data entry field 1802, and which can be expanded upon by the system as well as used by the system to identify and return marks that may be confusingly similar to the terms provided in the data entry field 1802.

Figure 19:
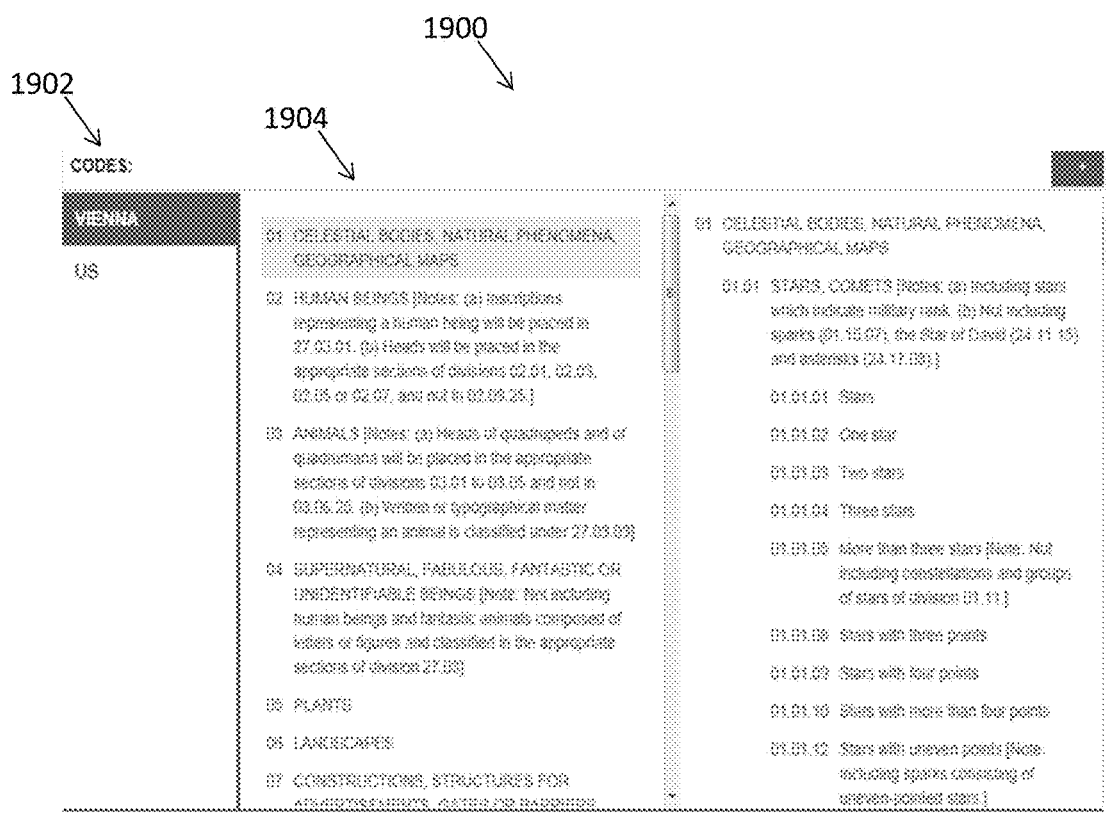
FIG. 19 depicts an exemplary graphical user interface that can be rendered on a display of a user device to provide a list of selectable codes that can be included in the order.

FIG. 19 depicts an exemplary graphical user interface 1900 that can be rendered on a display of a user device to provide a list 1904 of selectable codes that can be included in the order. As shown in FIG. 19, the GUI 1900 can include links 1902, which can be selected by the user to provide lists of codes by code source (e.g., Vienna, U.S.). For example, FIG. 19 shows codes associated with trademark image repositories for the Vienna coding scheme. To include the codes listed in the GUI 1900 in a search order, the user can select the codes from the list 1904. This allows a user to browse the code book from which the rules and retrieval logic were derived to gain some insight on what is known on a concept level or to directly select a set of codes to be retrieved.

Figure 20:
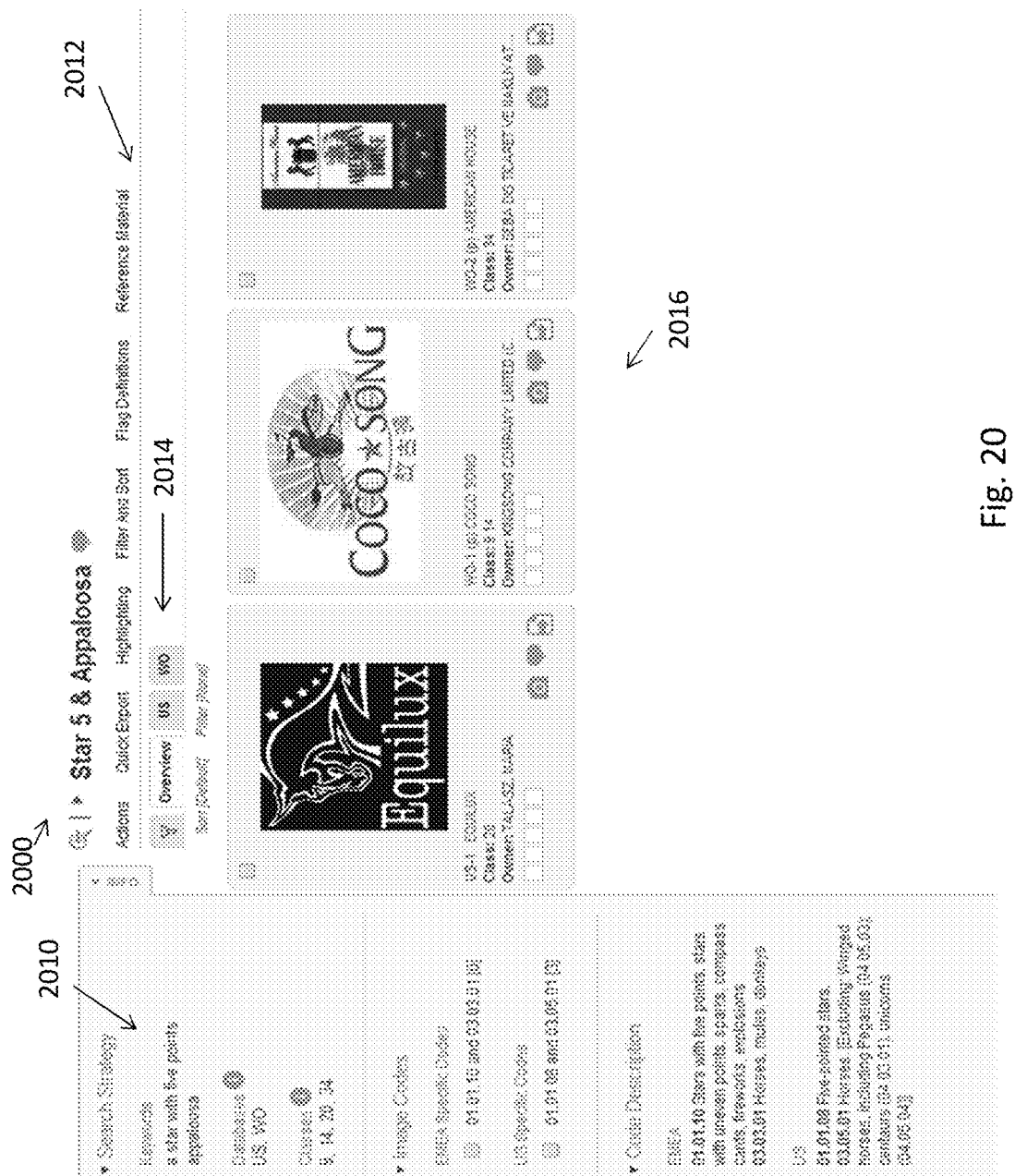
FIG. 20 depicts an exemplary graphical user interface that can be rendered on a display of a user device in response to data and one or more presentation instructions being transmitted to the user device from a distributed server environment executing the information retrieval system shown in FIG. 9.

FIG. 20 depicts an exemplary graphical user interface 2000 that can be rendered on a display of a user device in response to data and one or more presentation instructions being transmitted to the user device from the distributed server environment executing the system 900 shown in FIG. 9. The GUI 2000 can display the search strategy 2010 used by the system 900 to retrieve results 2016. As shown in FIG. 20, the user select different options 2012 to control a presentation of the results in the GUI 2000 and/or to initiate one or more actions. The results 2016 can be listed in the GUI 1700 according to the jurisdiction or repository from which the results are received. For example, the user can select tabs 2014 to view the results by jurisdiction or repository. As shown in FIG. 20, the retrieved images for the desired registered trademark repositories and international classes correspond to the running example of the order "a star with five points", "appaloosa". All three images have a horse (not necessarily an appaloosa as this was mapped onto the concept of a horse because the encoding is not more specific) and one or more five pointed stars.

Figure 21:
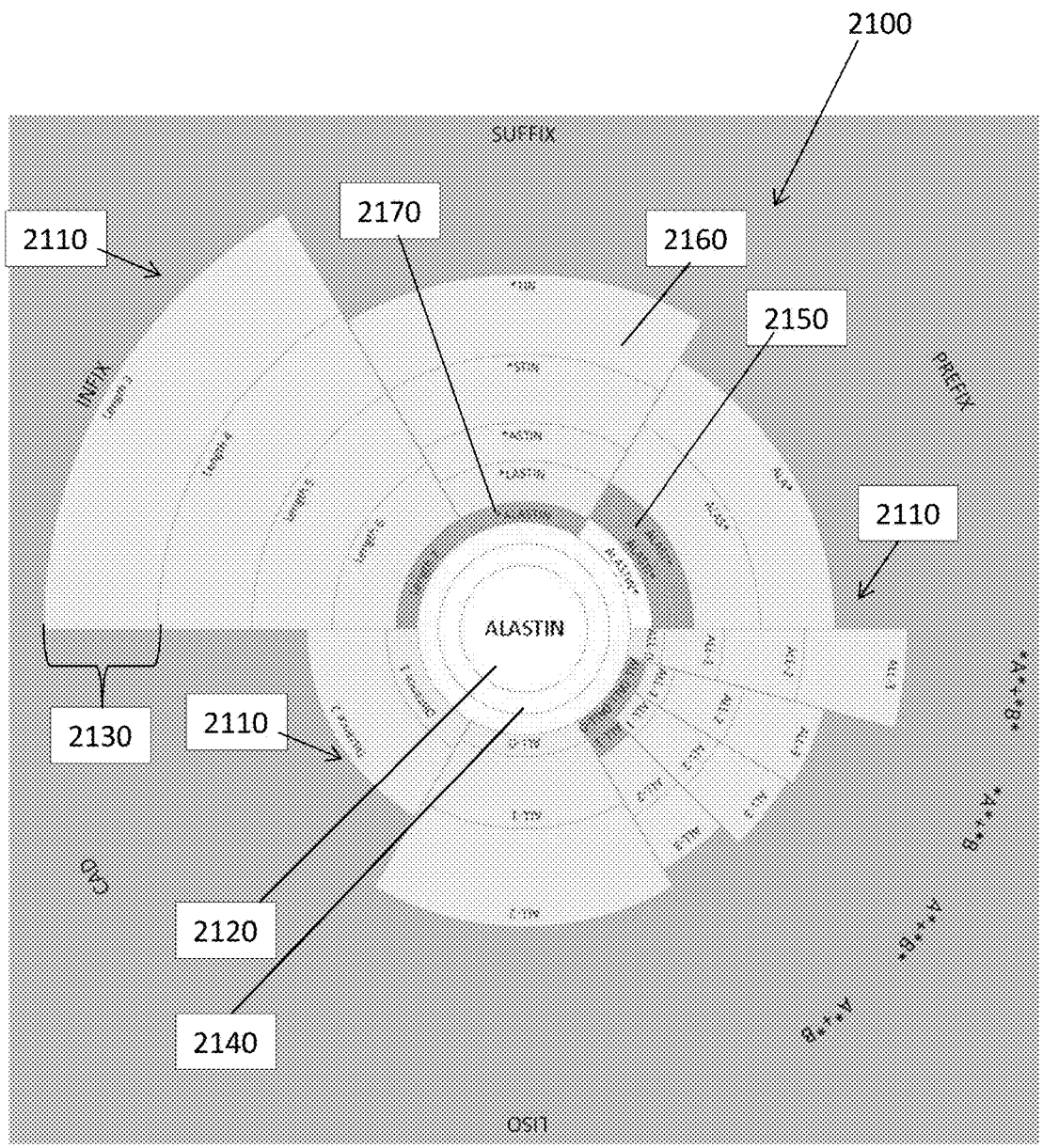
FIG. 21 shows an exemplary graphical user interface to provide an indication of similarities between trademarks and/or descriptions of goods and/or services in accordance with embodiments of the present disclosure.

FIG. 21 shows an exemplary GUI 2100 to provide indicators related to similarities between trademarks and/or descriptions of goods and/or services in accordance with embodiments of the present disclosure (e.g., by embodiments of the systems 700, 800, 900, 1000 described herein). As shown in FIG. 1, the GUI 2100 can include interactive graphics for presenting, e.g., trademark search results according to various types of similarities (such as the similarity measures described herein) and with various types of emphasis. While FIG. 21 provides a non-limiting example of the GUI using a trademark name and similarities between the trademark name and registered trademarks returned from a trademark search, exemplary embodiments of the present disclosure can present descriptions of goods and/or services using the GUI 2100, trademarks and descriptions of goods and/or services, and/or any other combinations of attributes and/or similarities in a manner that is identical or substantially identical to the non-limiting example shown in FIG. 21.

In the present exemplary, the graphics of the GUI 2100 are formed as radially and circumferentially offset segments 2110. Each segment can represent a subset of the search results, where the search results are grouped in the segments based on one more metrics and/or similarity measures. The segments 2110 can be selectable by a user to (1) navigate to one or more other GUIs or views of the search results or to (2) have the Candidate Retrieval Engine 840 retrieve additional results that fit into the selected segment or to (3) filter out results from the selected segment depending on some filter criterion. For example, in the case of (1), in response to selection one of the segments 2110 by a user, the systems 700, 800, 900, and/or 1000 can be configured to navigate to a GUI that provides a word cloud of including the individual results represented by the selected segment and/or can navigate to a GUI that provides a table or list of the search results represented by the selected segment. The position, size, and/or color of a segment can provide different emphasis on the segments to provide different indicators associated with the results they represent.

The segments can be arranged in sets that are aligned in the radial direction outward from a center circle 2120, which includes the search trademark input string (e.g., ALASTIN in the present example), but can include other information included in a search order, such as a reference description of goods and/or services. Each set can correspond to a metric or a similarity measure, such as a metric or similarity measure described herein. The closer a segment is positioned to the center circle 2120, the more relevant and/or similar the trademarks (and/or description of goods and/or services and/or any other field in a trademark record) are that are represented by the segment. Likewise, the further radially outward a segment is positioned from the center circle 2120, the less relevant and/or similar the trademarks (or description of goods and/or services) are that are represented by the segment. In embodiments of the present disclosure, each segment in a set of segments can represent a hierarchical or level for a similarity measure. As a non-limiting example, a similarity measure can be a string similarity measure that counts the quantity of characters that match at least a subset of the characters included in the trademark input string (or the reference description of goods and/or services). In some embodiments, the ordering of the characters can be required to be identical and in some embodiments, the ordering of the characters is irrelevant. In this example, the inner most segment or concentric circle can represent those trademarks in the search results that have all of the characters in the trademark input string. As each segment is positioned further radially outward, the similarity requirement can be reduced (e.g., by reducing the quantity of characters that need to appear in a trademark result and the input trademark string to trigger a match).

A size or width (e.g., a width 2130) of a segment (e.g., measured parallel to a radius to which the set including the segment is aligned) can be indicative of one or attributes of the search results represented by the segment. As one non-limiting example, the size or width of a segment can be indicative of a quantity of results that are represented by the segment. For example, the larger the size or width of a segment is, the greater the quantity of search results the segment includes.

A color of a segment can be indicative of one or attributes of the search results represented by the segment. As one non-limiting example, the color of a segment can be indicative of whether any search results are included in the segment; if there are search results included in the segment, whether some, all, or none of the results are being reported for the segment. With reference to the example, GUI 2100 shown in FIG. 21, the inner most circle 2140 can be a first color (e.g., white) to indicate that no trademarks were retrieved by the candidate retrieval engine or candidate engine (e.g., embodiments of the candidate retrieval engines 740, 840, and 940, and/or embodiments of the candidate engine 1040) that satisfied the metric or similarity requirement associated with the inner most circle 2140 (e.g., that the search results include an identical string of characters as the trademark input string). A segment 2150 can be second color (e.g., green) to indicate that the segment includes a subset of search results satisfied the metric or similarity requirement associated with the segment 2150 and that all of the results satisfying the metric or similarity requirement associated with the segment 2150 have been reported (e.g., that the search results include a prefix having a quantity of consecutively arranged characters in the prefix that matches a specified quantity of characters in the trademark input string in the order the specified characters are arranged in the trademark input string). A segment 2160 can be third color (e.g., yellow) to indicate that the segment includes a subset of search results satisfying the metric or similarity requirement associated with the segment 2160 and that only some of the results satisfying the metric or similarity requirement associated with the segment 2150 have been reported (e.g., that the search results include a prefix having a quantity of consecutively arranged characters in the prefix that matches a specified quantity of characters in the trademark input string in the order the specified characters are arranged in the trademark input string).

Figure 22:
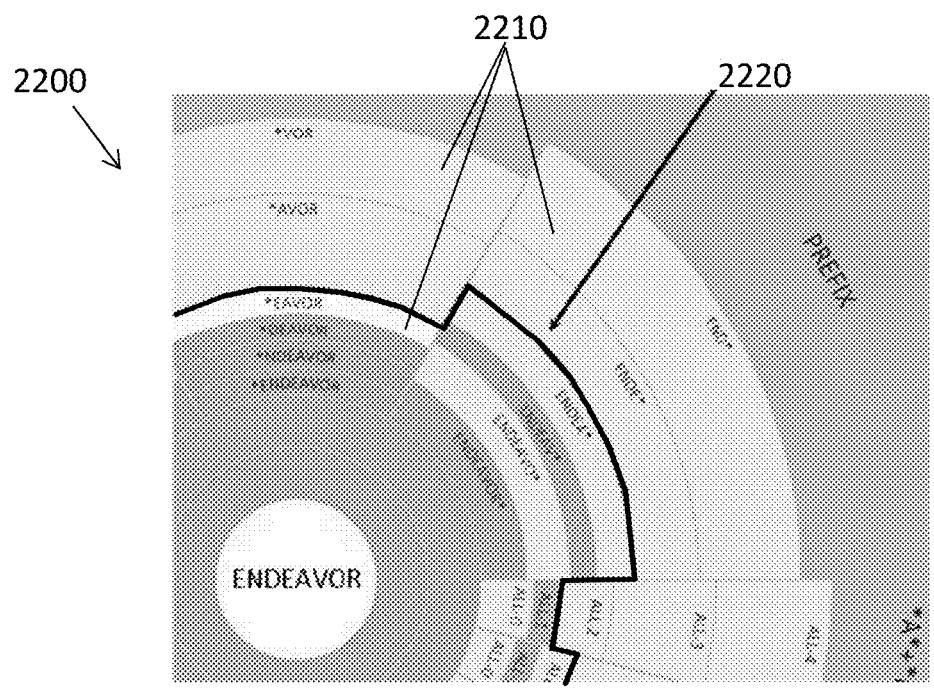
FIG. 22 shows an exemplary graphical user interface to provide demarcation in the presentation of results based on one or more criteria in accordance with embodiments of the present disclosure.

FIG. 22 shows an exemplary graphical user interface 2200 to provide demarcation in the presentation of search results based on one or more criteria in accordance with embodiments of the present disclosure (e.g., by embodiments of the systems 700, 800, 900, 1000 described herein). For example, the GUI 2200 can includes segments 2210 that represent search results as described herein with reference to FIG. 21. The marker 2220 that can extend about (e.g., radially and/or circumferentially about) the graphic to demarcate a boundary in the search results. As a non-limiting example, the marker 2220 can define demarcation corresponding to a quantity of results such that the segments disposed radially inwardly from the marker 2220 can represent a specified quantity of the most relevant and/or similar search results and the segments disposed radially outward from the marker 2220 can include a remainder of the search results. In some embodiments, the quantity associated with the marker 2220 can be specified by a user to allow the user to define and readily identify and view a subset of the results. As another example, the marker 2220 can indicate each segment disposed radially inward from the marker 2220 or radially outward from the marker 2220 can be restricted in size such that only a specified maximum quantity of results can be included in each segment.

Figure 23:
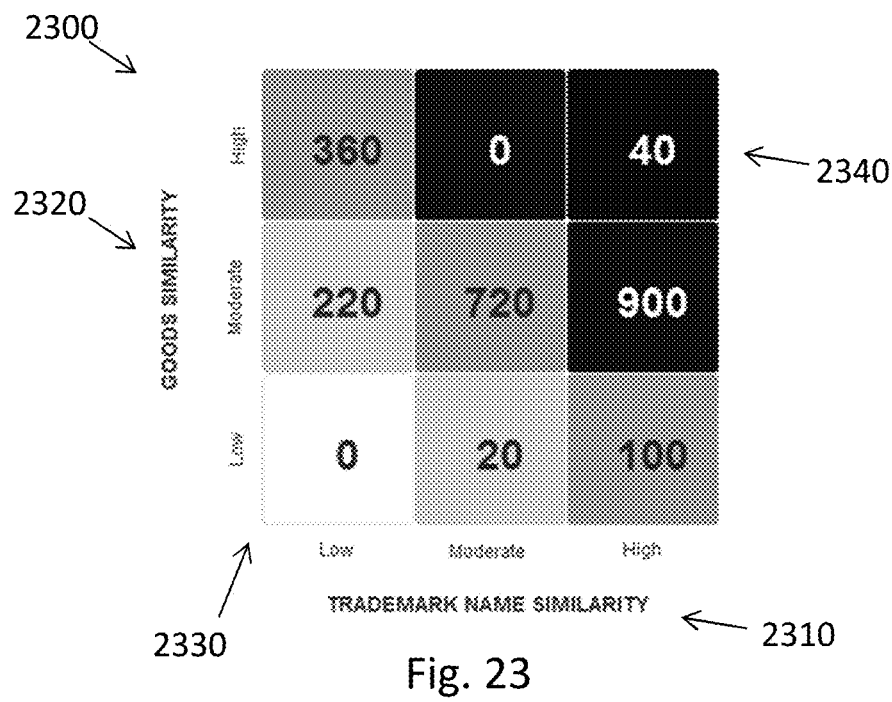
FIG. 23 shows an exemplary GUI to provide an indication of similarities between trademarks and descriptions of goods and/or services in accordance with embodiments of the present disclosure.

FIG. 23 shows an exemplary GUI 2300 that can be presented to and/or rendered on a display of a user device in response to data and one or more presentation instructions being transmitted to the user device from the distributed server environment executing embodiments of the systems, 700, 800, 900, and/or 1000 described herein. The GUI 2300 can include a color-coded matrix that ranks, sorts, filters and/or prioritizes trademark search results based on similarity values/scores generated by embodiments of the goods and/or services similarity engine 100 shown in FIG. 1 and/or the trademark similarity engine 640 shown in FIG. 6. For example, as shown in FIG. 23, a horizontal axis 2310 of the matrix can correspond trademark similarities and a vertical axis 2320 can correspond to good and/or services similarities. The trademark and goods and/or services similarities can be generalized or binned into one of three (or more) groups, e.g., "Low" similarity, "Moderate" similarity, and "High" similarity. The graphics of the GUI 2300 can emphasize the data points the similarity engine determines to be the most important for the user and enhance their processing by the user.

In present example, an embodiment of the context analyzer 600 can determine that forty of the trademarks returned in response to the search are highly similar to the trademark input string included in the search order and that these forty trademarks also have highly similar descriptions of goods and/or services to the reference description of goods and/or services included in the search order (shown in section 2340 in FIG. 23). Similarly, an embodiment of the context analyzer 600 can determine that zero of the trademarks returned in response to the search have a low similarity to the trademark input string included in the search order and that these zero trademarks also have a low similarity to the descriptions of goods and/or services to the reference description of goods and/or services included in the search order (shown in section 2330 in FIG. 23). Embodiments of the data visualizers described herein can generate the color coded matrix such that each section of the matrix has a different color. For example, the section of the matrix for the trademarks having low trademark and goods and/or services similarities can have a first color (e.g., white) and the section of the matrix for the trademarks having high trademark and goods and/or services similarities can have a second color (e.g., dark blue). The sections of the matrix can be selected by a user via the graphical user interface 2300 to navigate to individual trademark results to review the trademarks and the outputs of the elements of the context analyzer 600.

Figure 24:
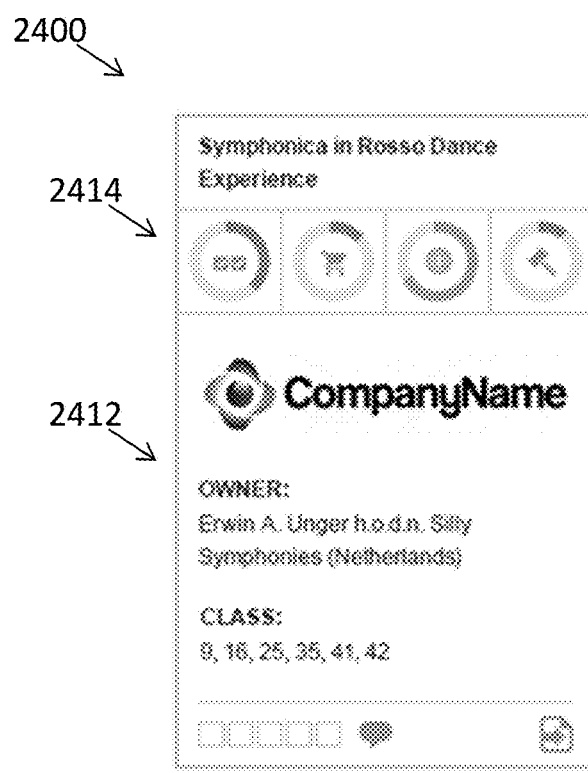
FIG. 24 shows an exemplary GUI to provide general information about a trademark in accordance with embodiments of the present disclosure.

FIG. 24 shows an exemplary GUI 2400 that can be rendered on a display of a user device in response to data and one or more presentation instructions being transmitted to the user device from the distributed server environment executing embodiments of the systems, 700, 800, 900, and/or 1000 described herein. The GUI 2400 can show general information 2412 associated with a trademark returned by the search. For example, the GUI 2400 can include general information 2412, such as the trademark, the owner of the trademark, the classes for which the trademark is registered, and/or any other suitable information about the trade. The GUI 2400 can include selectable tabs 2414 that allow the user to navigate to information generated by the elements of the context analyzer 600.

Figure 25:
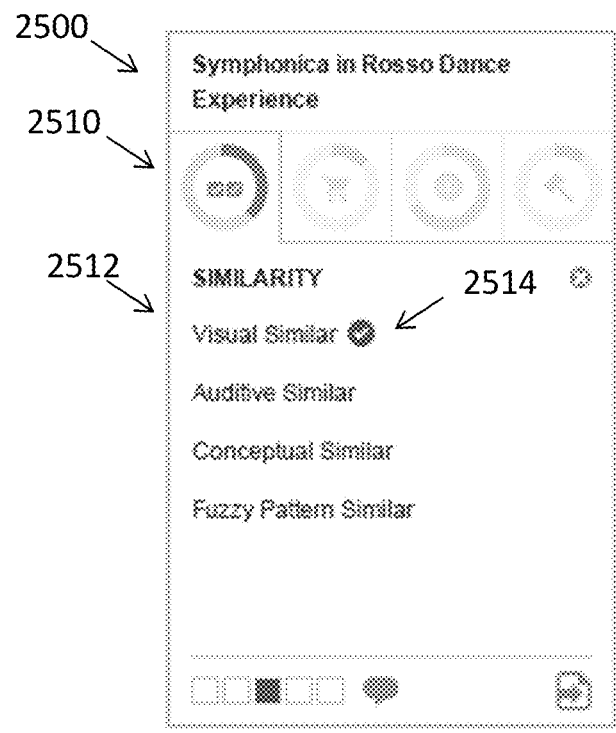
FIG. 25 shows an exemplary GUI to provide trademark similarity information about a trademark in accordance with embodiments of the present disclosure.

FIG. 25 shows an exemplary GUI 2500 that can be rendered on a display of a user device in response to data and one or more presentation instructions being transmitted to the user device from the distributed server environment executing embodiments of the systems, 700, 800, 900, and/or 1000 described herein. The GUI 2500 can be rendered in response to selection of the trademark similarity tab 2510 and can show trademark similarities 2512 as determined by the trademark similarity engine 640 (e.g., FIG. 6). For example, the GUI 2500 can list various similarity measures generated by the trademark similarity engine including, for example, "Visual Similarity", which indicates that the trademark search string looks similar to the trademark returned by the search, "Auditive Similar", which can indicate that the trademark input string sounds similar to the trademark returned by the search, "Conceptual Similar", which indicates that the input trademark string includes concepts that are similar to the concepts included in the trademark returned by the search, and "Fuzzy Pattern Similar", which indicates that that trademark similarity engine has determined that the trademark input string recognized one or more similar patterns between the trademark input string and the trademark returned by the search. In the present example, the check mark 2514 indicates that, for the particular trademark the GUI 2500 is rendered, the trademark similarity engine has determined that the input trademark string and the trademark returned by the search are visually similar. The tab 2510 can include an indicator that indicates a degree of similarity between the trademark input string and the trademark returned by the search as determined by the trademark similarity engine.

Figure 26:
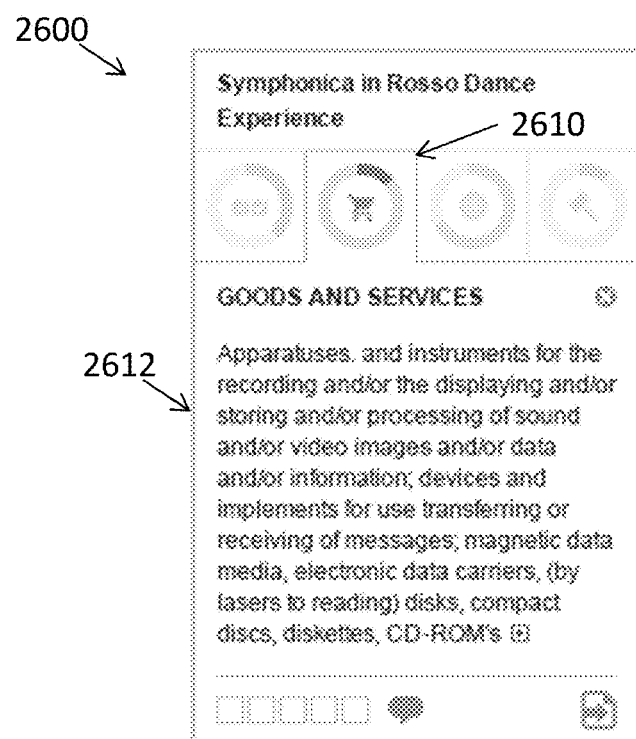
FIG. 26 shows an exemplary GUI to provide goods and/or services similarity information about a trademark in accordance with embodiments of the present disclosure.

FIG. 26 shows an exemplary GUI 2600 that can be rendered on a display of a user device in response to data and one or more presentation instructions being transmitted to the user device from the distributed server environment executing embodiments of the systems, 700, 800, 900, and/or 1000 described herein. The GUI 2600 can be rendered in response to selection of the goods and/or services similarity tab 2610 and can include a recitation of the description of the goods and/or services 2612 associated with the trademark returned by the search. The tab 2610 can include an indicator that indicates a degree of similarity between the reference description of goods and/or services and the description of goods and/or services of the trademark returned by the search as determined by the goods and/or services similarity engine 100 (e.g., FIGS. 1 and 6).

Figure 27:
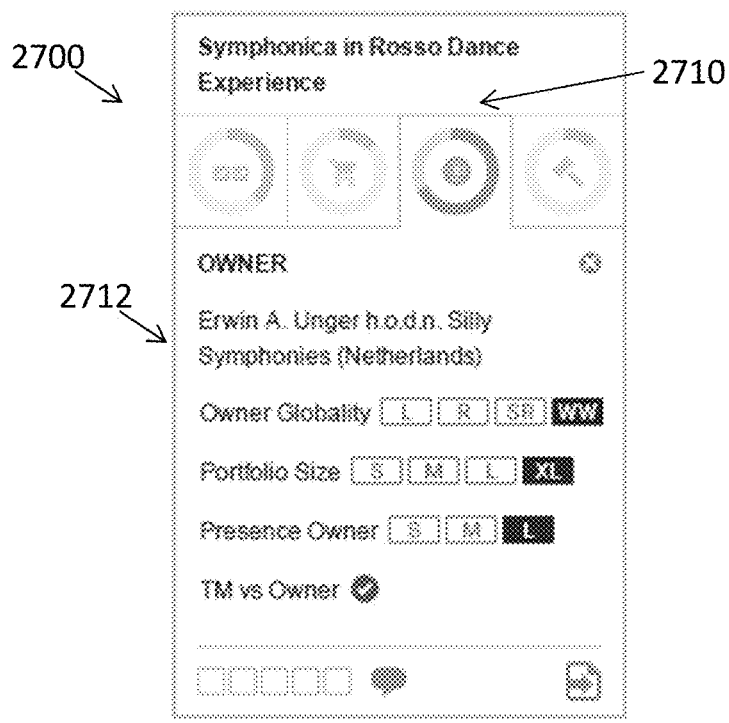
FIG. 27 shows an exemplary GUI to provide owner analysis information about a trademark in accordance with embodiments of the present disclosure.

FIG. 27 shows an exemplary GUI 2700 that can be rendered on a display of a user device in response to data and one or more presentation instructions being transmitted to the user device from the distributed server environment executing embodiments of the systems, 700, 800, 900, and/or 1000 described herein. The GUI 2700 can be rendered in response to selection of the owner analysis tab 2710 and can show an owner analysis 2712 as determined by the owner analyzer 620 (e.g., FIG. 6). For example, the GUI 2700 can list various owner attributes, such "Owner Globality", which indicates the spread or geographic scope of the owners trademark portfolio, "Portfolio Size", which indicates the quantity of trademarks owned by the owner, "Presence Owner", which indicates a quantity of trademarks are included in the searched class/classes, and "TM vs. Owner", which indicates that the owner has one or more trademarks that includes one or more words/terms that are similar the name of the owner.

Figure 28:
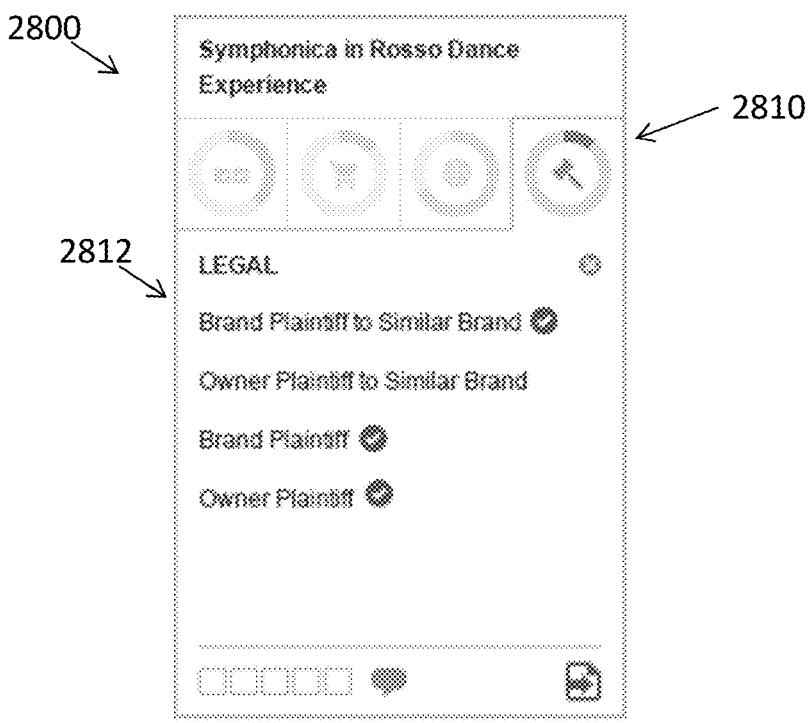
FIG. 28 shows an exemplary GUI to provide legal analysis information about a trademark in accordance with embodiments of the present disclosure.

FIG. 28 shows an exemplary GUI 2800 that can be rendered on a display of a user device in response to data and one or more presentation instructions being transmitted to the user device from the distributed server environment executing embodiments of the systems, 700, 800, 900, and/or 1000 described herein. The GUI 2800 can be rendered in response to selection of the legal analysis tab 2810 and can show a legal analysis 2812 for the trademark-owner combination as determined by the legal analyzer 630 (e.g., FIG. 6). For example, the GUI 2800 can list various legal analytics as described in connection with the legal analyzer 630 shown in FIG. 6.

Figure 29:
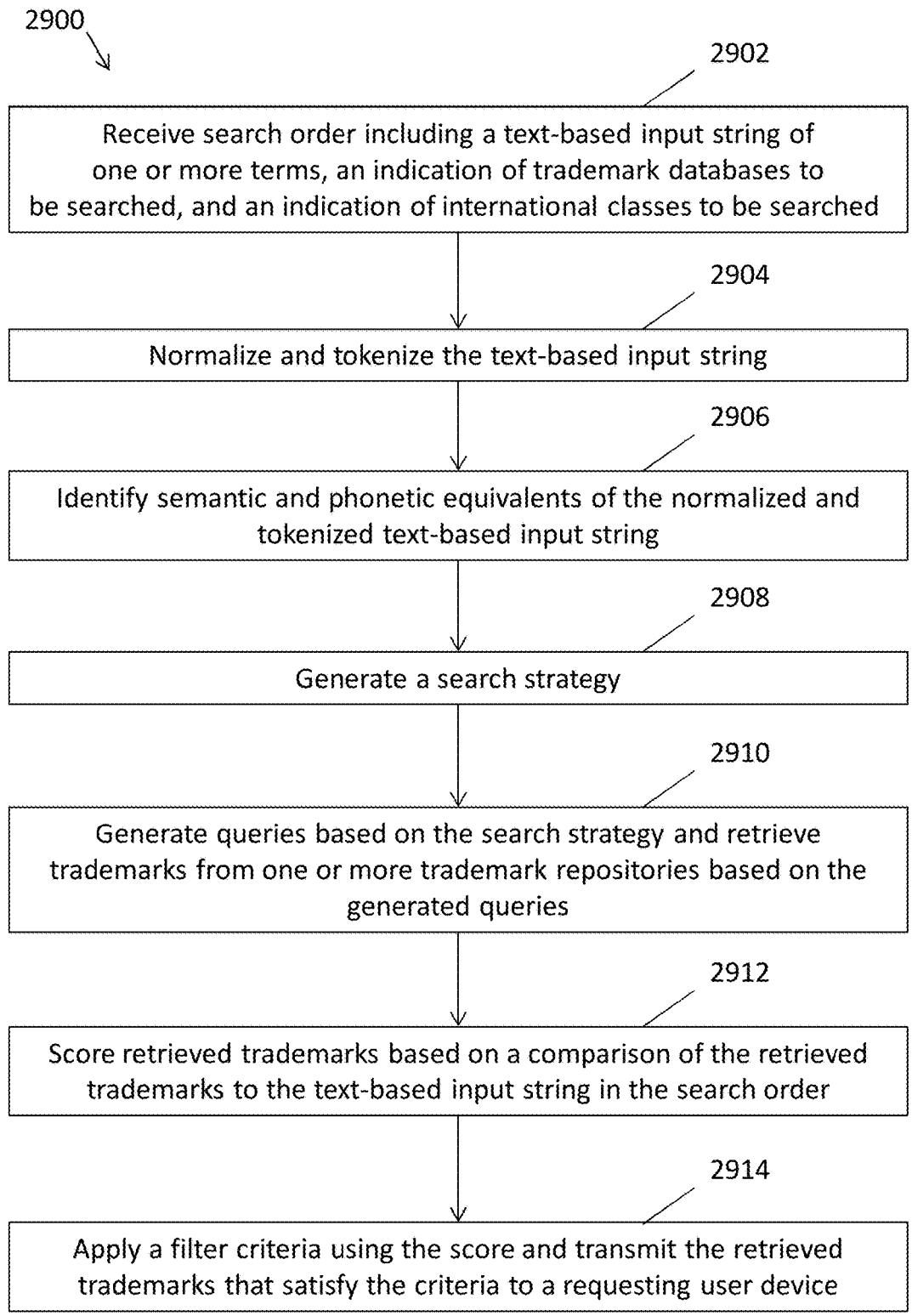
FIG. 29 is a flowchart illustrating an exemplary process that can be performed by an information retrieval system in accordance with exemplary embodiments of the present disclosure to search for and retrieve word marks from one or more trademark repositories.

FIG. 29 is a flowchart illustrating an exemplary process 2900 performed by an information retrieval system in accordance with exemplary embodiments of the present disclosure to search for and retrieve word marks from one or more trademark repositories. At step 2902, a server in a distributed server environment receives a search order including a text-based input string of one or more terms, an indication of trademark repositories to be searched, an indication of international classes to be searched, and an indication of goods/services to be associated with the text-based input string. In response to receiving the search order, one or more servers can execute components of the information retrieval system (e.g., information retrieval system 800 shown in FIG. 8). At step 2904, the information retrieval system normalize and tokenize the text-based input string, and at step 2906, the information retrieval system can identify semantic and phonetic equivalents of the normalized and tokenized text-based input string.

At step 2908, the information retrieval system can generate a search strategy, which defines the manner with which the order will processed to retrieve and filter results. At step 2910, the information retrieval system generates one or more queries in one or more query or programming languages based on the search strategy and retrieves trademarks from one or more trademark repositories based on the generated queries. At step 2912, the trademarks returned in response to the queries are scored based on a comparison of the trademarks to the text-based input string in the search order, and at step 2914, the trademarks having a score that satisfy a filtering criteria are transmitted to the user device by one of the servers in the distributed server environment with presentation instructions for rendering the trademarks in a graphical user interface on a display of the user device. The trademarks transmitted to the user device can be the trademarks that the information retrieval system deemed to be confusingly similar to the text-based input string received in the search order.

Figure 30:
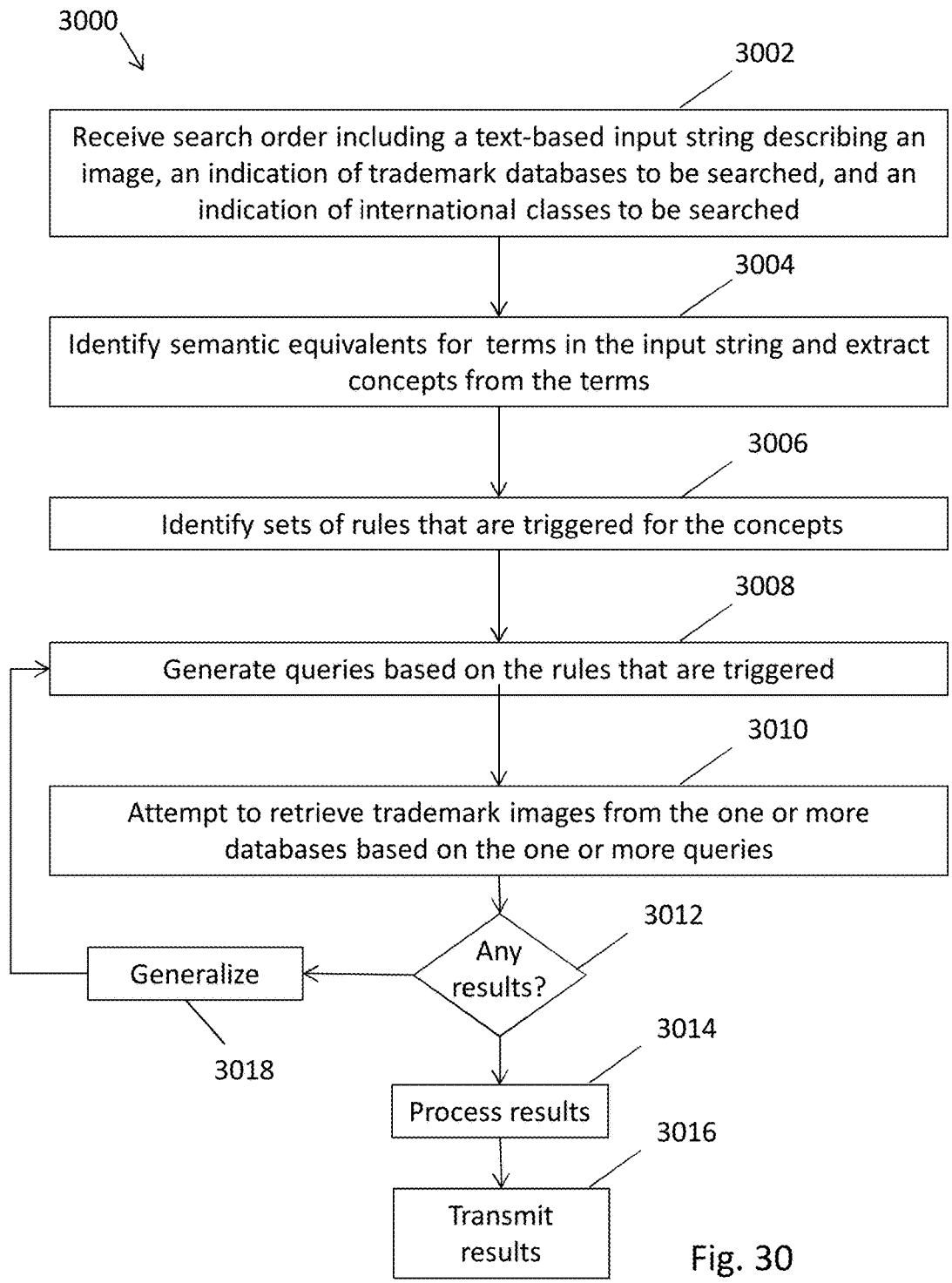
FIG. 30 is a flowchart illustrating an exemplary process performed by an information retrieval system in accordance with exemplary embodiments of the present disclosure to search for and retrieve trademark images from one or more trademark repositories.

FIG. 30 is a flowchart illustrating an exemplary process 3000 performed by an information retrieval system in accordance with exemplary embodiments of the present disclosure to search for and retrieve trademark images from one or more trademark repositories. At step 3002, a server in a distributed server environment receives a search order including a text-based input string of one or more terms describing an image, an indication of trademark repositories to be searched, an indication of international classes to be searched, and an indication of goods/services to be associated with the text-based input string. In response to receiving the search order, one or more servers can execute components of the information retrieval system (e.g., information retrieval system 900 shown in FIG. 9). At step 3004, the information retrieval system can identify semantic equivalents for the one or more terms and can extract one or more concepts from the one or more terms. At step 3006, the information retrieval system can identify one or more sets of rules that are triggered for each concept included in the search order, and at step 3008, the information retrieval system can generate one or more queries in one or more query or programming languages based on the rules that are triggered. The one or more queries can include low level retrieval codes connected by logical connectors (e.g., AND, OR, NOR, NAND).

At step 3010, the information retrieval system attempts to retrieve trademark images from the one or more repositories, and at step 3012, the information retrieval system determines whether any results are returned in response to the generated queries. If no results are returned, at step 3014, the information retrieval system executes the query generalizer to identify other sets of rules that can be used to form new queries based on the names of the rules that were previously used to form the queries and/or alters the logically connectors between query terms, and the process repeats from step 3008. The degree to which the queries are generalized and the number of generalization iterations to be performed can be controlled based on one or more parameters (e.g., a number of levels, L, and a variation of elements, E). When the information retrieval system exhausts the number of iterations without receiving any returns or successfully retrieves at least one trademark image from the one or more repositories, the process proceeds to step 3014 where the results are processed for presentation. In the event that no results are return (even after query generalization), a message can be output to the user to indicate that no results were found. However, if results were found, the information retrieval system groups the results based on metadata associated with the returned trademark images as well as image data associated with the returned trademark images (e.g., color data) at step 3016, and the results are transmitted to the user device by one of the servers in the distributed server environment with presentation instructions for visually rendering the trademarks in a graphical user interface on a display of the user device. The trademarks transmitted to the user device can be the trademarks that the information retrieval system deemed to be confusingly similar to the text-based input string received in the search order.

Figure 31:
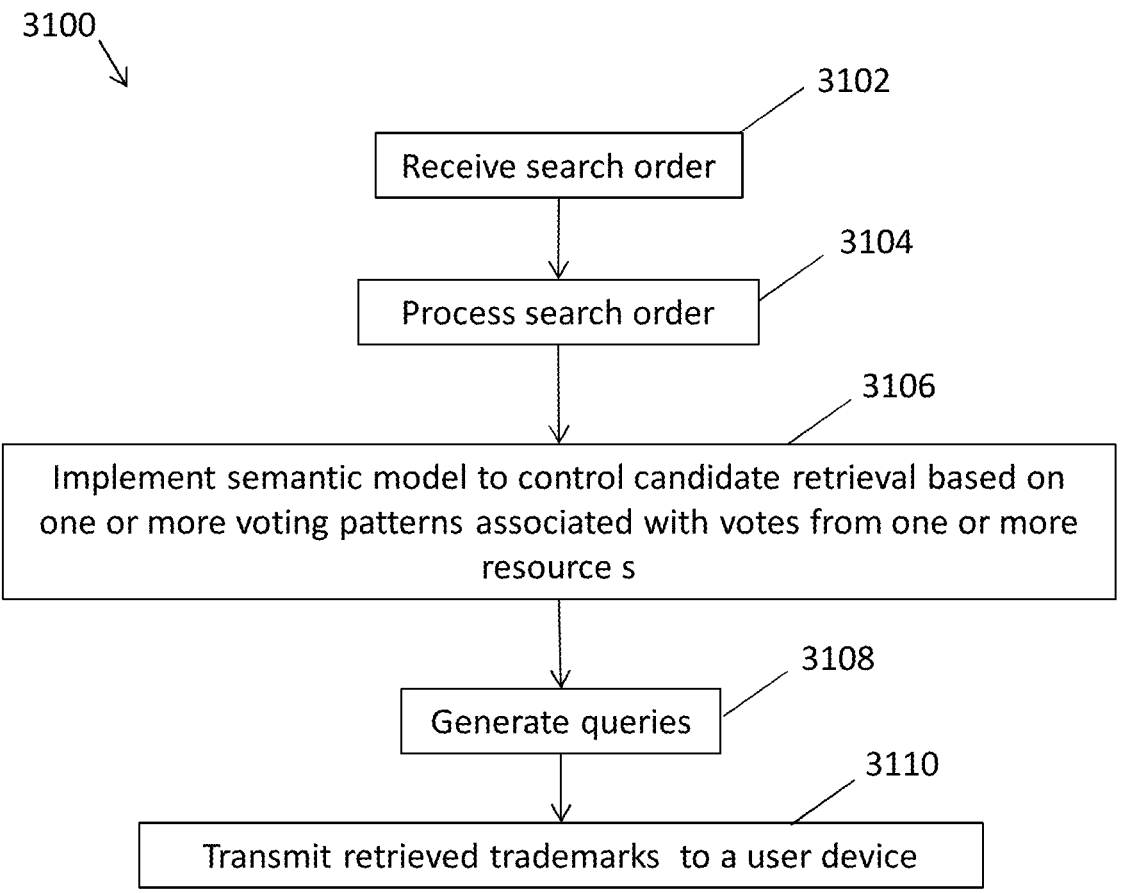
FIG. 31 is a flowchart illustrating an exemplary process that can be performed by an information retrieval system in accordance with exemplary embodiments of the present disclosure to search for and retrieve trademarks from one or more trademark repositories using a semantic model.

FIG. 31 is a flowchart illustrating an exemplary process 3100 performed by an information retrieval system in accordance with exemplary embodiments of the present disclosure to search for and retrieve word marks from one or more trademark repositories. At step 3102, a server in a distributed server environment receives a search order including a text-based input string of one or more terms, an indication of trademark repositories to be searched, an indication of international classes to be searched, and an indication of goods/services to be associated with the text-based input string. In response to receiving the search order, one or more servers can execute components of the information retrieval system (e.g., information retrieval system 1000 shown in FIG. 10). At step 3104, the information retrieval system processes the order, and at step 3106, the information retrieval system implements a semantic model to control candidate retrieval based on one or more voting patterns associated with votes from one or more resources to indicated a semantical relatedness of one or more terms in the search order to one or more other terms. At step 3108, the information retrieval system generates one or more queries in one or more query or programming languages based on the voting patterns and retrieves (confusingly similar) trademarks from one or more trademark repositories based on the generated queries. At step 3110, the (confusingly similar) trademarks returned in response to the queries are transmitted to the user device.

Figure 32:
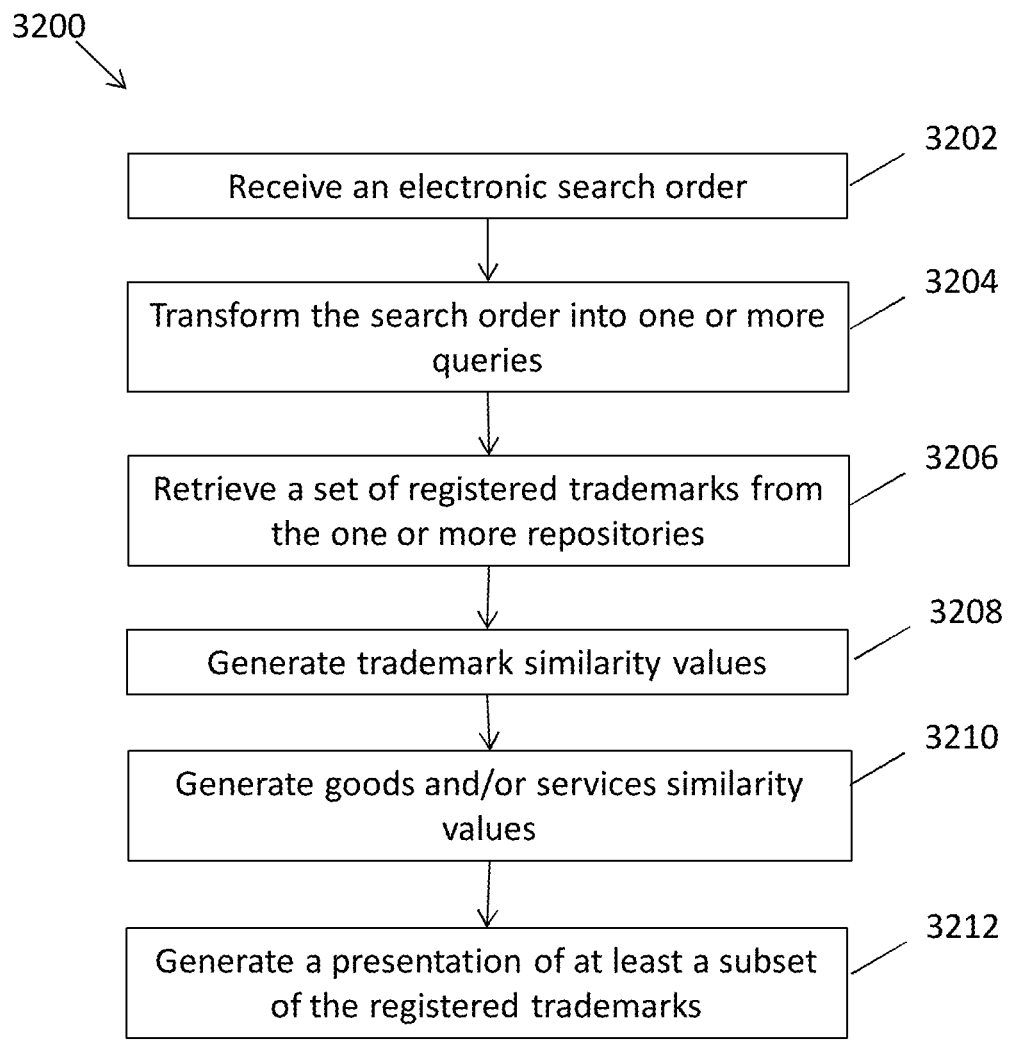
FIG. 32 is a flowchart illustrating an exemplary process performed by an information retrieval system in accordance with exemplary embodiments of the present disclosure to search for, retrieve, and present trademarks from one or more trademark repositories.

FIG. 32 is a flowchart illustrating an exemplary process 3200 performed by an information retrieval system in accordance with exemplary embodiments of the present disclosure to search for, retrieve, and present trademarks from one or more trademark repositories. At step 3202, an electronic search order including a trademark input string, a reference description of goods and/or services, and a reference trademark class is received by one or more servers. At step 3204, the search order is transformed by the one or more servers into one or more queries based on execution of conditional logic of one or more rules. At step 3206, a set of registered trademarks from the one or more repositories is retrieved using the one or more queries to generate search results. The set of registered trademarks including descriptions of goods and/or services for the registered trademarks, and trademark classes associated with the registered trademarks. At step 3208, trademark similarity values are generated between the trademark input string and each of the registered trademarks by the one or more servers. At step 3210, goods and/or services similarity values are generated between the reference description of goods and/or services and each of the descriptions of goods and/or services for the registered trademarks by the one or more servers. At step 3212, a presentation of at least a subset of the registered trademarks is generated, via a graphical user interface, where the presentation includes graphics emphasizing the registered trademarks in the subset based on the trademark similarity values and the goods and/or services similarity values.

Figure 33:
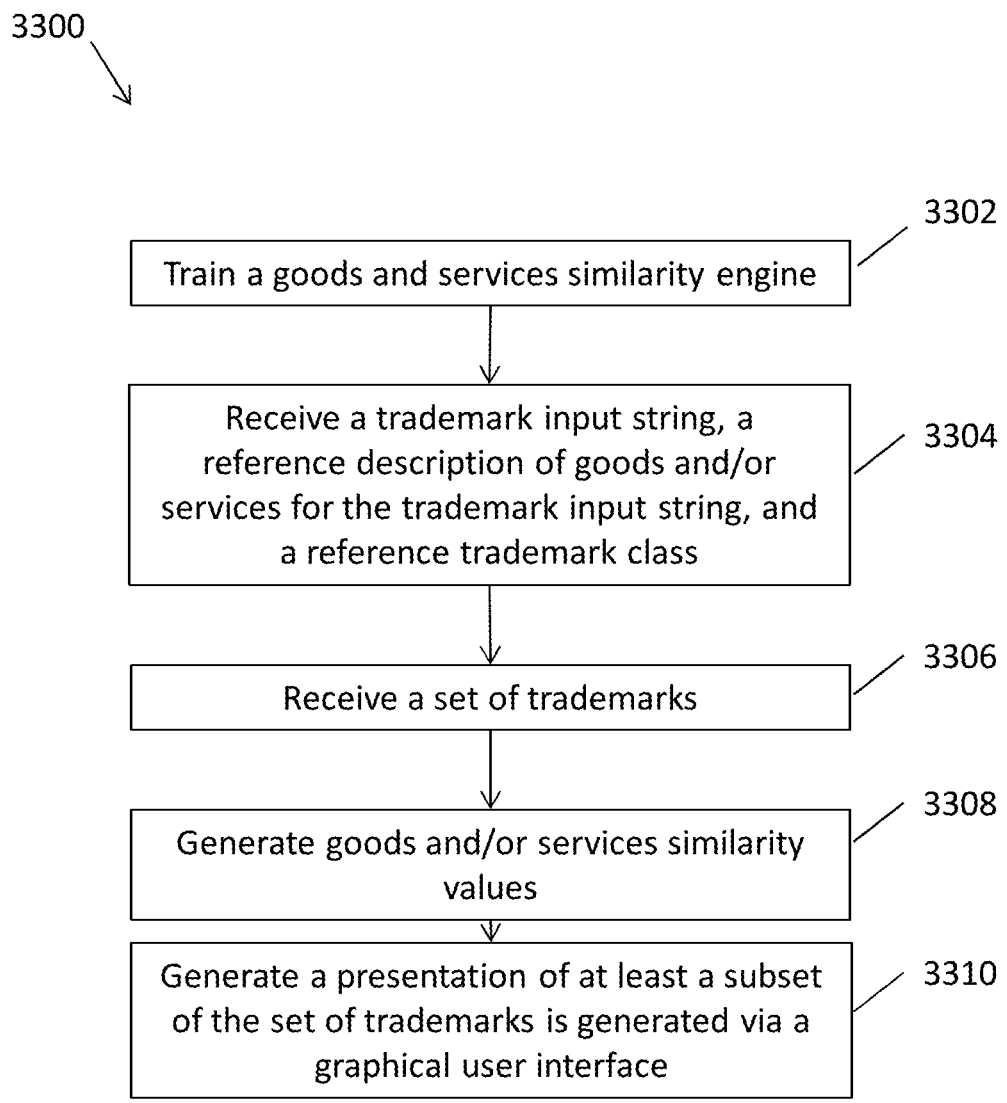
FIG. 33 is a flowchart illustrating an exemplary process performed by an information retrieval system in accordance with exemplary embodiments of the present disclosure to identify similar trademarks from one or more trademark repositories.

FIG. 33 is a flowchart illustrating an exemplary process 3300 performed by an information retrieval system in accordance with exemplary embodiments of the present disclosure to search for, retrieve, and present trademarks from one or more trademark repositories. At step 3302, a goods and/or services similarity engine is trained to identify similarities between pairs of descriptions of goods and/or services in a corpus of training data that includes the descriptions of goods and/or services for registered trademarks and classes associated with the description of goods and/or services. At step 3304, a trademark input string, a reference description of goods and/or services for the trademark input string, and a reference trademark class for the trademark input string and the reference description of goods and/or services is received. At step 3306, a set of trademarks is received from the one or more repositories. The set of trademarks includes registered trademarks, descriptions of goods and/or services associated with the registered trademarks, and trademark classes associated with the registered trademarks. At step 3308, goods and/or services similarity values indicative of similarities between the reference description of goods and/or services and each of the descriptions of goods and/or services associated with each of the registered trademarks are generated by the trained goods and/or services similarity engine. At step 3310, a presentation of at least a subset of the set of trademarks is generated via a graphical user interface. The presentation includes graphics emphasizing the registered trademarks in the subset based, at least in part, on the plurality of goods and/or services similarity values.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A method of identifying similar trademarks from one or more repositories comprising:
    training a goods and services similarity engine to identify similarities between pairs of descriptions of goods or services in a corpus of training data that includes the descriptions of goods or services for registered trademarks and trademark classes associated with the description of goods or services;
    receiving a trademark input string, a reference description of goods or services for the trademark input string, and a reference trademark class for the trademark input string corresponding to one of the trademark classes and the reference description of goods or services;
    decomposing terms the reference description of goods or services into kernel terms, modifier terms, and generic terms based on frequency distributions of the terms of the reference description of goods or services over the trademark classes, wherein kernel terms correspond to terms in the reference description of goods or services for which the frequency distributions have a peak in the reference trademark class that statistically biases the frequency distributions towards the reference trademark class, modifier terms correspond to terms in the reference description of goods or services for which the frequency distributions have one or more peaks in one or more of the trademark classes other than the reference trademark class that statistically biases the frequency distributions towards the one or more other trademark classes and away from the reference trademark class, and generic terms correspond to terms in the reference description of goods or services that are uniformly distributed over the trademark classes;
    receiving a set of trademarks from the one or more repositories, the set of trademarks including registered trademarks, descriptions of goods or services associated with the registered trademarks, owners associated with the registered trademarks, countries associated with the registered trademarks, and trademark classes associated with the registered trademarks;
    generating, by the goods and services similarity engine, based on the training, a plurality of goods or services similarity values for the kernel terms, the modifier terms, and the generic terms indicative of similarities between the reference description of goods or services and each of the descriptions of goods or services associated with each of the registered trademarks; and
    generating a presentation of at least a subset of the set of trademarks for a user via a graphical user interface, the presentation including graphics emphasizing the registered trademarks in the subset based, at least in part, on the plurality of goods or services similarity values.

2. The method of claim 1, wherein each of the goods or services similarity values is based on distributions of terms in the descriptions of goods or services in the training data across specified trademark classes.

3. The method of claim 1, wherein generating the plurality of goods or services similarity values comprises:
    generating a first subset of similarity values for the kernel terms using a first similarity algorithm;
    generating a second subset of similarity values for the modifier terms using a second similarity algorithm; and
    combining the first and second subsets of the similarity values to generate plurality of similarity values.

4. The method of claim 1, further comprising:
    generating, by a trademark similarity engine, a plurality of trademark similarity values indicative of similarities between the trademark input string and each of the registered trademarks,
    wherein generating the presentation of at least the subset of the registered trademarks is further based on the plurality of trademark similarity values.

5. The method of claim 1, further comprising:
    generating an owner score for each of the registered trademarks based on one or more attributes associated with a portfolio of trademarks for each owner of the registered trademarks,
    wherein generating the presentation of at least the subset of the registered trademarks is further based on the owner score.

6. The method of claim 1, further comprising:
    generating a legal score for each of the registered trademarks based on legal data associated with one or more judicial or administrative proceedings associated with each of the registered trademarks,
    wherein generating the presentation of at least the subset of the registered trademarks is further based on the legal score.

7. The method of claim 1, wherein training the goods and services similarity engine comprises:
    generating tokens for words included in the descriptions of the goods or services in the corpus of the training data; and
    replacing the words with the tokens.

8. The method of claim 7, wherein training the goods and services similarity engine comprises:
    evaluating the tokens to determine frequencies with which the tokens appear in each of the trademark classes; and
    generating class distributions of the tokens across the trademark classes.

9. The method of claim 8, wherein training the goods and services similarity engine comprises:
    normalizing the class distributions so that the frequencies with which the tokens appear in each of the trademark classes is defined relative to a total number of the tokens appearing in each of the trademark classes.

10. The method of 7, wherein training the goods and services similarity engine comprises:
    generating vector values for one of the tokens based on a set of the tokens that surround the one of the tokens in a description of the goods or services to define context-based vector such that similarity between two or more of the tokens is data.

11. A system of identifying similar trademarks, the system comprising:
- one or more repositories storing trademarks and metadata associated with the trademarks; and
- a distributed server environment including servers operatively coupled to each other via a communication network, the servers being configured to interact with the one or more repositories to:
  - train a goods and services similarity engine to identify similarities between pairs of descriptions of goods or services in a corpus of training data that includes the descriptions of goods or services for registered trademarks and trademark classes associated with the description of goods or services;
  - receive a trademark input string, a reference description of goods or services for the trademark input string, and a reference trademark class for the trademark input string corresponding to one of the trademark classes and the reference description of goods or services;
  - decompose terms the reference description of goods or services into kernel terms, modifier terms, and generic terms based on frequency distributions of the terms of the reference description of the goods or services over the trademark classes, wherein the kernel terms correspond to terms in the reference description of goods or services for which the frequency distributions have a peak in the reference trademark class that statistically biases the frequency distributions towards the reference trademark class, modifier terms correspond to terms in the reference description of goods for which the frequency distributions have one or more peaks in one or more of the trademark classes other than the reference trademark class that statistically biases the frequency distributions towards the one or more other trademark classes and away from the reference trademark class, and generic terms correspond to terms in the reference description of goods or services that are uniformly distributed over the trademark classes;
  - receive a set of trademarks from the one or more repositories, the set of trademarks including registered trademarks, descriptions of goods or services associated with the registered trademarks, owners associated with the registered trademarks, countries associated with the registered trademarks, and trademark classes associated with the registered trademarks;
  - generate, by the goods or services similarity engine, based on the training, a plurality of goods or services similarity values for the kernel terms, the modifier terms, and the generic terms indicative of similarities between the reference description of goods or services and each of the descriptions of goods or services associated with each of the registered trademarks; and
  - generate a presentation of at least a subset of the set of trademarks for a user via a graphical user interface, the presentation including graphics emphasizing the registered trademarks in the subset based, at least in part, on the plurality of goods or services similarity values.

12. The system of claim 11, wherein each of the goods or services similarity values is based on at least one of distributions of terms in the descriptions of goods or services in the training data across specified trademark classes or vectors created for terms in the descriptions of goods or services in the training data.

13. The system of claim 11, wherein the goods and services similarity engine is trained by generating tokens for words included in the description of the goods or services in the corpus of the training data, and replacing the words with the tokens.

14. The system of claim 13, wherein the goods and services similarity engine is trained by evaluating the tokens to determine frequencies with which the tokens appear in each of the trademark classes, and generating class distributions of the tokens across the trademark classes.

15. The system of claim 14, wherein the goods and services similarity engine is trained by normalizing the class distributions so that the frequencies with which the tokens appear in each of the trademark classes is defined relative to a total number of the tokens appearing in each of the trademark classes.

16. The system of 13, wherein the goods and services similarity engine is trained by generating vector values for one of the tokens based on a set of the tokens that surround the one of the tokens in a description of the goods or services to define context-based vector such that similarity between two or more of the tokens is determined based on the context within which the two or more tokens are used in the training data.

17. A non-transitory computer-readable medium storing instructions that when executed by one or more processing devices cause the one or more processing devices to implement a method comprising:
- training a goods and services similarity engine to identify similarities between pairs of descriptions of goods or services in a corpus of training data that includes the descriptions of goods or services for registered trademarks and trademark classes associated with the description of goods or services;
- receiving a trademark input string, a reference description of goods or services for the trademark input string, and a reference trademark class for the trademark input string corresponding to one of the trademark classes and the reference description of goods or services;
- decomposing terms the reference description of goods or services into kernel terms, modifier terms, and generic terms based on frequency distributions of the terms of the reference description of goods or services over the trademark classes, wherein kernel terms correspond to terms in the reference description of goods or services for which the frequency distributions have a peak in the reference trademark class that statistically biases the frequency distributions towards the reference trademark class, modifier terms correspond to terms in the reference description of goods or services for which the frequency distributions have one or more peaks in one or more of the trademark classes other than the reference trademark class that statistically biases the frequency distributions towards the one or more other trademark classes and away from the reference trademark class, and generic terms correspond to terms in the reference description of goods or services that are uniformly distributed over the trademark classes;
- receiving a set of trademarks from the one or more repositories, the set of trademarks including registered trademarks, descriptions of goods or services associated with the registered trademarks, owners associated with the registered trademarks, countries associated with the registered trademarks, and trademark classes associated with the registered trademarks;

generating, by the goods and services similarity engine, based on the training, a plurality of goods or services similarity values for the kernel terms, the modifier terms, and the generic terms indicative of similarities between the reference description of goods or services and each of the descriptions of goods or services associated with each of the registered trademarks; and generating a presentation of at least a subset of the set of trademarks for a user via a graphical user interface, the presentation including graphics emphasizing the registered trademarks in the subset based, at least in part, on the plurality of goods or services similarity values.

18. The medium of claim 17, wherein each of the goods or services similarity values is based on distributions of terms in the descriptions of goods or services in the training data across specified trademark classes.

19. The medium of claim 18, wherein generating the plurality of goods or services similarity values comprises:
generating a first subset of similarity values for the kernel terms using a first similarity algorithm;
generating a second subset of similarity values for the modifier terms using a second similarity algorithm; and
combining the first and second subsets of the similarity values to generate plurality of similarity values.

20. The medium of claim 17, wherein execution of the instructions by the one or more processors causes the one or more processors to generate a plurality of trademark similarity values indicative of similarities between the trademark input string and each of the registered trademarks,
wherein generating the presentation of at least the subset of the registered trademarks is further based on the plurality of trademark similarity values.

21. The medium of claim 17, wherein execution of the instructions by the one or more processing devices causes the one or more processing devices to generate an owner score for each of the registered trademarks based on one or more attributes associated with a portfolio of trademarks for each owner of the registered trademarks,
wherein generating the presentation of at least the subset of the registered trademarks is further based on the owner score.

22. The method of claim 17, wherein execution of the instructions by the one or more processors causes the one or more processors to generate a legal score for each of the registered trademarks based on legal data associated with one or more judicial or administrative proceedings associated with each of the registered trademarks,
wherein generating the presentation of at least the subset of the registered trademarks is further based on the legal score.

23. The medium of claim 17, wherein execution of the instructions by the one or more processors causes the one or more processing devices to train the goods and services similarity engine by generating tokens for words included in the descriptions of the goods or services in the corpus of the training data, and replacing the words with the tokens.

24. The medium of claim 23, wherein execution of the instructions by the one or more processors causes the one or more processing devices to train the goods and services similarity engine by evaluating the tokens to determine frequencies with which the tokens appear in each of the trademark classes, and generating class distributions of the tokens across the trademark classes.

25. The medium of claim 24, wherein execution of the instructions by the one or more processors causes the one or more processing devices to train the goods and services similarity engine by normalizing the class distributions so that the frequencies with which the tokens appear in each of the trademark classes is defined relative to a total number of the tokens appearing in each of the trademark classes.

26. The medium of claim 17, wherein execution of the instructions by the one or more processors causes the one or more processing devices to train the goods and services similarity engine by generating vector values for one of the tokens based on a set of the tokens that surround the one of the tokens in a description of the goods or services to define context-based vector such that similarity between two or more of the tokens is determined based on the context within which the two or more tokens are used in the training data.

27. A system of identifying similar trademarks, the system comprising:
one or more non-transitory computer-readable media configured as one or more repositories storing trademarks and metadata associated with the trademarks; and
a server environment including a server, the server being configured to interact with the one or more repositories and one or more rule bases stored in the memory, and being programmed to:
receive an electronic search order including a text-based input string, a list of jurisdictions, and a list of classes;
identify visual, phonetic, morphological, translation or semantic close similar variants of the text-based input string;
transform the electronic search order into a search strategy by inserting one or more directives for processing the search order into the text-based input strings based on the identified visual, phonetic, morphological, translation or semantic close similar variants;
interpret the one or more directives of the search strategy to transform the search strategy into queries;
retrieve a set of trademarks from the one or more repositories using the queries to generate search results, the set of trademarks retrieved being limited to the list of jurisdictions and the list of classes; and
transmit at least a portion of the search results to a user computing device to be rendered in a graphical user interface of a display device associated with the user computing device.

28. A method of identifying similar trademarks, the method comprising:
receiving, by a server, an electronic search order including a text-based input string, a list of jurisdictions, and a list of classes;
identifying visual, phonetic, morphological, translation or semantic close similar variants of the text-based input string by the server;
transforming, by the server, the electronic search order into a search strategy by inserting one or more directives for processing the search order into the text-based input strings based on the identified visual, phonetic, morphological, translation or semantic close similar variants;
interpreting the one or more directives of the search strategy to transform the search strategy into queries by the server;
retrieving, by the server, a set of trademarks from one or more repositories using the queries to generate search results, the set of trademarks retrieved being limited to the list of jurisdictions and the list of classes; and transmitting at least a portion of the search results to a user computing device from the server to render the at least the portion of the search results in a graphical user interface of a display device associated with the user computing device.

29. A non-transitory computer-readable medium storing instructions that when executed by one or more processing devices cause the one or more processing devices to implement a method comprising:

receiving, by a server, an electronic search order including a text-based input string, a list of jurisdictions, and a list of classes;

identifying visual, phonetic, morphological, translation or semantic close similar variants of the text-based input string by the server;

transforming, by the server, the electronic search order into a search strategy by inserting one or more directives for processing the search order into the text-based input strings based on the identified visual, phonetic, morphological, translation or semantic close similar variants;

interpreting the one or more directives of the search strategy to transform the search strategy into queries by the server;

retrieving, by the server, a set of trademarks from one or more repositories using the queries to generate search results, the set of trademarks retrieved being limited to the list of jurisdictions and the list of classes; and transmitting at least a portion of the search results to a user computing device from the server to render the at least the portion of the search results in a graphical user interface of a display device associated with the user computing device.

* * * * *